(12) United States Patent
Kobayashi

(10) Patent No.: US 10,037,200 B2
(45) Date of Patent: Jul. 31, 2018

(54) SYNCHRONIZING INSTALLATION AND EXECUTION OF A PROGRAM ON A SECOND INFORMATION PROCESSING APPARATUS WITH A FIRST INFORMATION PROCESSING APPARATUS WHICH FAILED INSTALLATION OF THE PROGRAM

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 76 days.

(21) Appl. No.: 14/387,685

(22) PCT Filed: Mar. 18, 2013

(86) PCT No.: PCT/JP2013/057634
§ 371 (c)(1),
(2) Date: Sep. 24, 2014

(87) PCT Pub. No.: WO2013/146410
PCT Pub. Date: Oct. 3, 2013

(65) Prior Publication Data
US 2015/0082299 A1    Mar. 19, 2015

(30) Foreign Application Priority Data
Mar. 24, 2012 (JP) ................. 2012-068507

(51) Int. Cl.
*G06F 9/445* (2018.01)
*G06F 8/61* (2018.01)
(Continued)

(52) U.S. Cl.
CPC ............. *G06F 8/61* (2013.01); *G06F 9/54* (2013.01); *G06F 17/30575* (2013.01); *G06F 2209/549* (2013.01)

(58) Field of Classification Search
CPC ............................... G06F 8/60–8/64
See application file for complete search history.

(56) References Cited

U.S. PATENT DOCUMENTS 7,143,067 B1 * 11/2006 Cheston ............. G06F 8/61
705/59
8,656,184 B2    2/2014 Miyazawa
(Continued)

FOREIGN PATENT DOCUMENTS

CN    101237379 A    8/2008
CN    101783737 A    7/2010
(Continued)

OTHER PUBLICATIONS

I. Lovrek et al., "Improving software maintenance by using agent-based remote maintenance shell," International Conference on Software Maintenance, 2003. ICSM 2003. Proceedings., 2003, pp. 440-449.*

(Continued)

*Primary Examiner* — Chameli Das
*Assistant Examiner* — Joanne Macasiano
(74) *Attorney, Agent, or Firm* — Finnegan, Henderson, Farabow, Garrett & Dunner, L.L.P.

(57) ABSTRACT

A system of this invention is directed to an information processing system that allows a client to enjoy the execution result of a program acquired or to be acquired by the client, even if the program cannot be installed or executed in a client apparatus. In the information processing system, a first information processing apparatus and a second information processing apparatus are connected via communication media. It is requested, from the first information processing apparatus to the second information processing apparatus, to install a program acquired but inexecutable by the first information processing apparatus into the second information processing apparatus. Execution of the program (Continued)

installed in the second information processing apparatus in response to the request is synchronized with an operation for the program in the first information processing apparatus.

30 Claims, 42 Drawing Sheets

(51) Int. Cl.
*G06F 9/54* (2006.01)
*G06F 17/30* (2006.01)

(56) References Cited

U.S. PATENT DOCUMENTS

| | | | |
|---|---|---|---|
| 2002/0059480 A1* | 5/2002 | Matsuura | G06F 8/61 710/1 |
| 2007/0171921 A1* | 7/2007 | Wookey | G06F 3/1415 370/401 |
| 2008/0184340 A1 | 7/2008 | Nakamura et al. | |
| 2008/0243683 A1* | 10/2008 | Patel | G06F 21/10 705/39 |
| 2009/0265361 A1* | 10/2009 | Nagami | G06F 9/5072 |
| 2009/0276771 A1* | 11/2009 | Nickolov | G06F 9/4856 717/177 |
| 2010/0106698 A1* | 4/2010 | Nakayama | G06F 17/30073 707/705 |
| 2010/0241873 A1 | 9/2010 | Miyazawa | |
| 2011/0125655 A1 | 5/2011 | Chiyo et al. | |
| 2012/0005267 A1 | 1/2012 | Chen et al. | |
| 2012/0030673 A1 | 2/2012 | Sakamoto | |
| 2012/0059867 A1 | 3/2012 | Okamori | |
| 2012/0066083 A1* | 3/2012 | Inoue | G06Q 30/0601 705/26.1 |
| 2012/0096071 A1* | 4/2012 | Murphey | G06F 8/63 709/203 |
| 2012/0284710 A1* | 11/2012 | Vinberg | G06F 9/45533 718/1 |
| 2014/0164490 A1 | 6/2014 | Nakamura et al. | |

FOREIGN PATENT DOCUMENTS

| | | |
|---|---|---|
| JP | 6-59994 | 3/1994 |
| JP | 8-221372 | 8/1996 |
| JP | 2004-234345 | 8/2004 |
| JP | 2005-228183 | 8/2005 |
| JP | 2005-228227 | 8/2005 |
| JP | 2008-59519 | 3/2008 |
| JP | 2010-224628 | 10/2010 |
| JP | 2011-113203 | 6/2011 |
| JP | 2012-14688 | 1/2012 |
| JP | 2012-32956 | 2/2012 |
| JP | 2012-58837 | 3/2012 |

OTHER PUBLICATIONS

M. Kusek et al., "Mobile agent based software operation and maintenance," Proceedings of the 7th International Conference on Telecommunications, 2003. ConTEL 2003., Zagreb, Croatia, 2003, pp. 601-608 vol. 2.*

International Search Report dated Jun. 18, 2013 in corresponding PCT International Application.

Notification of Reasons for Refusal dated Mar. 22, 2016, by the Japanese Patent Office in counterpart Japanese Patent Application No. 2012-068507.

Notification of First Office Action dated Apr. 1, 2016, by the Chinese Patent Office in counterpart Chinese Patent Application No. 201380016338.X.

Office Action dated Jul. 26, 2016, by the Japanese Patent Office in counterpart Japanese Patent Application No. 2012-068507.

* cited by examiner

SYNCHRONIZING INSTALLATION AND EXECUTION OF A PROGRAM ON A
SECOND INFORMATION PROCESSING
APPARATUS WITH A FIRST INFORMATION
PROCESSING APPARATUS WHICH FAILED
INSTALLATION OF THE PROGRAM

CROSS-REFERENCE TO RELATED PATENT APPLICATIONS

This application is a National Stage Entry of International Application No. PCT/JP2013/057634, filed Mar. 18, 2013, which claims priority from Japanese Patent Application No. 2012-068507, filed Mar. 24, 2012. The entire contents of the above-referenced applications are expressly incorporated herein by reference.

TECHNICAL FIELD

The present invention relates to a technique of, when an acquired application cannot be executed, delegating the execution to an external apparatus.

BACKGROUND ART

Patent literature 1 discloses a technique of increasing the efficiency of communication between a thin client terminal and a server that executes an application in accordance with an operation on the thin client terminal.

CITATION LIST

Patent Literature

Patent literature 1: Japanese Patent Laid-Open No. 2005-228227

SUMMARY OF THE INVENTION

Technical Problem

Some programs cannot be installed in a client apparatus or cannot be executed in the client apparatus although the client (user of the client apparatus) has acquired the programs. The technique described in the above patent literature implements virtual application execution by a thin client apparatus by executing an application held in a server. Since this technique does not assume that the thin client apparatus itself executes the application, the above-described problem cannot be solved.

The present invention enables to provide a technique of solving a problem that even if a program acquired or to be acquired by a client cannot be installed or executed in a client apparatus, the client is allowed to enjoy the execution result of the program.

Solution to Problem

One aspect of the present invention provides an information processing system in which a first information processing apparatus and a second information processing apparatus are connected via communication media, comprising:

an installation requester that requests, from the first information processing apparatus to the second information processing apparatus, to install a program acquired but inexecutable by the first information processing apparatus into the second information processing apparatus;

a program installer that installs the program requested by the installation requester into the second information processing apparatus; and a synchronizer that synchronizes execution of the program installed in the second information processing apparatus with an operation for the program in the first information processing apparatus.

Another aspect of the present invention provides an information processing method of an information processing system in which a first information processing apparatus and a second information processing apparatus are connected via communication media, the method comprising:

requesting, from the first information processing apparatus to the second information processing apparatus, to install a program acquired but inexecutable by the first information processing apparatus into the second information processing apparatus;

installing the program requested in the requesting step into the second information processing apparatus; and synchronizing execution of the program installed in the second information processing apparatus with an operation for the program in the first information processing apparatus.

Still other aspect of the present invention provides an information processing apparatus comprising:

a receiver that receives, from another information processing apparatus, a request to install a program inexecutable by the other information processing apparatus;

a program installer that installs the program; and a synchronizer that synchronizes execution of the installed program with an operation for the program in the other information processing apparatus.

Still other aspect of the present invention provides a control method of an information processing apparatus, the method comprising:

receiving, from another information processing apparatus, a request to install a program inexecutable by the other information processing apparatus;

installing the program; and synchronizing execution of the installed program with an operation for the program in the other information processing apparatus.

Still other aspect of the present invention provides a control program of an information processing apparatus, which causes a computer to execute:

receiving, from another information processing apparatus, a request to install a program inexecutable by the other information processing apparatus;

installing the program; and synchronizing execution of the installed program with an operation for the program in the other information processing apparatus.

Still other aspect of the present invention provides an information processing apparatus comprising:

an installation requester that requests another information processing apparatus to install a program inexecutable by the information processing apparatus apparatus; and a synchronizer that synchronizes an operation for the program in the information processing apparatus with execution of the program installed in the other information processing apparatus.

Still other aspect of the present invention provides a control method of an information processing apparatus, the method comprising:

requesting another information processing apparatus to install a program inexecutable by the information processing apparatus; and synchronizing an operation for the program in the information processing apparatus with execution of the program installed in the other information processing apparatus.

Still other aspect of the present invention provides a control program of an information processing apparatus, which causes a computer to execute:

requesting another information processing apparatus to install a program inexecutable by the information processing apparatus; and synchronizing an operation for the program in the information processing apparatus with execution of the program installed in the other information processing apparatus.

Advantageous Effects of Invention

According to the present invention, even if a program acquired or to be acquired by a client cannot be installed or executed in a client apparatus, the client can enjoy the execution result of the program.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Wording "program" in the embodiments is used as a concept including a program such as an OS (Operating System), a driver, or an application that is installed in a computer from a storage medium or via a communication medium and executed and data in a DB (database) and the like which are used for the program. Wording "installed program" in the embodiments indicates a program that is already installed and is executable. In the embodiments, "installation of a program" and "execution of an installed program" will discriminatively be explained in order to avoid cumbersomeness. However, an inexecutable program cannot be said to have been installed, and clear discrimination is impossible in fact. In the embodiments, "client apparatus" and "client" indicate different subjects. Wording "client" represents a user who owns "client apparatus" or a user who uses "client apparatus".

First Embodiment

An information processing system 100 according to the first embodiment of the present invention will be described with reference to FIG. 1. The information processing system 100 is a system in which a first information processing apparatus 101 and a second information processing apparatus 102 are connected for communication.

Figure 1:
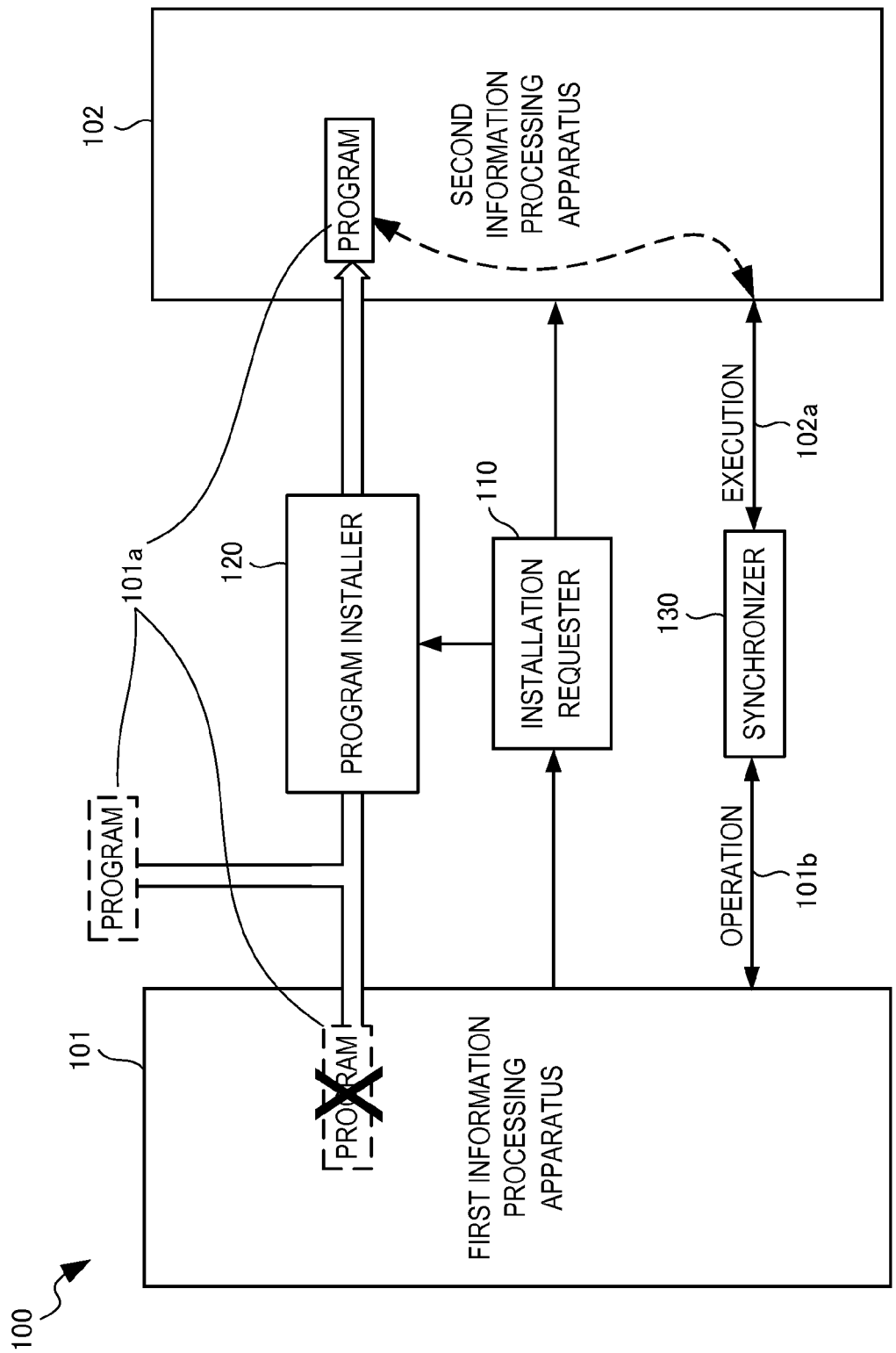
FIG. 1 is a block diagram showing the arrangement of an information processing system according to the first embodiment of the present invention.

As shown in FIG. 1, the information processing system 100 includes an installation requester 110, a program installer 120, and a synchronizer 130. The installation requester 110 requests, from the first information processing apparatus 101 to the second information processing apparatus 102, to install, in the second information processing apparatus 102, a program 101a that is inexecutable by the first information processing apparatus 101 even if acquired. The program installer 120 installs the program 101a requested by the installation requester 110 in the second information processing apparatus 102. The synchronizer 130 synchronizes execution 102a of the program 101a installed in the second information processing apparatus 102 with an operation 101b for the program 101a in the first information processing apparatus 101.

According to this embodiment, even if a program acquired or to be acquired by a client cannot be installed or executed in a client apparatus, the client can enjoy the execution result of the program.

Second Embodiment

An information processing system according to the second embodiment of the present invention will be described next. In the information processing system according to this embodiment, when a client apparatus cannot install or execute a program, the program is transmitted from the client apparatus to a cloud server (including an application server). The program is then installed in the cloud server and executed.

According to this embodiment, a program that has been acquired by a client but cannot be installed or executed is transmitted to the cloud server and installed in it in synchronism with the client apparatus. It is therefore possible to virtually execute the program as if it were installed in the client apparatus.

<<Processing of Information Processing System>>

Figure 2:
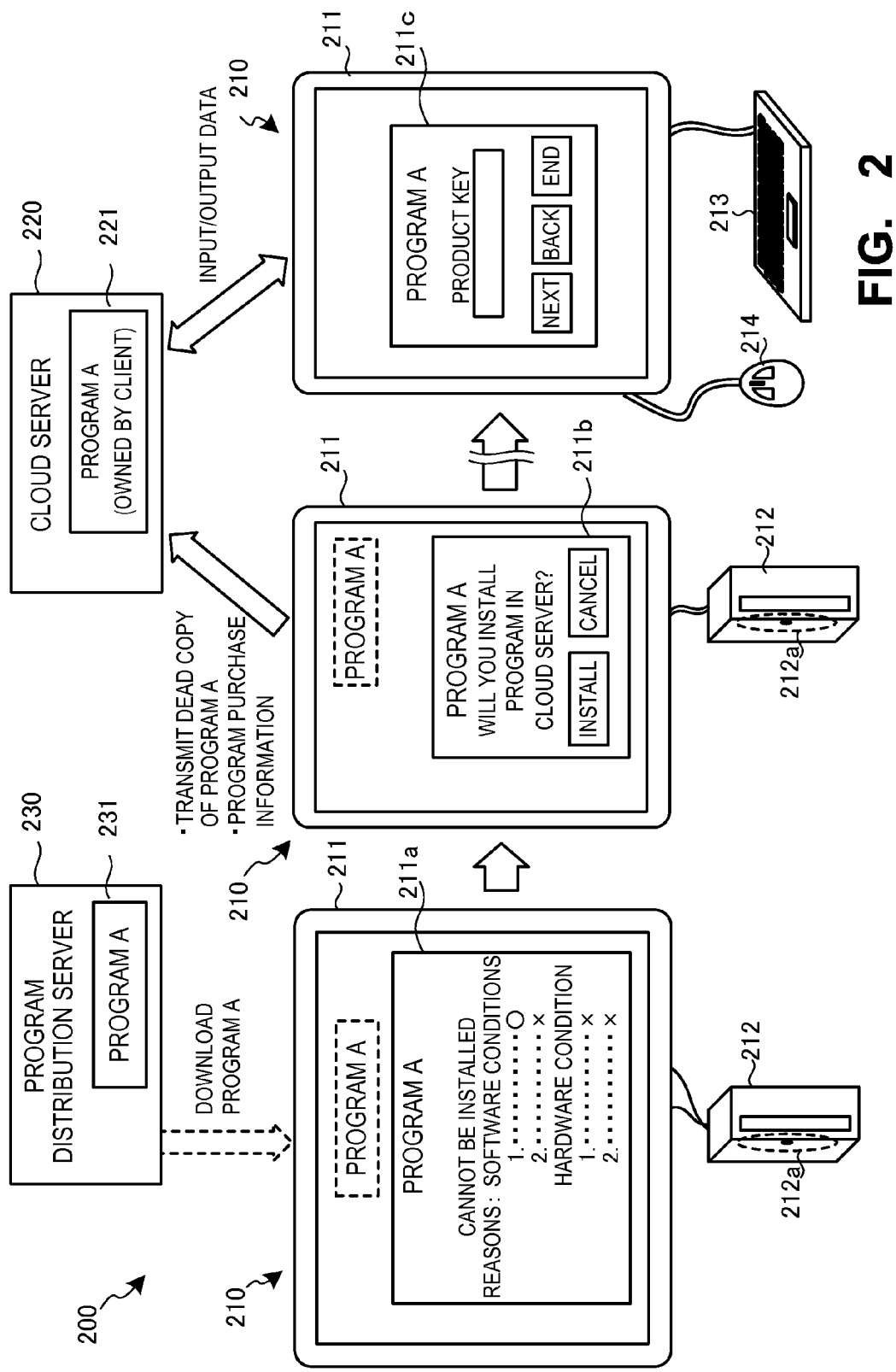
FIG. 2 is a view for explaining processing of an information processing system according to the second embodiment of the present invention.

FIG. 2 is a view for explaining processing of an information processing system 200 according to this embodiment.

The left view of FIG. 2 shows the display screen of a display 211 included in a client apparatus 210. The display screen displays a message 211a representing that the user has purchased a program A 231 and attempted installation from a storage medium 212a of a CD/DVD device 212 or from a program distribution server 230 but ended in failure. The message 211a preferably also displays software conditions (OS, necessary software, and the like) and hardware conditions (CPU capability, memory capacity, capabilities of input/output devices and communication device, and the like) that have resulted in the failure.

The client who has been notified that the purchased program A cannot be installed or executed by the client apparatus 210 in the left view of FIG. 2 requests, from the client apparatus 210, to install and execute the program A in a cloud server 220, as shown in the central view. The display 211 of the client apparatus 210 displays a request message 211b. Program purchase information certifying that the client has purchased the program A is added to the installation request to the cloud server 220, and the program A is transmitted to the cloud server 220. At this time, if the client apparatus 210 can hold the program A, the program A held by the client apparatus 210 is transmitted. However, the client apparatus 210 may be unable to load the program A. In this case, the client apparatus 210 directly transmits a dead copy of the program A from the storage medium 212a of the CD/DVD device 212 or from the program distribution server 230 to the cloud server 220.

The right view of FIG. 2 illustrates an example of the display screen of the display 211 of the client apparatus 210 when a program A 221 transmitted to the cloud server 220 is being installed in it. In the right view of FIG. 2, a message 211c that demands the client to input a product key is displayed in the installation start procedure. Note that the right view of FIG. 2 shows an example of program installation from the storage medium 212a of the CD/DVD device 212. A different message is displayed for installation from the program distribution server 230.

Although not illustrated in FIG. 2, after the cloud server 220 completes installation of the program A, the client apparatus 210 virtually executes the program A. Even a client apparatus different from the client apparatus 210 can virtually execute the program A installed in the cloud server 220 when client authentication is done. A keyboard 213 and a pointing device 214 indicate that the apparatus can be a desktop PC or notebook PC that is a different client apparatus.

<<Arrangement of Information Processing System>

Figure 3:
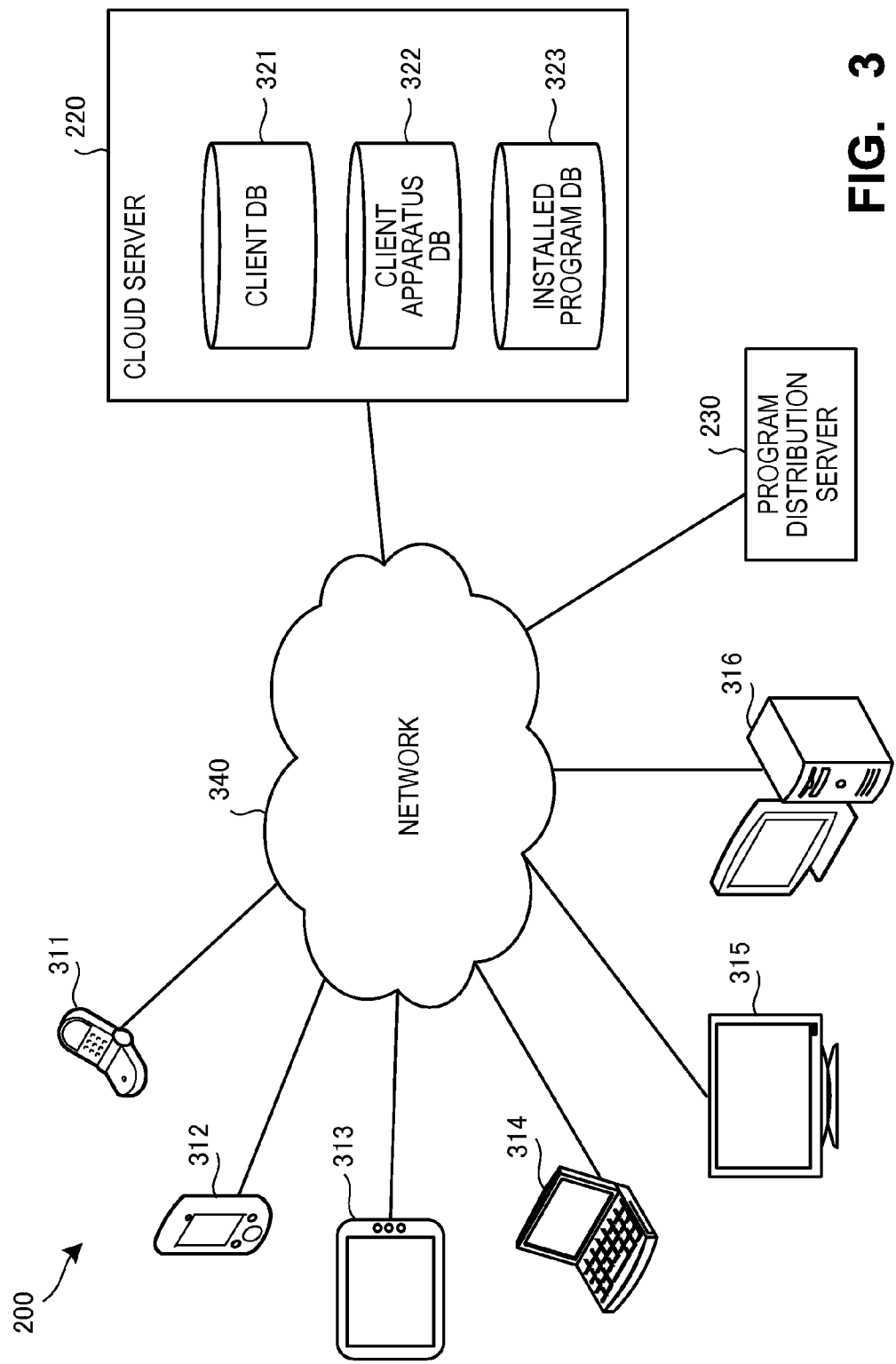
FIG. 3 is a block diagram showing the arrangement of the information processing system according to the second embodiment of the present invention.

FIG. 3 is a block diagram showing the arrangement of the information processing system 200 according to this embodiment.

The information processing system 200 includes client apparatuses 311 to 316, the cloud server 220, and the program distribution server 230 which are connected via a network.

The client apparatuses 311 to 316 correspond to the client apparatus 210 shown in FIG. 2, and include the client apparatuses 311 to 313 that are portable terminals, the client apparatus 314 that is a notebook PC, the client apparatus 315 that is a digital TV, and the client apparatus 316 that is a desktop PC. Each of the client apparatuses 311 to 316 serves as a first information processing apparatus that transmits a purchased program that cannot be installed or executed by the client apparatus to the cloud server 220 and requests the cloud server 220 to install or execute the program.

Figure 7:
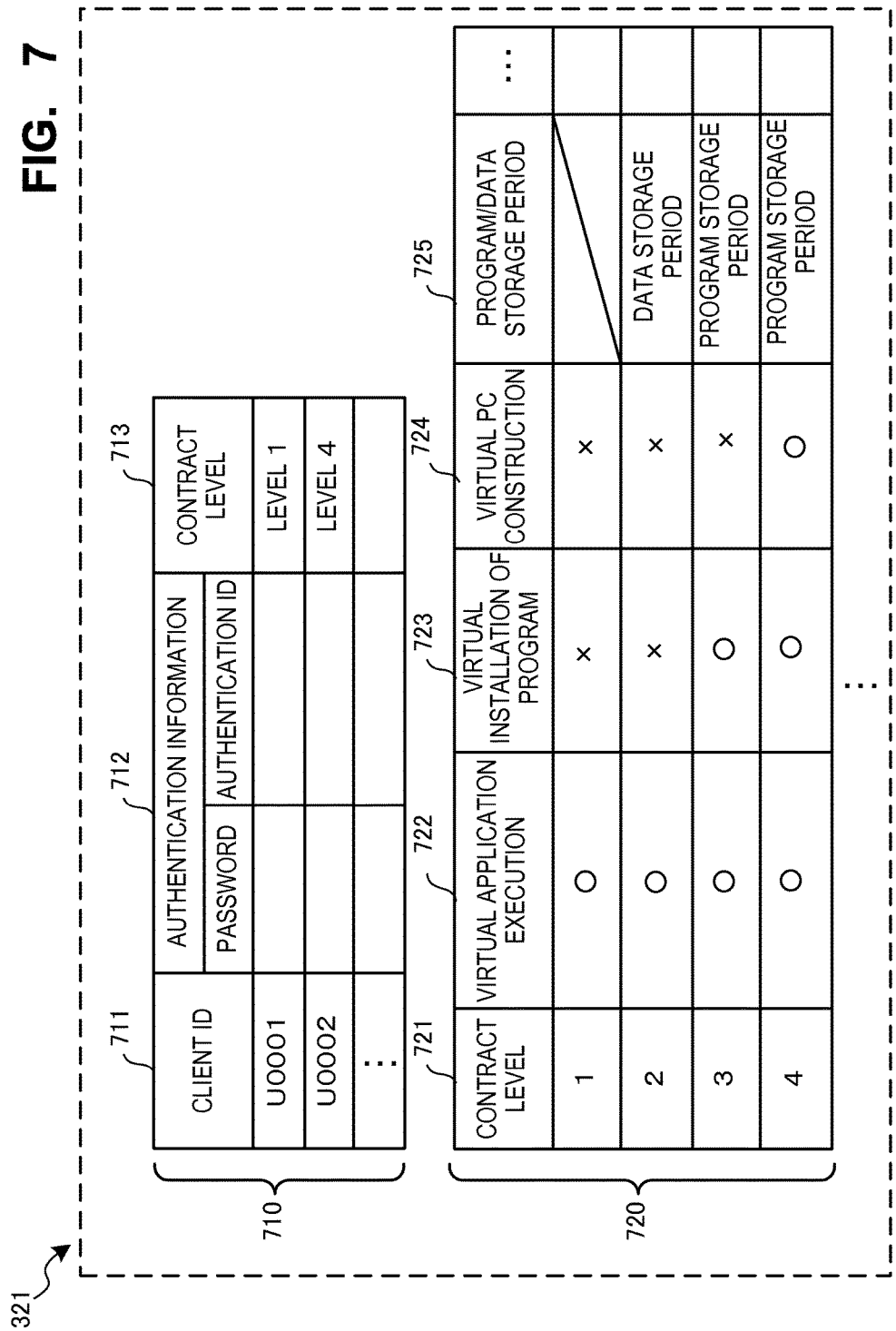
FIG. 7 is a view showing the arrangement of a client DB according to the second embodiment of the present invention.

The cloud server 220 includes a client DB 321 that registers clients (see FIG. 7). The cloud server 220 also includes a client apparatus DB 322 that stores the performance information of the client apparatuses 311 to 316 (see FIG. 8). The cloud server 220 further includes an installed program DB 323 that holds programs installed in response to requests from the client apparatuses 311 to 316 (see FIG. 9).

The program distribution server 230 holds programs to be installed and distributes the programs to the client apparatuses 311 to 316 or the cloud server 220. Note that the number of program distribution servers is not limited although FIG. 2 illustrates only one program distribution server 230.

<<Operation Procedure of Information Processing System>>

Figure 4A:
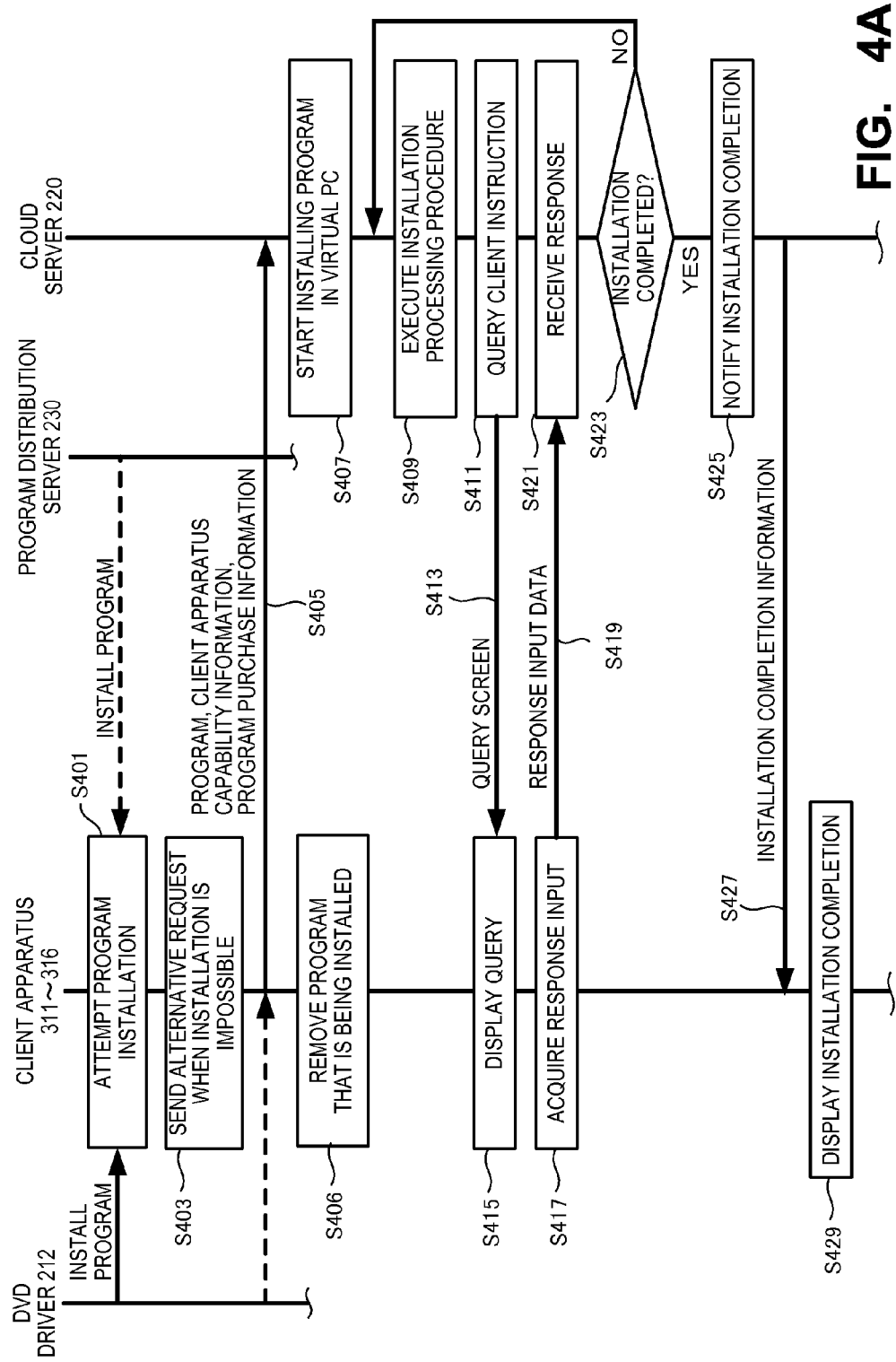
FIG. 4A is a sequence chart showing the operation procedure of the information processing system according to the second embodiment of the present invention.
Figure 4B:
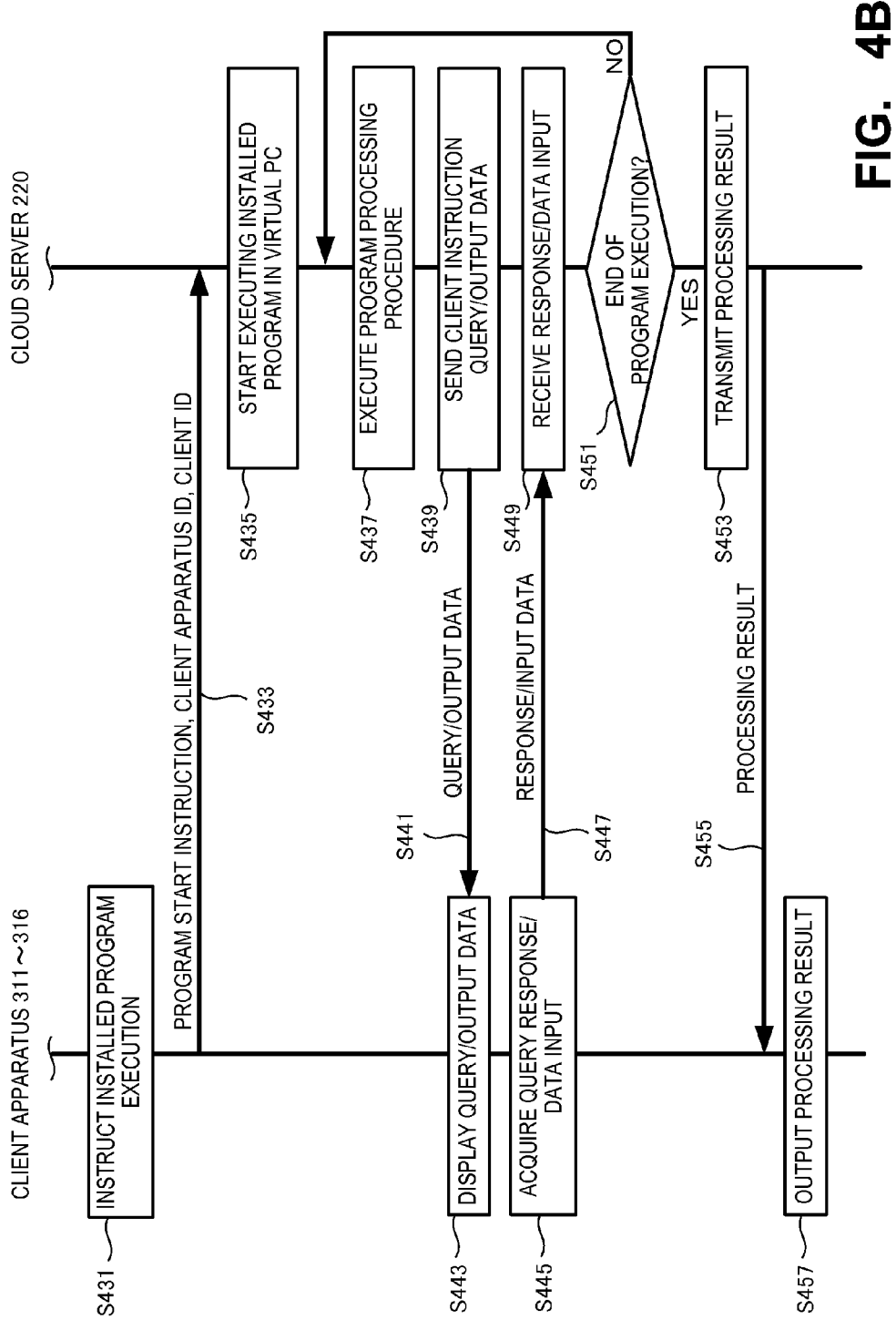
FIG. 4B is a sequence chart showing the operation procedure of the information processing system according to the second embodiment of the present invention.

FIGS. 4A and 4B are sequence charts showing the operation procedure of the information processing system 200 according to this embodiment. The client apparatus 311 will be representative of the client apparatuses 311 to 316 in the following description.

The operation procedure of virtual installation (alternative installation) of a purchased program, which cannot be installed or executed in the client apparatus 311, in the cloud server 220 will be described first with reference to FIG. 4A.

In step S401, the client apparatus 311 attempts to install a desired program from the CD/DVD device 212 or the program distribution server 230. Assume that the client apparatus is notified of a failure of program installation or execution, as shown in the left view of FIG. 3. When the client instructs to request the cloud server 220 to install and execute the program, as shown in the central view, the client apparatus 311 requests installation and execution in the cloud server 220 in step S403. In step S405, the program, the capability information of the client apparatus together with a client ID and a client apparatus ID, and program purchase information certifying that the client has purchased the program are transmitted from the client apparatus 311 to the cloud server 220.

in step S406, the client apparatus 311 removes, from it, the program that has failed in installation or could not be executed after installation. When the client apparatus automatically performs the remove process, the client is relieved from the cumbersome operation of searching for and removing the program. The client need only click (touch) a request button displayed on the client apparatus, and subsequent processing is automatically done. Additionally, the program can be installed in the server without adding a license.

In step S407, the cloud server 220 starts installing the program received from the client apparatus 311 in a virtual PC. In step S409, an installation processing procedure is executed. If the client needs to input the product key as shown in, for example, the right view of FIG. 2 in the program installation processing, the cloud server queries a client instruction or input in step S411. In step S413, a query screen is transmitted from the cloud server 220 to the client apparatus 311.

In step S415, the client apparatus 311 displays the received query screen. Note that the cloud server 220 converts the query screen into a protocol and screen data corresponding to the output capability of the client apparatus 311 as needed. The conversion is essential when, for example, the client apparatus 311 is a previous-generation apparatus, or the program is a previous-generation program. In step S417, the client apparatus 311 acquires a client's response input to the query screen. In step S419, the client apparatus 311 transmits the data of the acquired response input to the cloud server 220.

In step S421, the cloud server 220 receives the response data from the client apparatus 311. Note that in this reception processing as well, the cloud server 220 converts the response data as needed based on the input capability of the client apparatus 311 such that the data fits the protocol and input data of the cloud server 220 or the program.

As described above, the installation progresses along with the data exchange between the cloud server 220 and the client apparatus 311 according to the installation processing procedure. In step S423, it is determined whether installation is completed. If installation is not completed, the process returns to step S409 to advance the installation processing procedure. If installation is completed, the process advances to step S425 to notify the client apparatus 311 of the installation completion.

Installation completion information transmitted from the cloud server 220 to the client apparatus 311 in step S427 is displayed on the client apparatus 311 in step S429. Virtual installation (alternative installation) of the program in the cloud server 220 is thus completed.

The operation procedure of executing the program virtually installed in the cloud server 220 will be described next with reference to FIG. 4B.

In step S431, the client apparatus 311 instructs to execute the installed program. Note that the client apparatus may be one of the remaining client apparatuses 312 to 316. In step S433, a program start instruction is transmitted from the client apparatus 311 to the cloud server 220 together with the client apparatus ID and the client ID.

In step S435, the cloud server 220 authenticates the client and starts executing the installed program in the virtual PC. In step S437, a program processing procedure is executed.

If a query to the client or data output to the client apparatus is necessary in the program execution processing, the cloud server sends a query to the client or output data to the client apparatus in step S439. In step S441, the query or output data is transmitted from the cloud server 220 to the client apparatus 311. Upon receiving the query or output data, the client apparatus 311 displays the query or outputs the data in step S443. Note that the cloud server 220 converts the query screen or output data into a protocol and screen data or output data corresponding to the output capability of the client apparatus 311 as needed, as in the installation.

If a client's response to the query or data input from the client apparatus is necessary in the program execution processing, the client apparatus 311 acquires a response to the query or input data in step S445. In step S447, the client apparatus 311 transmits the response to the query or input data to the cloud server 220. Upon receiving the response to the query or input data, the cloud server 220 receives the response data or input data in step S449. Note that in this reception processing as well, the cloud server 220 converts the response data or input data as needed based on the input capability of the client apparatus 311 such that the data fits the protocol and input data of the cloud server 220 or the installed program.

As described above, the installation progresses along with the data exchange between the cloud server 220 and the client apparatus 311 according to the program processing procedure. In step S451, it is determined whether program execution has ended. If execution has not ended, the process returns to step S437 to advance the program execution procedure. If execution has ended, the process advances to step S453 to notify the client apparatus 311 of the end of execution.

A processing result transmitted from the cloud server 220 to the client apparatus 311 in step S455 is output to the client apparatus 311 in step S457. Note that in the output processing as well, the cloud server 220 converts the protocol and data of the cloud server 220 or the installed program as needed based on the output capability of the client apparatus 311 such that they fit the client apparatus 311. Virtual execution processing (so-called virtual application) of the program in the cloud server 220 thus ends.

Note that "installation processing" in this embodiment includes not only processing of actually loading a program but also processing of activating a program, which is already installed but not activated yet, in response to an alternative installation request. The problem of purchase license in this case can be solved by count-up by activation. In such processing, the processes of steps S405 to S429 in FIG. 4A can be omitted.

As described above, in this embodiment, when a client requests the cloud server 220 to install a program, any client apparatus can execute the installed program and acquire a processing result at any desired time.

<<Functional Arrangement of Cloud Server>>

Figure 5:
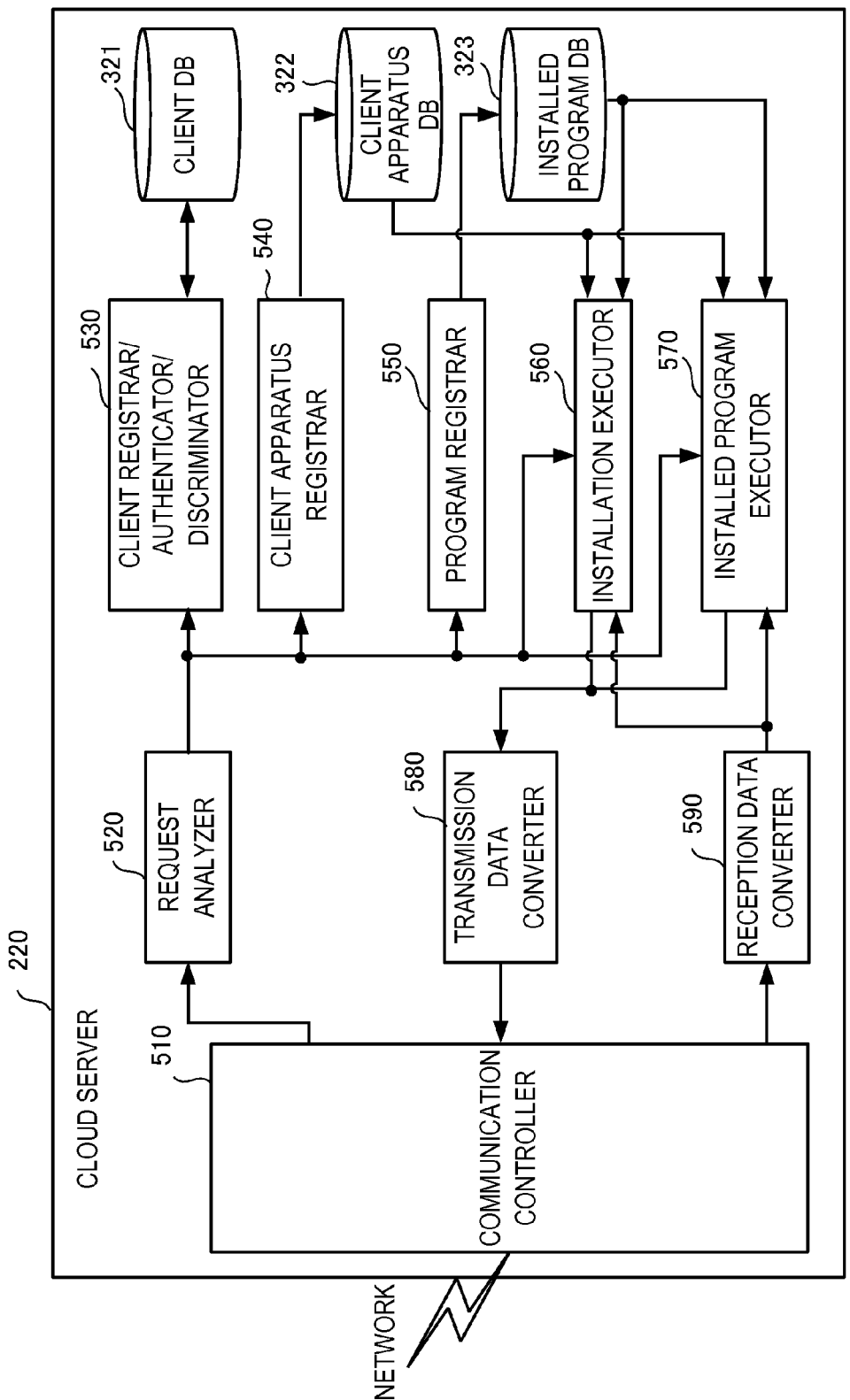
FIG. 5 is a block diagram showing the functional arrangement of a cloud server according to the second embodiment of the present invention.

FIG. 5 is a block diagram showing the functional arrangement of the cloud server 220 according to this embodiment.

The cloud server 220 includes a communication controller 510 that communicates with another server or client apparatus via a network 340. A request analyzer 520 analyzes a request that the communication controller 510 receives from a client apparatus. In this example, the request analyzer 520 analyzes a request, from a client apparatus, to request installation of a program or execution of an installed program.

A client registrar/authenticator/discriminator 530 registers, in the client DB 321, client information included in the request or performs authentication based on authentication information or client determination by referring to the client DB 321. Consequently, the client registrar/authenticator/discriminator 530 accepts the request to install a program or execute an installed program from the client apparatus.

A client apparatus registrar 540 registers, in the client apparatus DB 322, client apparatus information including the capability of the client apparatus included in the request. A program registrar 550 receives a program requested to be installed and transmitted from the client apparatus included in the request and registers it in the installed program DB 323 in association with the client ID.

An installation executor 560 receives an installation request of the client included in the request and executes installation of the program transmitted from the client apparatus to the cloud server 220. At this time, a transmission data converter 580 and a reception data converter 590 convert input/output data of the client apparatus into input/output data of the program in the cloud server 220 at the time of query/response to the client during the installation processing procedure.

An installed program executor 570 receives an installed program execution request of the client included in the request and executes the installed program in the cloud server 220. At this time as well, the transmission data converter 580 and the reception data converter 590 convert input/output data of the client apparatus into input/output data of the installed program in the cloud server 220 at the time of query/response to the client during the installed program execution procedure.

<<Functional Arrangement of Client Apparatus>>

Figure 6:
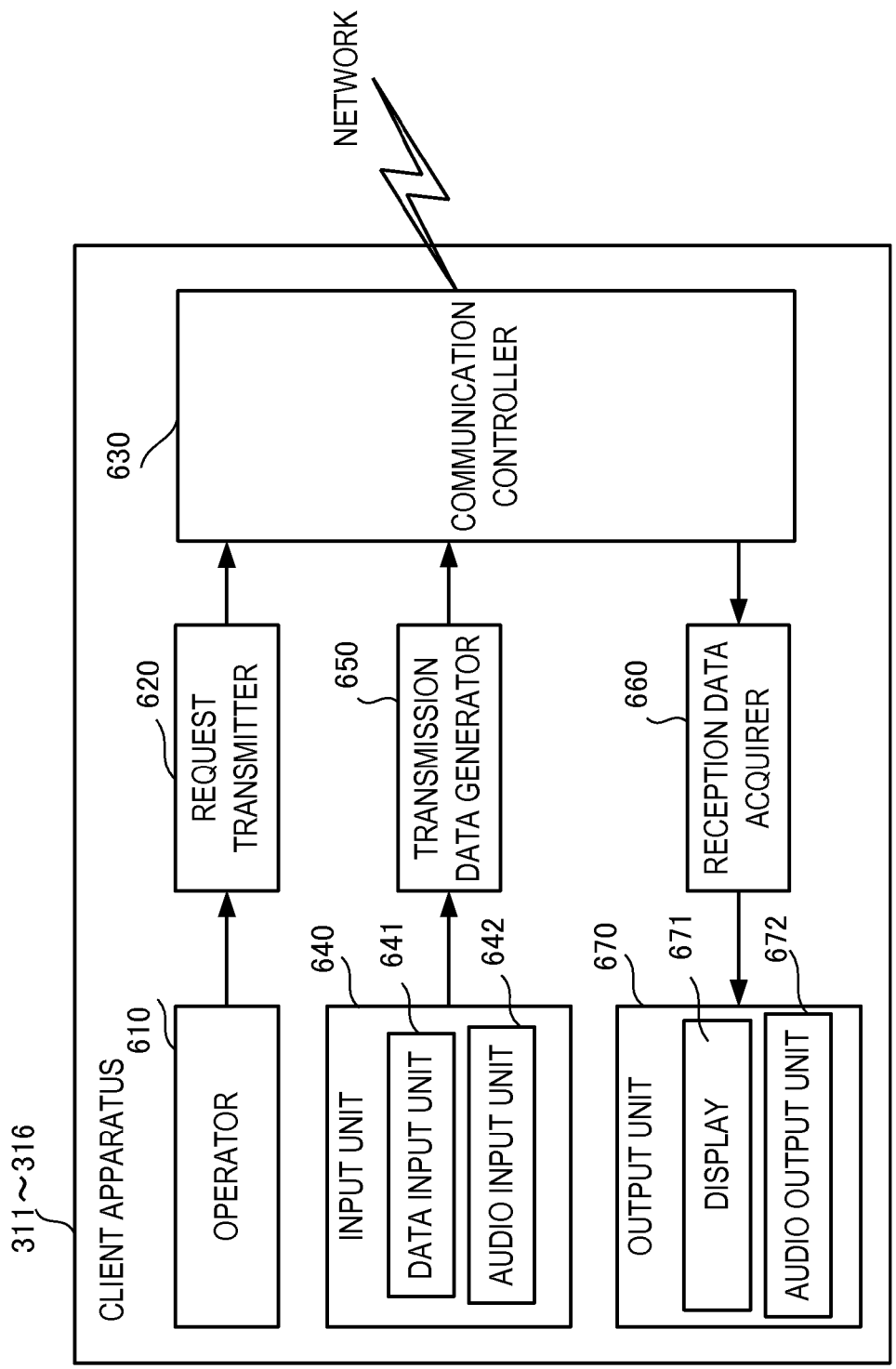
FIG. 6 is a block diagram showing the functional arrangement of a client apparatus according to the second embodiment of the present invention.

FIG. 6 is a block diagram showing the functional arrangement of the client apparatuses 311 to 316 according to this embodiment.

Each of the client apparatuses 311 to 316 includes an operator 610 formed from a touch panel, a keyboard, and the like, a display 671 and an audio output unit 672 which serve as an output unit 670 configured to output information to the client, and a data input unit 641 and an audio input unit 642 which serve as an input unit 640 through which the client inputs information.

An instruction of the client input from the operator 610 is sent to a request transmitter 620. The request transmitter 620 receives a program installation request or an installed program execution request from the client, generates a corresponding request message, and transmits it to the cloud server 220 via a communication controller 630. Pieces of necessary information such as a client ID, a client apparatus ID, program purchase information, and program data are added to the request message.

A transmission data generator converts data input from the input unit 640 into transmission data and transmits it to the cloud server 220 via the communication controller 630. A reception data acquirer acquires reception data received from the cloud server 220 via the communication controller 630 and converts it into output data outputtable to the output unit 670.

(Client DB)

FIG. 7 is a view showing the arrangement of the client DB 321 according to this embodiment. Note that the arrangement of the client DB 321 shown in FIG. 7 is merely an example, and is not limited to this.

The client DB 321 includes a client information DB 710 that stores client information, and a contract level DB 720 that holds the contract levels of clients.

The client information DB 710 stores authentication information 712 such as a password and an authentication ID and a contract level 713 also serving as a service level in the cloud server 220 in association with a client ID 711.

The contract level DB 720 stores, in association with a contract level 721, virtual application execution 722, program virtual installation 723, virtual PC construction 724, and a program/data storage period 725 which are the contents of the contract level. Here, ○ indicates that the service is provided, and x indicates that the service is not provided.

(Client Apparatus DB)

Figure 8:
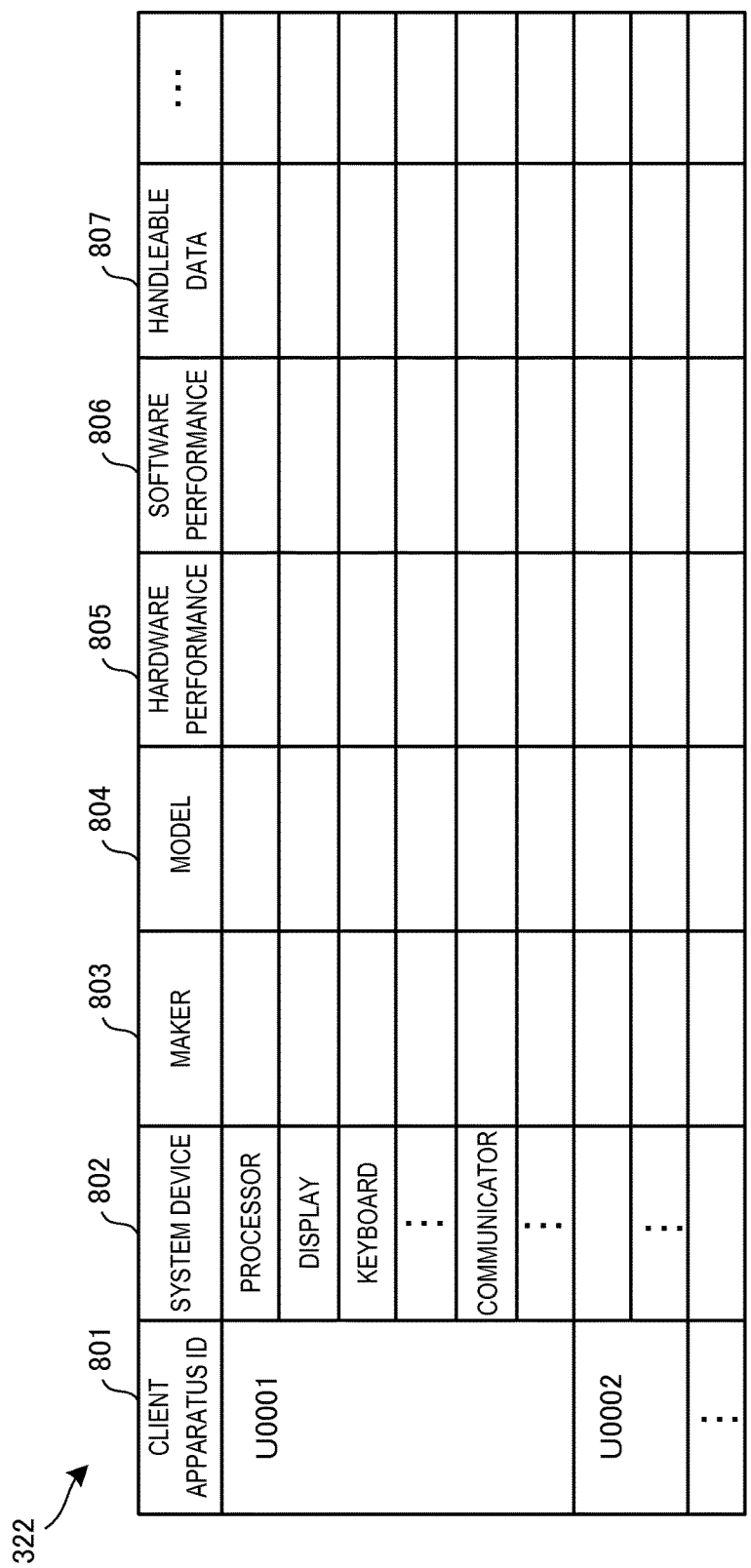
FIG. 8 is a view showing the arrangement of a client apparatus DB according to the second embodiment of the present invention.

FIG. 8 is a view showing the arrangement of the client apparatus DB 322 according to this embodiment. Note that the arrangement of the client apparatus DB 322 shown in FIG. 8 is merely an example, and is not limited to this.

The client apparatus DB 322 stores a system device 802 that is a constituent element of a client apparatus in association with a client apparatus ID 801. The system device 802 includes a device such as an input/output device and a component such as a CPU or a memory.

A maker 803, a model 804, hardware performance 805, software performance 806, and handleable data 807 are stored in association with each system device 802. These pieces of information are used by the cloud server 220 to convert a communication protocol when communicating with a client apparatus or a command system or data format when inputting/outputting data, and the like in accordance with the client apparatus.

(Installed Program DB)

Figure 9:
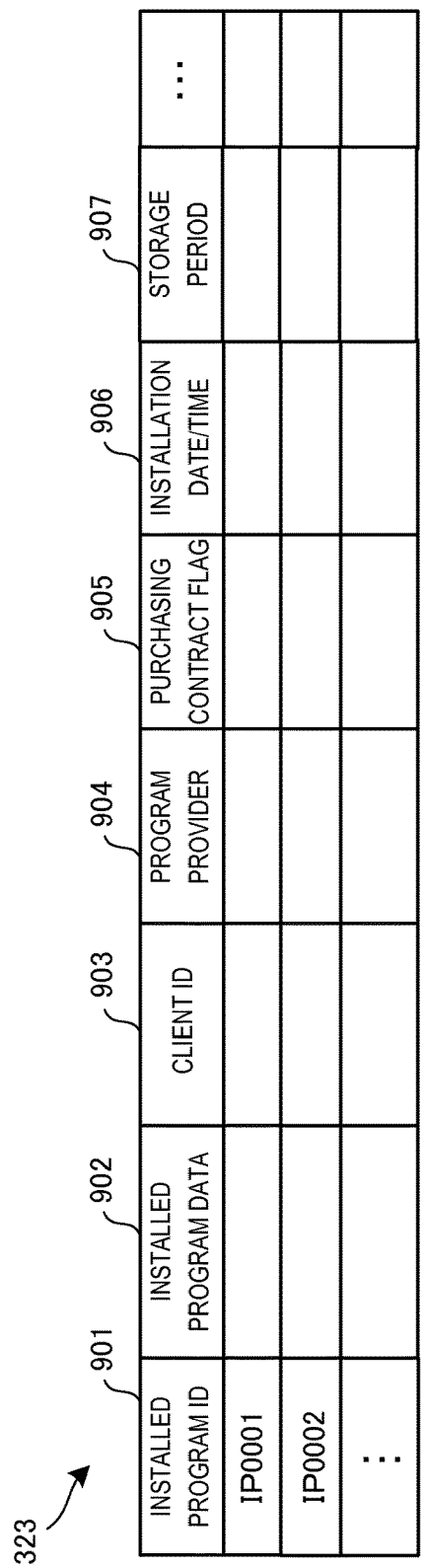
FIG. 9 is a view showing the arrangement of an installed program DB according to the second embodiment of the present invention.

FIG. 9 is a view showing the arrangement of the installed program DB 323 according to this embodiment. Note that the arrangement of the installed program DB 323 shown in FIG. 9 is merely an example, and is not limited to this.

The installed program DB 323 stores installed program data 902, a client ID 903 of a client who has the ownership of the program, a program provider 904, a purchasing contract flag 905 an installation date/time 906, and a storage period 907 in association with an installed program ID 901. Note that the program provider 904 may be the program distribution server 230.

<<Hardware Arrangement of Cloud Server>>

Figure 10:
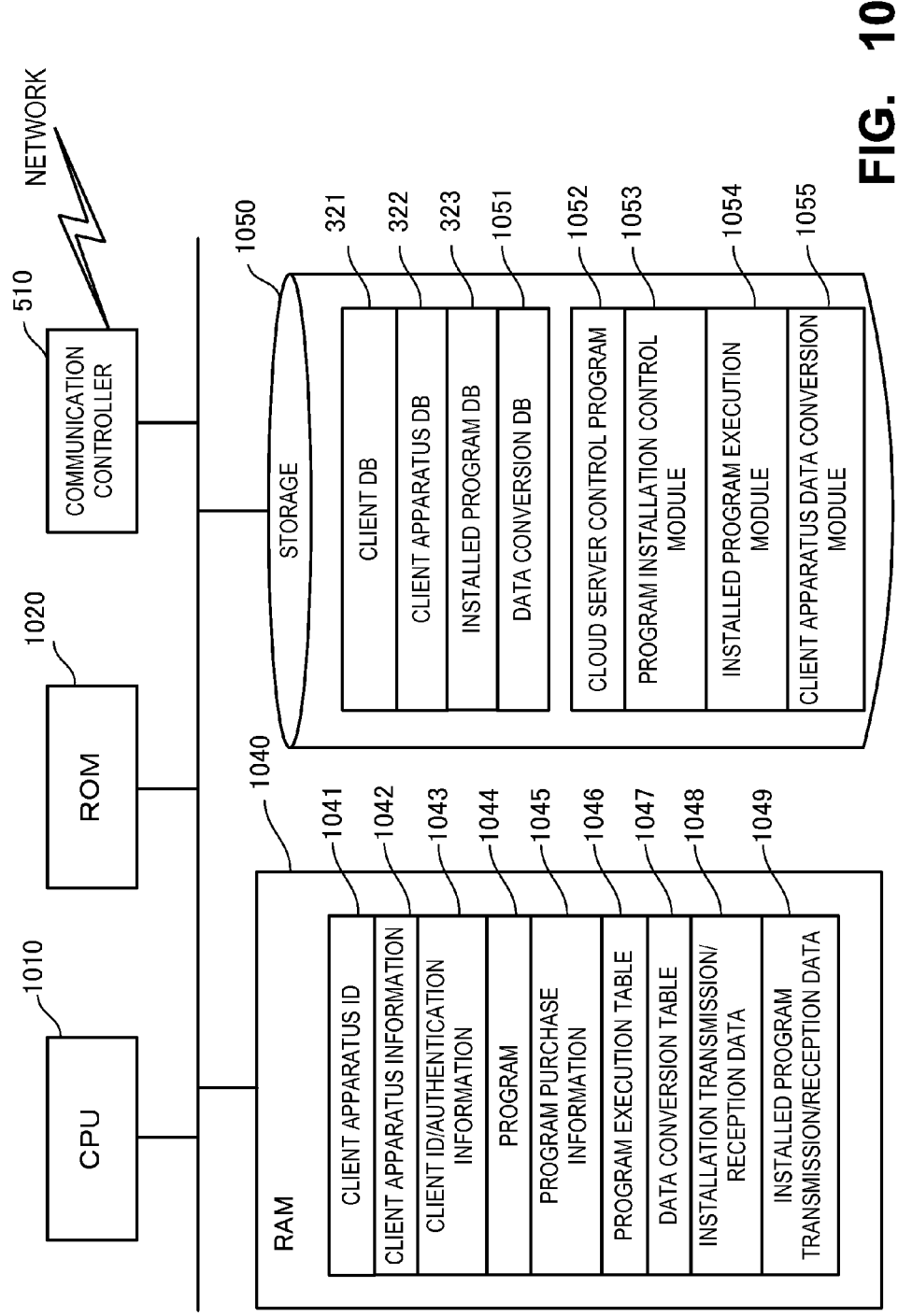
FIG. 10 is a block diagram showing the hardware arrangement of the cloud server according to the second embodiment of the present invention.

FIG. 10 is a block diagram showing the hardware arrangement of the cloud server 220 according to this embodiment.

Referring to FIG. 10, a CPU 1010 is a processor for arithmetic control, and implements each functional component of the cloud server 220 shown in FIG. 5 by executing a program. A ROM 1020 stores initial data, permanent data of programs and the like, and programs. The communication controller 510 is a communication controller, and in this embodiment, communicates with the client apparatuses 311 to 316 or the program distribution server 230 via the network 340. Note that the number of CPUs 1010 is not limited to one, and the CPU 1010 may include a plurality of CPUs or a GPU (Graphics Processing Unit) for image processing.

A RAM 1040 is a random access memory used by the CPU 1010 as a work area for temporary storage. An area to store data necessary for implementation of the embodiment is allocated to the RAM 1040. A client apparatus ID 1041 is the identifier of a client apparatus under communication. Client apparatus information 1042 is information including the capability information of the client apparatus under communication and devices included in it. Client ID/authentication information 1143 is data of the client ID and authentication information of a client who has requested program installation or installed program execution. A program 1044 is a program requested by the client to be installed. Program purchase information 1045 is information certifying that the client has purchased the program 1044. A program execution table 1046 is a table used to manage execution of the installed program at the time of execution. A data conversion table 1047 is a table used to adjust the difference in the protocol or data format with respect to the client apparatus that is communicating with the cloud server 220. Installation transmission/reception data 1048 is data transmitted/received to/from the client apparatus during program installation. Installed program transmission/reception data 1049 is data transmitted/received to/from the client apparatus during installed program execution.

A storage 1050 stores databases, various kinds of parameters, and following data and programs necessary for implementation of the embodiment. The client DB 321 is the database shown in FIG. 7. The client apparatus DB 322 is the database shown in FIG. 8. The installed program DB 323 is the database shown in FIG. 9. A data conversion DB 1051 is a database that stores conversion of a protocol, data format, and the like between communicating apparatuses in association with the combination of apparatuses.

The storage 1050 stores the following programs. A cloud server control program 1052 is a program that controls the entire cloud server 220. A program installation control module 1053 is a module configured to install a client-owned program requested by the client in the cloud server 220 in the cloud server control program 1052 (see FIG. 13A). An installed program execution module 1054 is a module that virtually executes the installed program on behalf of the client apparatus in the cloud server control program 1052 (see FIG. 13B). A client apparatus data conversion module 1055 is a module for protocol conversion/data conversion which enables information exchange between the client apparatus and the cloud server 220 during program installation and installed program execution in the cloud server control program 1052.

Note that FIG. 10 shows data and programs associated with this embodiment but not general-purpose data and programs in the cloud server.

(Data Conversion DB)

Figure 11A:
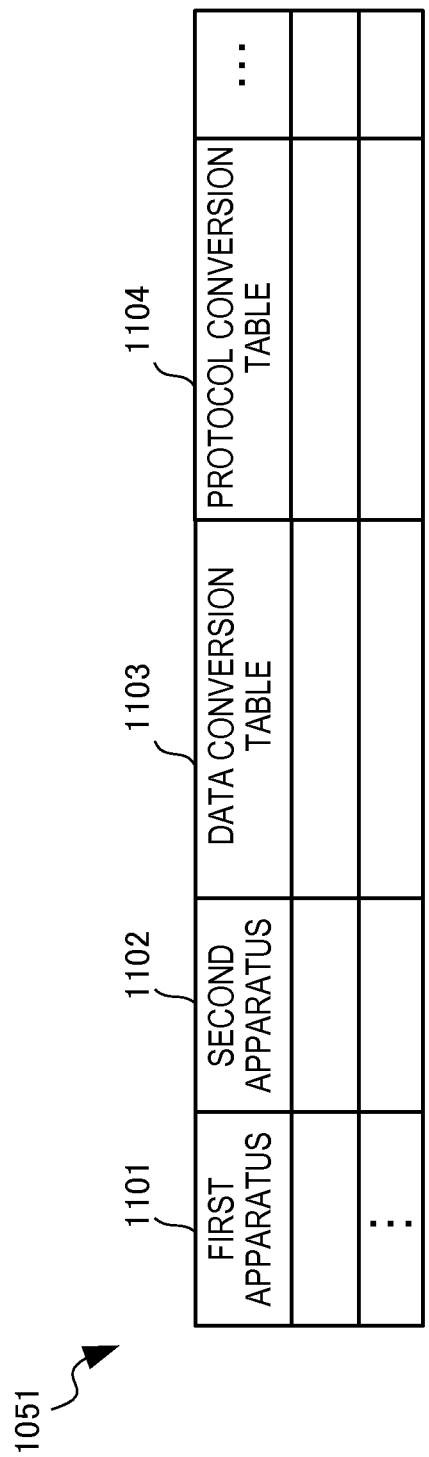
FIG. 11A is a view showing the arrangement of a data conversion DB according to the second embodiment of the present invention.

FIG. 11A is a view showing the arrangement of the data conversion DB 1051 according to this embodiment.

The data conversion DB 1051 stores a data conversion table 1103 for data conversion and a protocol conversion table 1104 for protocol conversion in association with a combination of a first apparatus 1101 and a second apparatus 1102.

(Program Execution Table)

Figure 11B:
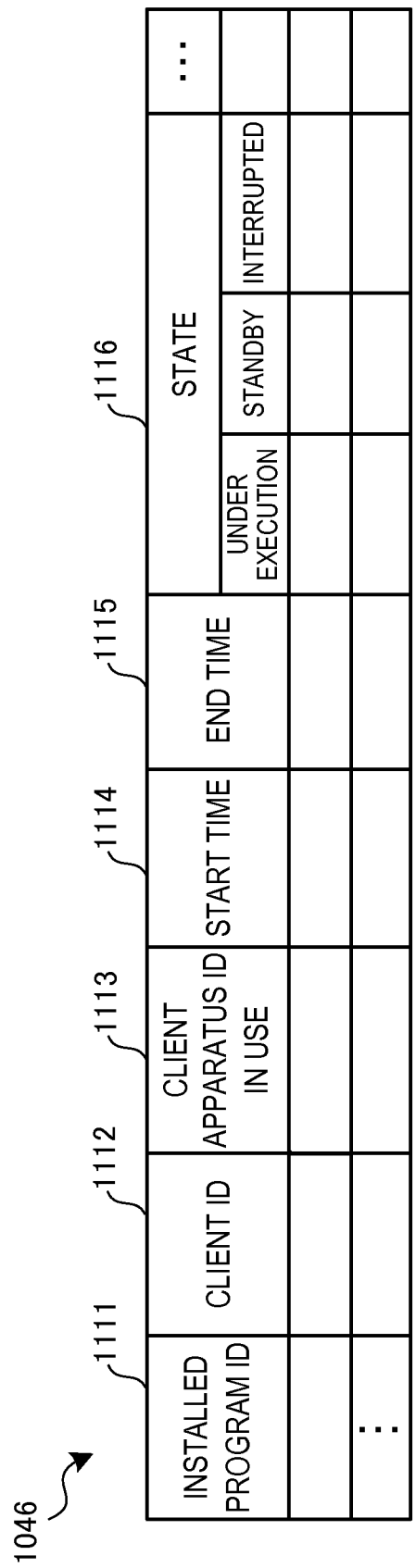
FIG. 11B is a view showing the arrangement of a program execution table according to the second embodiment of the present invention.

FIG. 11B is a view showing the arrangement of the program execution table 1046 according to this embodiment.

The program execution table 1046 stores a client apparatus ID 1113 currently in use, a start time 1114 and end time 1115 of execution, and a program state 1116 indicating under execution, standby, or interrupted in association with a stalled program ID 1111 and a client ID 1112.

(Data Conversion Table)

Figure 11C:
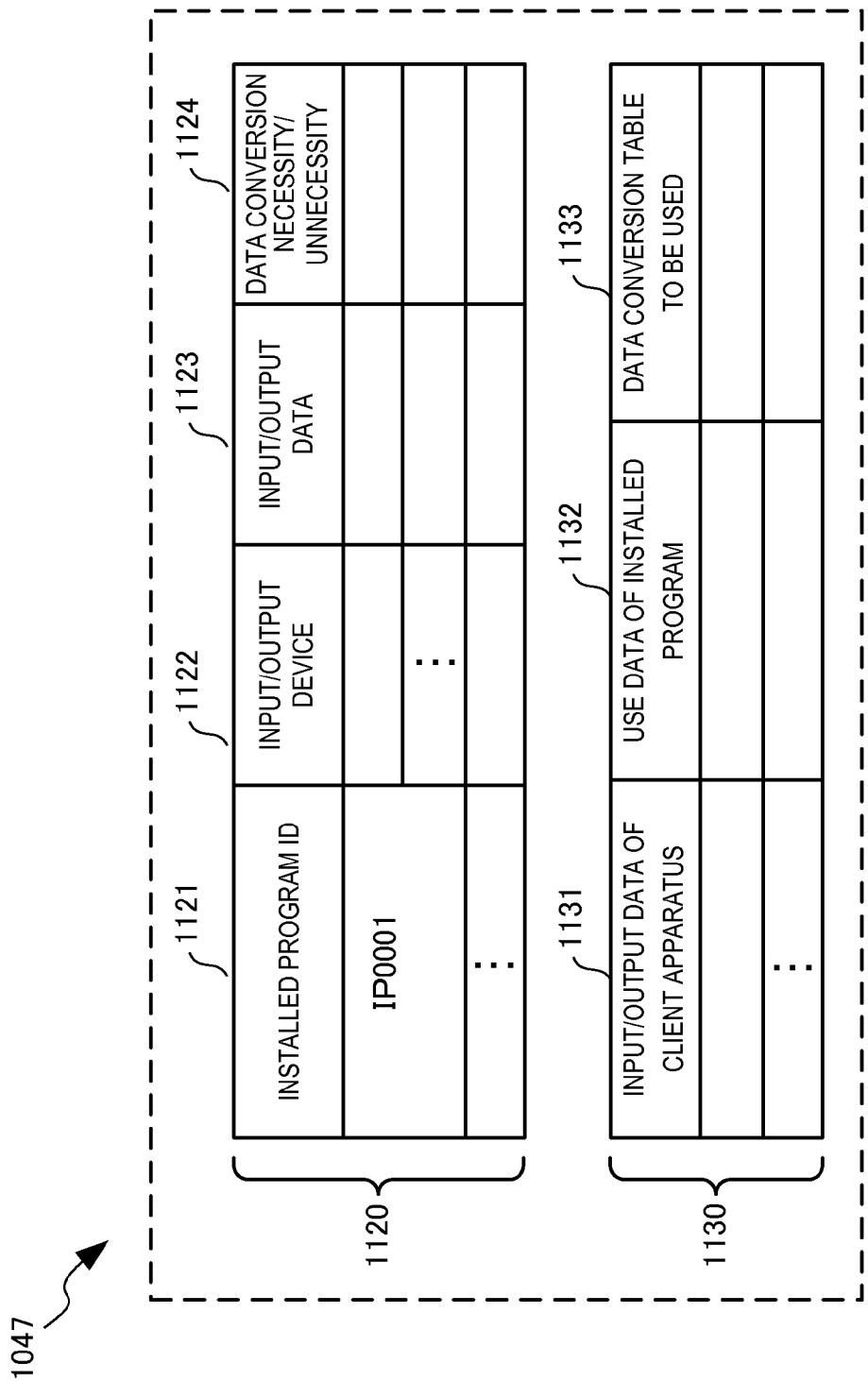
FIG. 11C is a view showing the arrangement of a data conversion table according to the second embodiment of the present invention.

FIG. 11C is a view showing the arrangement of the data conversion table 1047 according to this embodiment.

The data conversion table 1047 includes a conversion necessity/unnecessity table 1120 that stores the necessity/unnecessity of data conversion between an installed program and an input/output device included in a client apparatus, and a conversion data table 1130 that stores data conversion tables to be used. The conversion necessity/unnecessity table 1120 stores an input/output device 1122 included in a client apparatus under communication in correspondence with an installed program ID 1121. The conversion necessity/unnecessity table 1120 also stores input/output data 1123 corresponding to the input/output device 1122 and data conversion necessity/unnecessity 1124 determined from the combination result. The conversion data table 1130 stores a data conversion table 1133 to be used which is determined by referring to the data conversion DB 1051 based on the combination of input/output data 1131 of the client apparatus and use data 1132 of the installed program.

Note that an installed program has been described with reference to FIG. 11C. However, even in a program before installation, the data conversion table 1047 is similarly used when data conversion is necessary between the cloud server and the client apparatus.

<<Processing Procedure of Cloud Server>>

Figure 12:
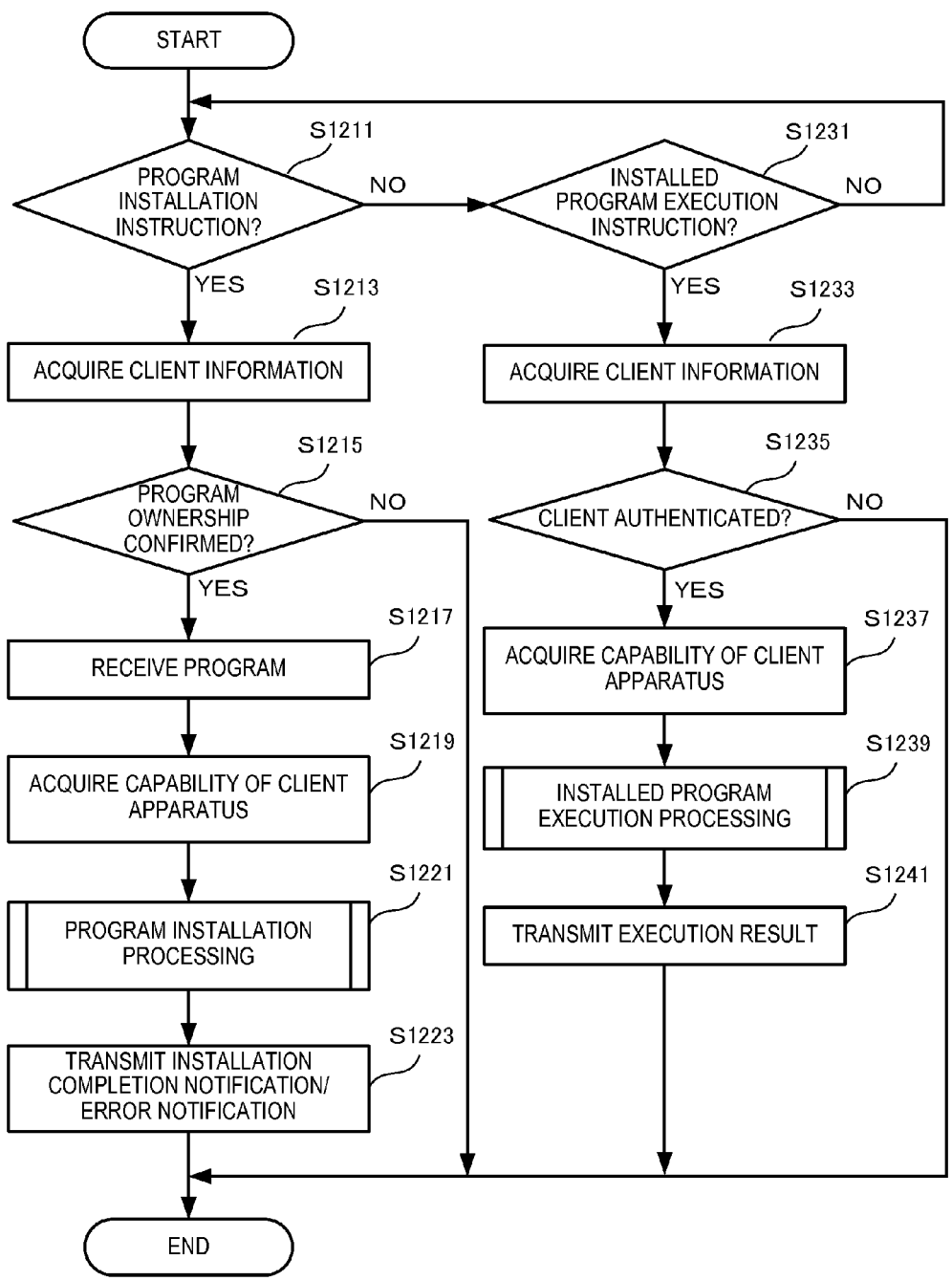
FIG. 12 is a flowchart showing the processing procedure of the cloud server according to the second embodiment of the present invention.

FIG. 12 is a flowchart showing the processing procedure of the cloud server 220 according to this embodiment. This flowchart is executed by the CPU 1010 shown in FIG. 10 using the RAM 1040 and implements the functional components shown in FIG. 5. This flowchart starts in accordance with occurrence of an event such as reception from a client apparatus.

First, in step S1211, the cloud server 220 determines whether a program installation instruction is received from the client apparatus. Additionally, in step S1231, the cloud server 220 determines whether an installed program execution instruction is received from the client apparatus.

For a program installation instruction, the cloud server 220 advances to step S1213, and acquires client information. In step S1215, the cloud server 220 confirms based on program purchase information included in the acquired client information whether the client owns the program instructed to be installed. That is, the cloud server 220 confirms data representing that the client has already purchased the program. If the ownership cannot be confirmed, the cloud server 220 ends the processing without installing the program.

If the ownership of the client is confirmed, the cloud server 220 advances to step S1217, and receives the program to be installed from the client apparatus. Next, in step S1219, the cloud server 220 acquires the capability of the client apparatus. Note that the client information, the program, and the capability of the client apparatus may simultaneously be received from the client apparatus by one message. In step S1221, the cloud server 220 executes program installation processing (see FIG. 13A). When program installation is completed, the cloud server 220 transmits an installation completion notification or an error notification to the client apparatus in step S1223, and ends the installation processing.

On the other hand, for an installed program execution instruction, the cloud server 220 advances to step S1233, and acquires client information. In step S1235, the cloud server 220 authenticates the client based on client authentication information included in the acquired client information. If the client cannot be authenticated, the cloud server 220 ends the processing without executing the installed program.

If the client is authenticated, the cloud server 220 advances to step S1237, and acquires the capability of the client apparatus. Note that the client information and the capability of the client apparatus may simultaneously be received from the client apparatus by one message. In step S1239, the cloud server 220 executes installed program execution processing (see FIG. 13B). When installed program execution has ended, the cloud server 220 transmits the execution result to the client apparatus in step S1241, and ends the installed program execution processing.

(Program Installation Processing)

Figure 13A:
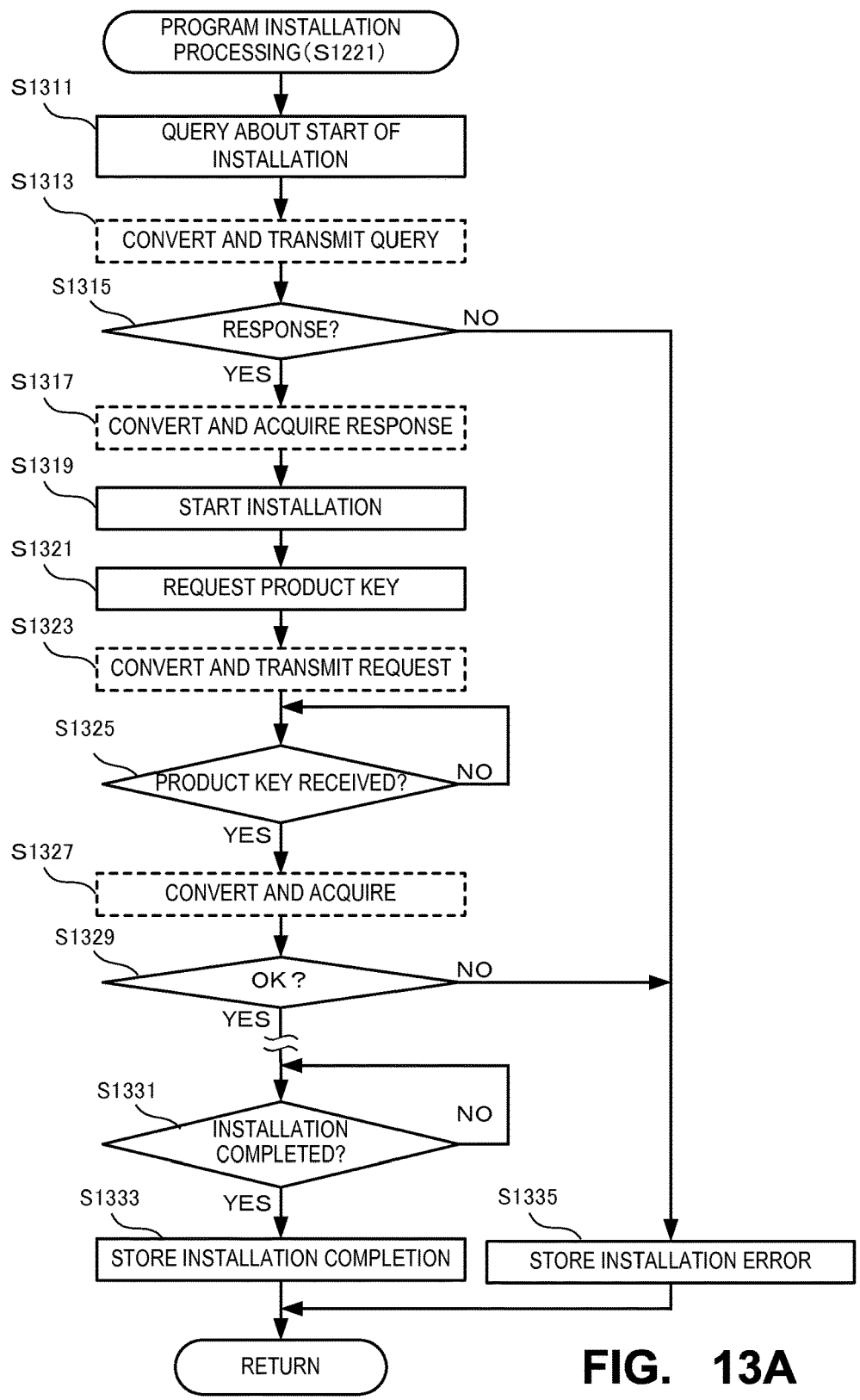
FIG. 13A is a flowchart showing the processing procedure of program installation processing according to the second embodiment of the present invention.

FIG. 13A is a flowchart showing the processing procedure of program installation processing S1221 according to this embodiment. In this embodiment, during the procedure of program installation, the client who operates the client apparatus performs the operation procedure as if the program were installed in the client apparatus. That is, in this embodiment, the installation processing is not wholly delegated to the cloud server 220.

Note that FIG. 13A illustrates only the initial procedure of program installation processing. Since the characteristic processing of this embodiment can be explained by the procedure alone, the subsequent procedure will be omitted. In FIG. 13A, steps where data conversion between the cloud server 220 and the client apparatus is necessary are indicated by broken lines. If data exchange is possible without data conversion, the data conversion of the steps indicated by the broken lines is skipped.

First, in step S1311, the cloud server 220 transmits a query screen to be used by the client who operates the client apparatus to instruct the start of installation. In this case, if data conversion is necessary, the cloud server 220 changes the query screen and transmits it in step S1313. In step S1315, the cloud server 220 waits for a response from the client. If no response is received, the cloud server 220 stores an installation error in step S1335.

Upon receiving an installation start instruction response from the client apparatus, the cloud server 220 advances to step S1319, and starts installing the program. In this case as well, if data conversion is necessary, the cloud server 220 converts the response data into data analyzable by the program in step S1317. When installing the program from a CD/DVD, the cloud server 220 demands product key input by the client from the client apparatus in step S1321. In this case as well, if data conversion is necessary, the cloud server 220 changes the product key demand screen and transmits it in step S1323. In step S1325, the cloud server 220 waits for reception of the product key input by the client. Upon receiving the product key, the cloud server 220 determines in step S1329 whether the product key corresponds to the product key attached to the program to be installed. In this case as well, if data conversion is necessary, the cloud server 220 converts the response data into data analyzable by the program in step S1327.

Upon determining in step S1329 that the product key does not correspond, the cloud server 220 transmits an installation error to the client apparatus in step S1333. Upon determining in step S1329 that the product key corresponds, the cloud server 220 advances to the next step of the installation procedure. As described above, the subsequent installation procedure will be omitted. In step S1331, the cloud server 220 determines whether the installation is completed. If the installation is completed, the cloud server 220 stores installation completion in step S1333 and returns.

(Installed Program Execution Processing)

Figure 13B:
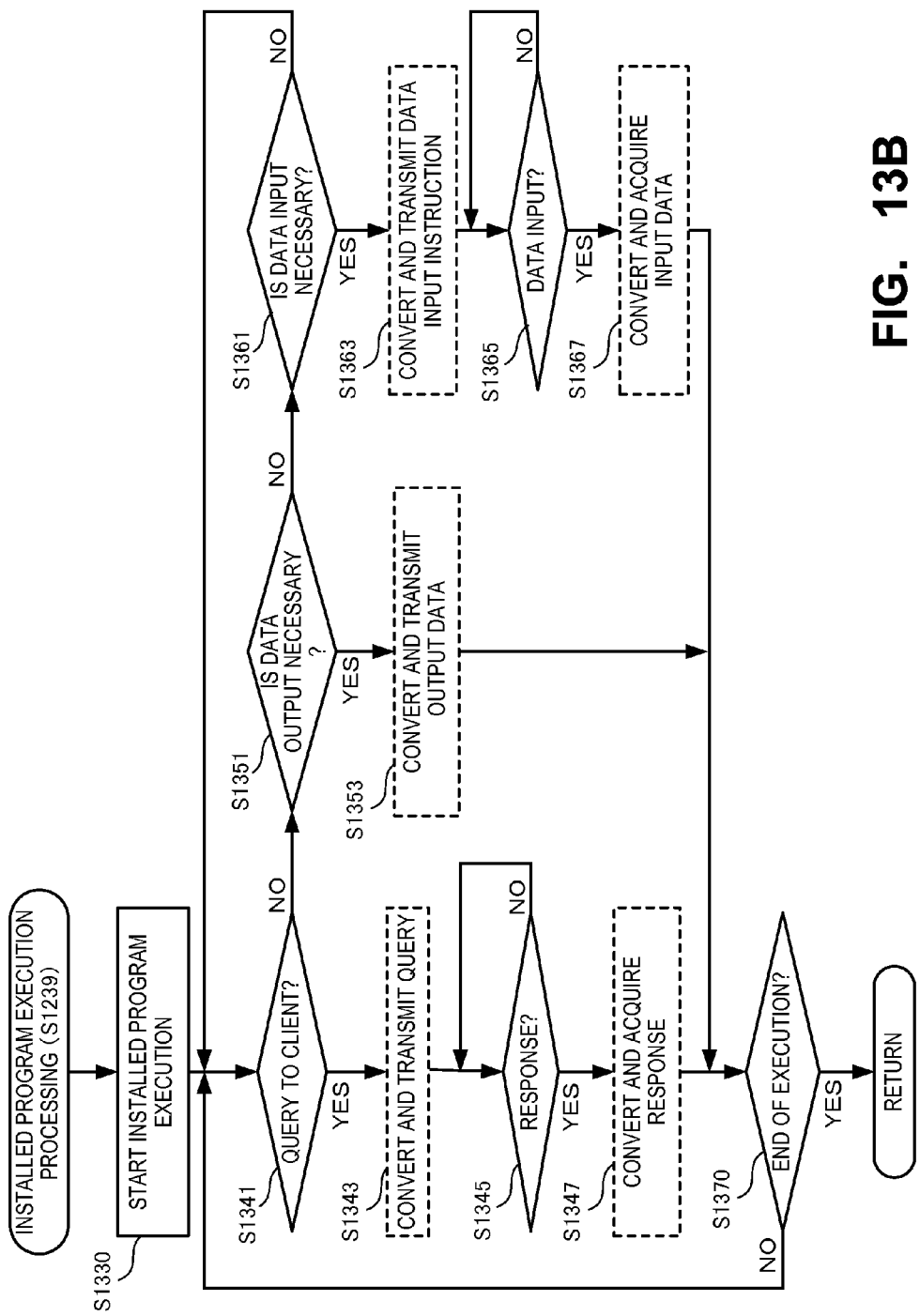
FIG. 13B is a flowchart showing the processing procedure of installed program execution processing according to the second embodiment of the present invention.

FIG. 13B is a flowchart showing the processing procedure of installed program execution processing S1239 according to this embodiment. In this embodiment, during the procedure of installed program execution, if a client operation from the client apparatus is necessary or data exchange with the client apparatus is to be performed, processing is performed as if the client were operating the client apparatus. Note that in FIG. 13B, steps where data conversion between the cloud server 220 and the client apparatus is necessary are indicated by broken lines, as in FIG. 13A. If data exchange is possible without data conversion, the data conversion of the steps indicated by the broken lines is skipped.

First, in step S1330, the cloud server 220 starts executing the installed program. In step S1341, the cloud server 220 determines whether a query to the client exists. Additionally, in step S1351, the cloud server 220 determines whether data output to the client apparatus is necessary. Furthermore, in step S1361, the cloud server 220 determines whether data input from the client apparatus is necessary.

If a query from the installed program to the client exists, the cloud server 220 transmits the query to the client apparatus in step S1343, and waits for a response from the client apparatus in step S1345. If data conversion is necessary, the cloud server 220 converts the data and transmits it to the client apparatus in step S1343. Upon receiving a response to the query, the cloud server 220 acquires the response in step S1347. In this case as well, if data conversion is necessary, the cloud server 220 converts the data and acquires it in step S1347.

If data output from the installed program to the client apparatus exists, the cloud server 220 advances to step S1353, and outputs the data to the client apparatus. If data conversion is necessary, the cloud server 220 converts the data and transmits it to the client apparatus in step S1353.

If data input from the installed program to the client apparatus is demanded, the cloud server 220 advances to step S1363, and transmits the data input instruction to the client apparatus. If data conversion is necessary, the cloud server 220 converts the data and transmits it to the client apparatus in step S1363. In step S1365, the cloud server 220 waits for data input from the client apparatus. If data is input, the cloud server 220 acquires the input data in step S1367. In this case as well, if data conversion is necessary, the cloud server 220 converts the data and acquires it in step S1367.

<<Hardware Arrangement of Client Apparatus>>

Figure 14:
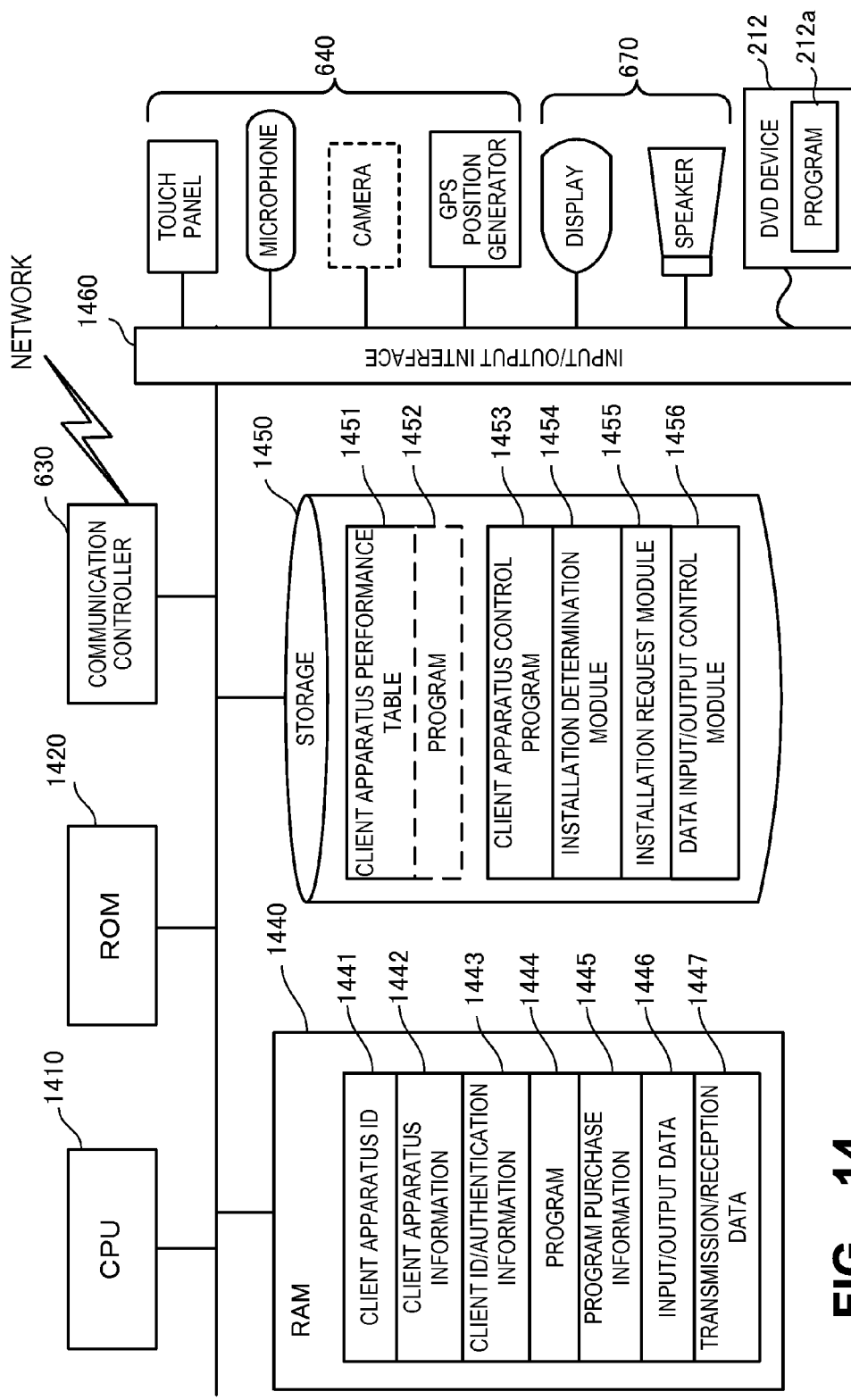
FIG. 14 is a block diagram showing the hardware arrangement of the client apparatus according to the second embodiment of the present invention.

FIG. 14 is a block diagram showing the hardware arrangement of the client apparatuses 311 to 316 according to this embodiment.

Referring to FIG. 14, a CPU 1410 is a processor for arithmetic control, and implements each functional component of the client apparatuses 311 to 316 shown in FIG. 6 by executing a program. A ROM 1420 stores initial data, permanent data of programs and the like, and programs. The communication controller 630 is a communication controller, and in this embodiment, communicates with the cloud server 220 via the network. Note that the number of CPUs 1410 is not limited to one, and the CPU 1410 may include a plurality of CPUs or a GPU for image processing.

A RAM 1440 is a random access memory used by the CPU 1410 as a work area for temporary storage. An area to store data necessary for implementation of the embodiment is allocated to the RAM 1440. A client apparatus ID 1441 is the identifier of the client apparatus. Client apparatus information 1442 is information such as the arrangement and performance of the client apparatus. Client ID/authentication information 1443 is data of the client ID and authentication information input by the client. A program 1444 is a program requested to be installed by the cloud server 220. Program purchase information 1445 is information certifying that the client has already purchased the program 1444. Input/output data 1446 indicates input/output data input/output via an input/output interface 1460. Transmission/reception data 1447 is transmission/reception data transmitted/received via the communication controller 630.

A storage 1450 stores databases, various kinds of parameters, and following data and programs necessary for implementation of the embodiment. A client apparatus performance table 1451 is a table that stores the performance of each constituent element of the client apparatus (see FIG. 15). A program 1452 is a program stored when the client apparatus can load the program to be installed. The storage 1450 stores the following programs. A client apparatus control program 1453 is a control program that controls the entire client apparatuses 311 to 316. An installation determination module 1454 is a module that determines whether a program could/can be installed in the client apparatus, included in the client apparatus control program 1453. An installation request module 1455 is a module that requests the cloud server 220 to install a program, included in the client apparatus control program 1453. A data input/output control module 1456 is a module that controls data input/output to/from input/output devices via the input/output interface 1460.

The input/output interface 1460 interfaces input/output data to/from input/output devices. The input unit 640 such as a touch panel, a microphone, a camera, or a GPS (Global Positioning System) position generator is connected to the input/output interface 1460. The output unit 670 such as a display or a speaker is also connected to the input/output interface 1460. In addition, the DVD device 212 that reads out a program from the storage medium 212a storing the program to be installed is connected to the input/output interface 1460.

Note that FIG. 14 shows data and programs associated with this embodiment but not general-purpose data and programs in the client apparatus.

(Client Apparatus Performance Table)

Figure 15:
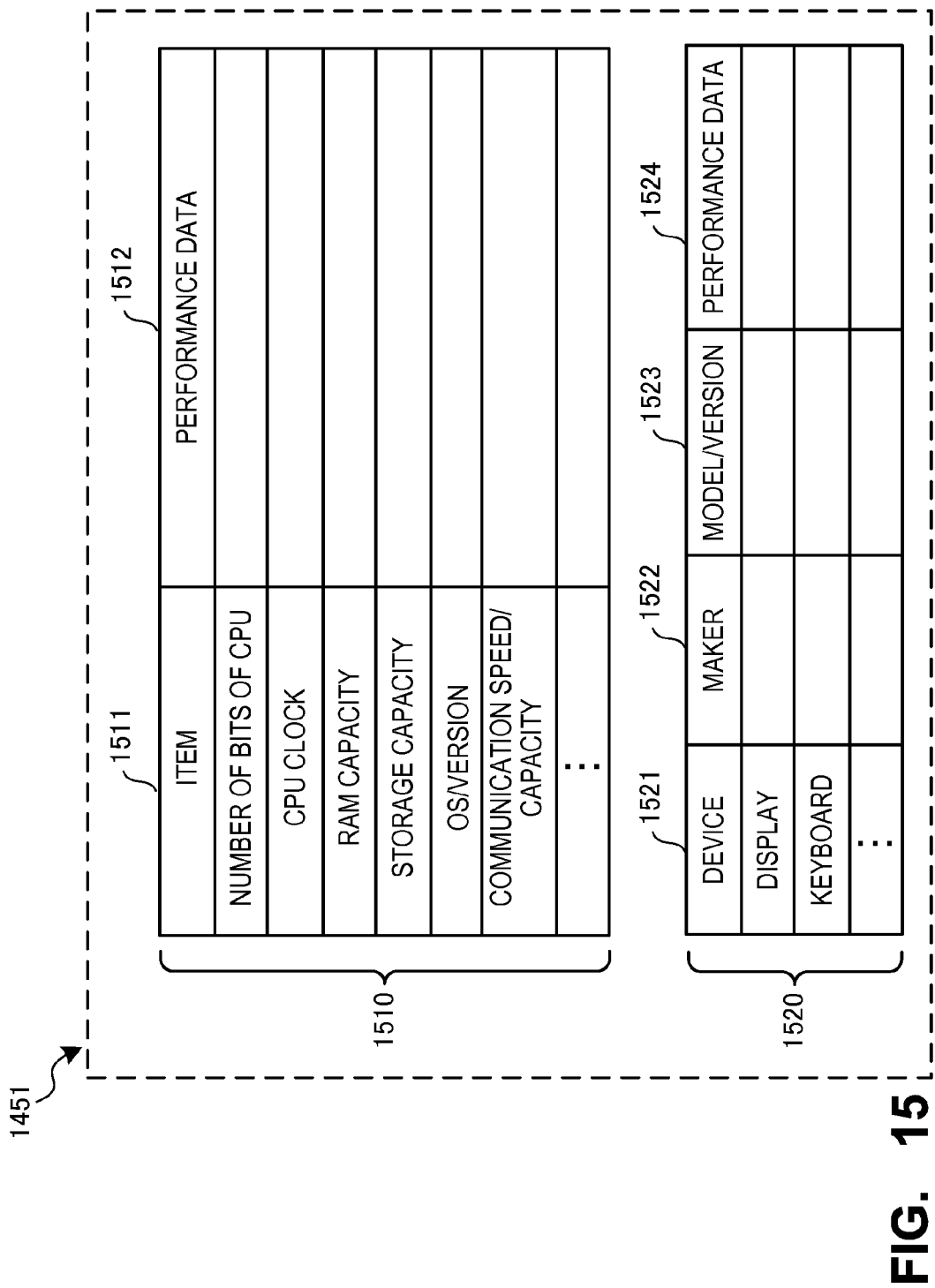
FIG. 15 is a view showing the arrangement of a client apparatus performance table of the client apparatus according to the second embodiment of the present invention.

FIG. 15 is a view showing the arrangement of the client apparatus performance table 1451 of the client apparatuses 311 to 316 according to this embodiment.

The client apparatus performance table 1451 includes an operation condition table 1510 that shows the operation conditions of the client apparatus as performance, and a device performance table 1520 that shows the performance of devices included in the client apparatus. The operation condition table 1510 stores performance data 1512 about each item 1511. The device performance table 1520 stores a maker 1522, a model/version 1523, and performance data 1524 in association with each device 1521.

<<Processing Procedure of Client Apparatus>>

Figure 16:
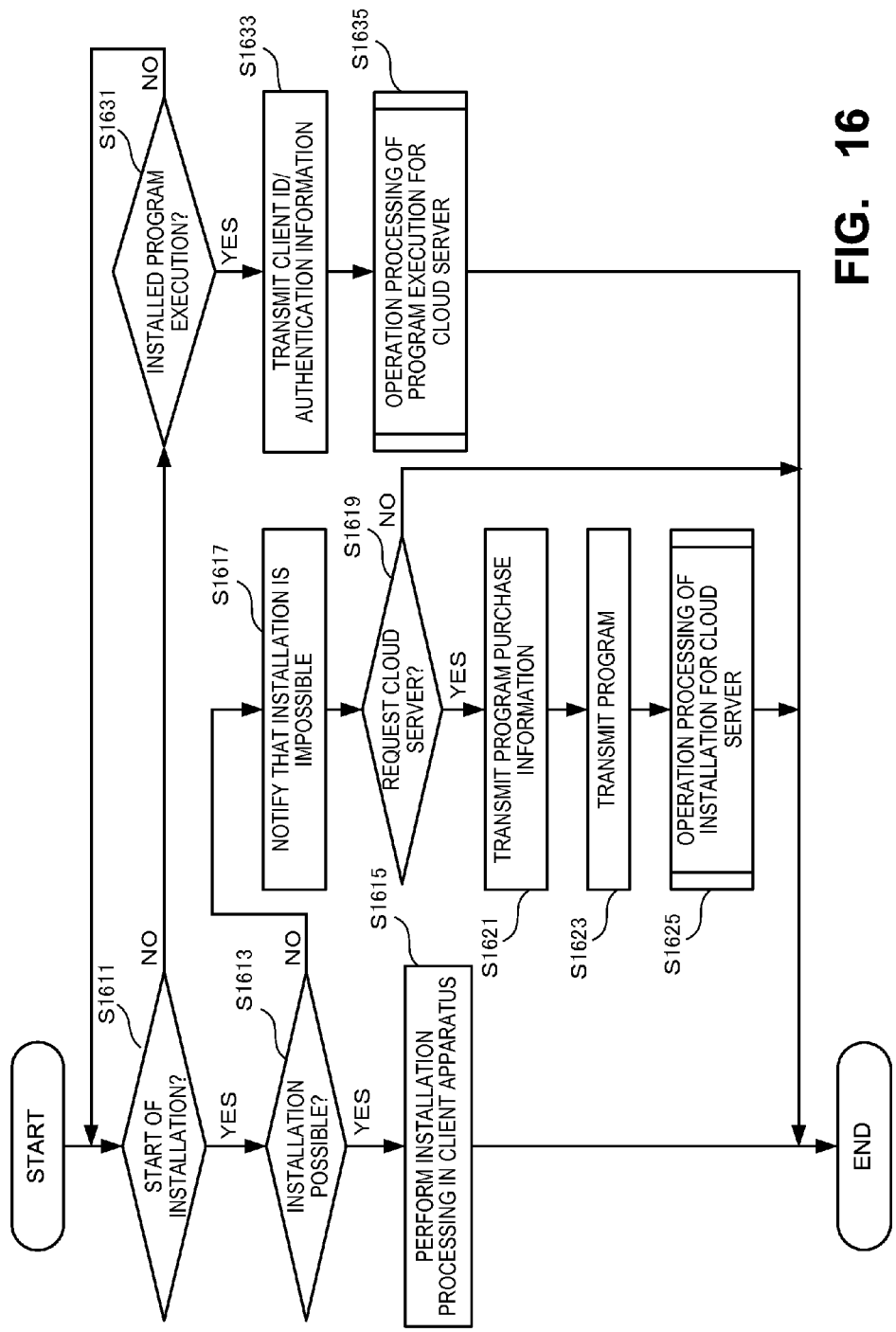
FIG. 16 is a flowchart showing the processing procedure of the client apparatus according to the second embodiment of the present invention.

FIG. 16 is a flowchart showing the processing procedure of the client apparatuses 311 to 316 according to this embodiment. This flowchart is executed by the CPU 1410 shown in FIG. 14 using the RAM 1440 and implements the functional components shown in FIG. 6. This flowchart starts in accordance with occurrence of an event such as the start of program installation or an installed program execution instruction.

First, in step S1611, the client apparatus determines whether to start installing a desired program. Additionally, in step S1631, the client apparatus determines whether to instruct installed program execution.

To start installing a desired program, the client apparatus advances to step S1613, and determines whether installation is possible. If installation is possible, the client apparatus advances to step S1615, and executes installation processing in the client apparatus.

If installation is impossible, the client apparatus advances to step S1617, and notifies the client that installation is impossible (see the left view of FIG. 2). Next, in step S1619, the client apparatus determines whether the client has performed an operation of requesting the cloud server 220 to install the program that cannot be installed (see the central view of FIG. 2). If the client has not performed the request operation, the client apparatus ends the processing.

If the client requests installation in the cloud server 220, the client apparatus advances to step S1621, and transmits program purchase information certifying the purchase of the program to the cloud server 220. The client apparatus transmits the program requested to be installed. Note that the program purchase information and the program may be transmitted by one message. In step S1625, the client apparatus performs, for the cloud server 220, operation processing necessary for installation (see FIG. 17A). Note that when the cloud server 220 performs automatic installation processing without the client operation from the client apparatus, step S1625 is skipped.

To instruct installed program execution, the client apparatus advances to step S1633, and transmits the client ID and client authentication information to the cloud server 220. In step S1635, the client apparatus performs, for the cloud server 220, operation processing necessary for installed program execution (see FIG. 17B). Note that when the cloud server 220 performs automatic program execution processing without the client operation from the client apparatus, step S1635 is skipped.

(Installation Operation Processing)

Figure 17A:
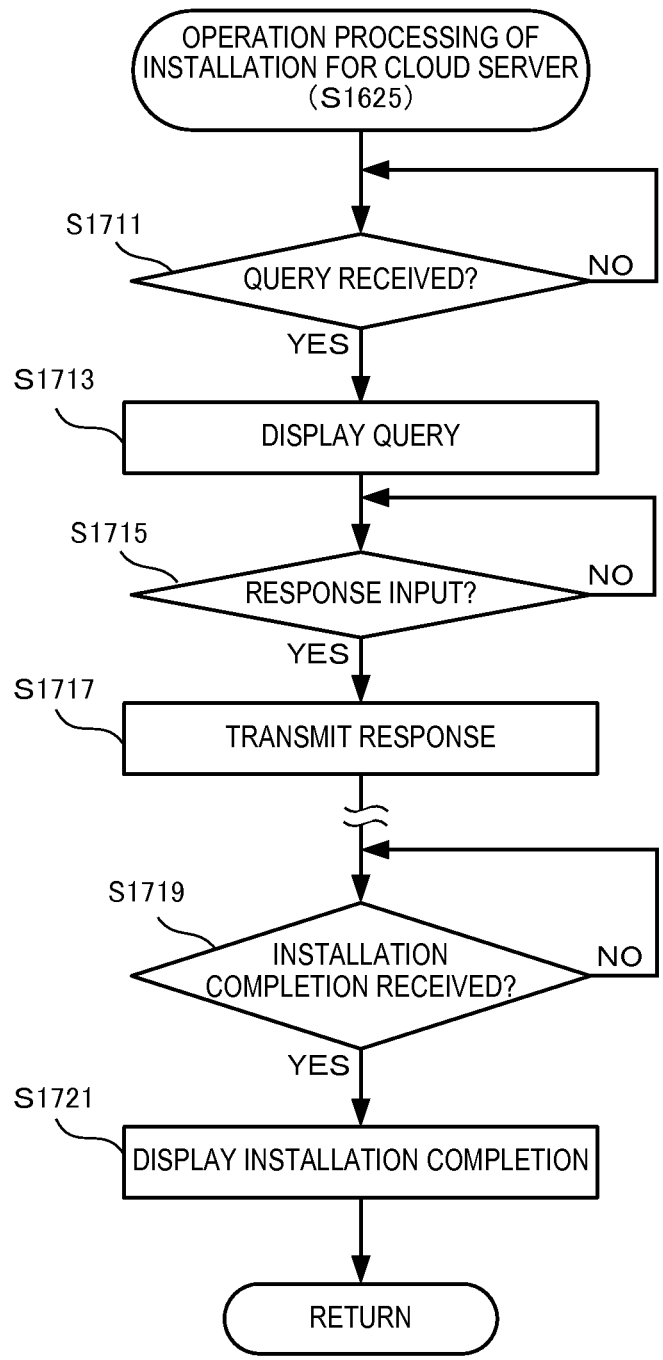
FIG. 17A is a flowchart showing the processing procedure of installation operation processing for the cloud server according to the second embodiment of the present invention.

FIG. 17A is a flowchart showing the processing procedure of installation operation processing S1625 for the cloud server according to this embodiment.

In step S1711, the client apparatus waits for reception of a query from the cloud server 220. Upon receiving a query, the client apparatus advances to step S1713, and displays the query on the display 671 (see the right view of FIG. 2). In step S1715, the client apparatus waits for a client's response input to the query. If a client's response is input, the client apparatus advances to step S1717, and transmits the response input to the cloud server 220. From then on, the client apparatus repeats necessary query/response, although not illustrated in FIG. 17A.

In step S1719, the client apparatus waits for an installation completion notification from the cloud server 220. Upon receiving an installation completion notification, the client apparatus advances to step S1721, and displays the installation completion on the display 671.

Note that the client apparatus may output an audio in steps S1713 and S1721.

(Program Execution Operation Processing)

Figure 17B:
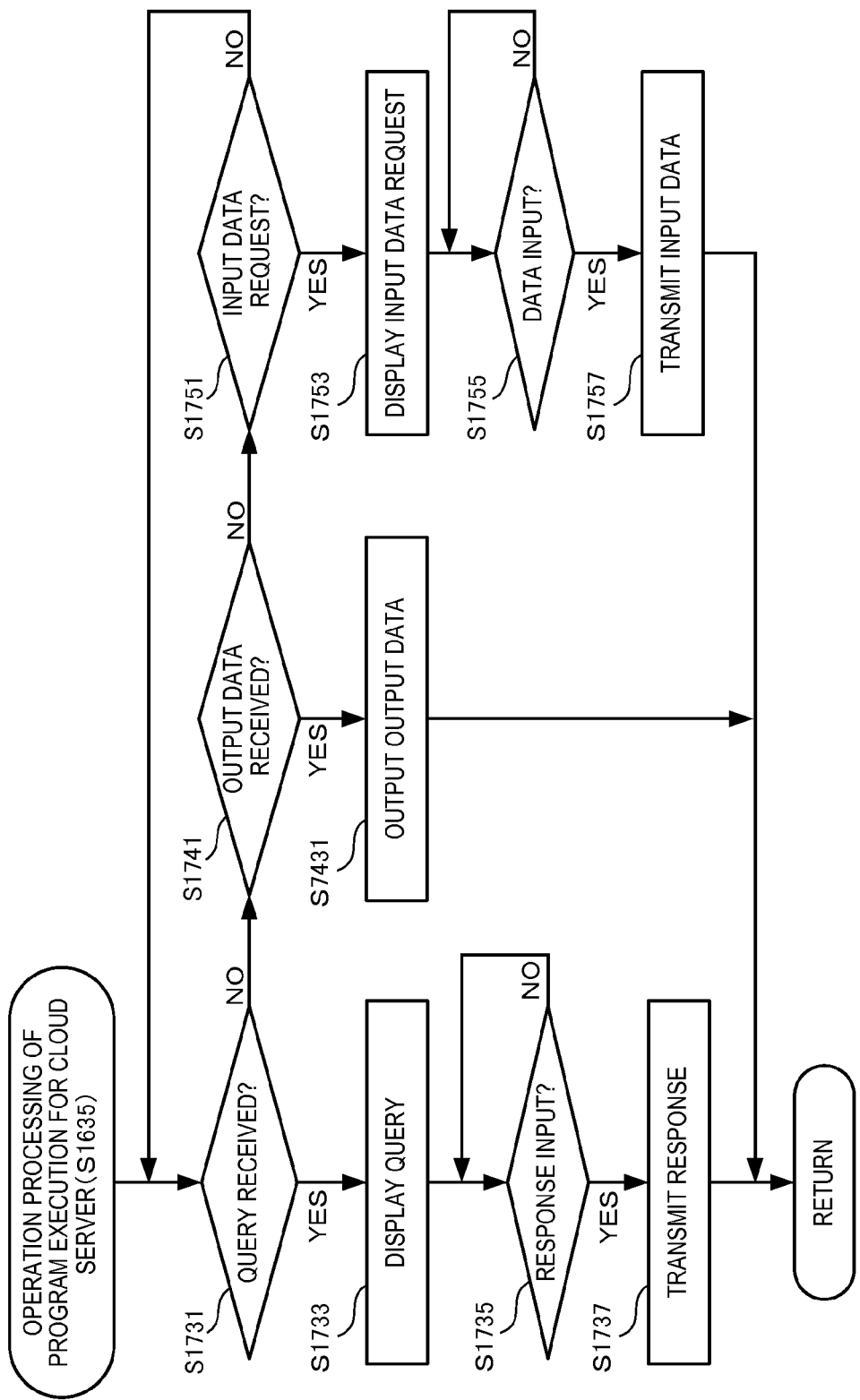
FIG. 17B is a flowchart showing the processing procedure of program execution operation processing for the cloud server according to the second embodiment of the present invention.

FIG. 17B is a flowchart showing the processing procedure of program execution operation processing S1635 for the cloud server according to this embodiment.

First, in step S1731, the client apparatus determines whether a query about installed program execution is received from the cloud server 220. Additionally, in step S1741, the client apparatus determines whether output data from the cloud server 220 to the client apparatus is received. Furthermore, in step S1751, the client apparatus determines whether an input data demand from the cloud server 220 is received.

If a query is received, the client apparatus advances to step S1733, and displays the query on the display 671. In step S1735, the client apparatus waits for a client's response input to the query. If a client's response is input, the client apparatus advances to step S1737, and transmits the response input to the cloud server 220. Note that the client apparatus may output an audio in step S1733.

Upon receiving output data from the cloud server 220, the client apparatus advances to step S7431, and outputs the output data to the output unit 670 connected to the client apparatus.

Upon receiving an input data demand from the cloud server 220, the client apparatus advances to step S1753, and displays the input data demand on the display 671. In step S1755, the client apparatus waits for a client's input operation to the input data demand. When a client's input operation is performed, the client apparatus advances to step S1757, and transmits the input data from the input unit 640 to the cloud server 220. Note that the client apparatus may output an audio in step S1753.

Third Embodiment

An information processing system according to the third embodiment of the present invention will be described next. The information processing system according to this embodiment is different from the second embodiment in that a program for which a client wants to make a purchasing contract is directly installed in a cloud server and executed, instead of transmitting the program from a client apparatus to the cloud server. The rest of the components and operations is the same as in the second embodiment. Hence, the same reference numerals as in the second embodiment denote the same components and operations, and a detailed description thereof will be omitted.

According to this embodiment, a program that is likely to be unable to be installed or executed even if acquired by a client is alternatively distributed and installed by the cloud server. Hence, the program can virtually be executed as if it were installed in the client apparatus.

(Processing of Information Processing System)

Figure 18A:
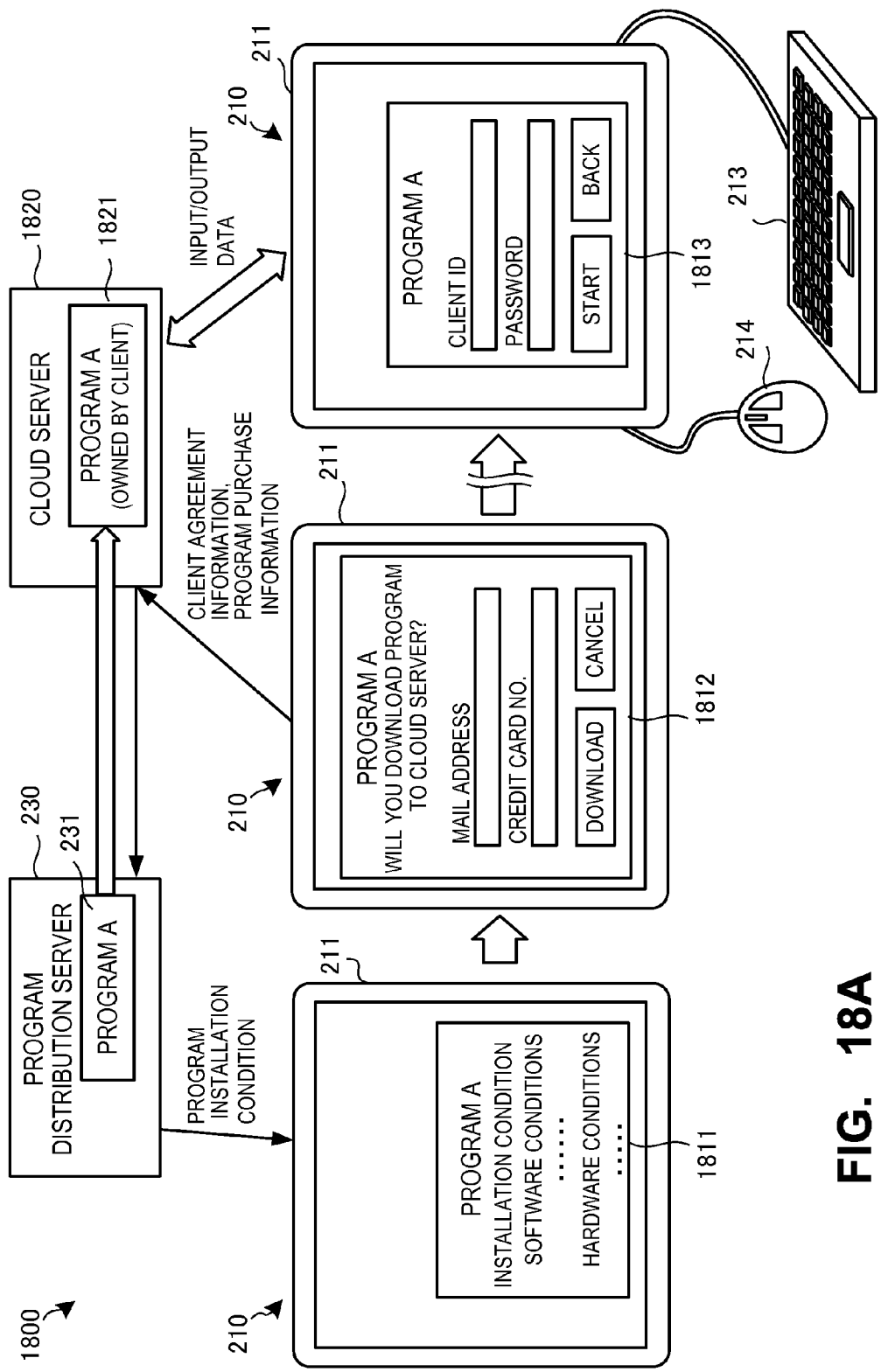
FIG. 18A is a view for explaining processing of an information processing system according to the third embodiment of the present invention.

FIG. 18A is a view for explaining processing of an information processing system 1800 according to this embodiment. Note that the same reference numerals as in FIG. 2 of the second embodiment denote the same constituent elements, and a description thereof will be omitted.

The left view of FIG. 18A shows the display screen of a display 211 included in a client apparatus 210. The display screen displays a condition message 1811 to install and execute a program A, which is transmitted from a program distribution server 230 that distributes a program A 231. The condition message 1811 displays software conditions (OS, necessary software, and the like) and hardware conditions (CPU capability, memory capacity, capabilities of input/output devices and communication device, and the like). Note that the client can also obtain the installation and execution conditions not from the program distribution server 230 but via another medium.

The client who has recognized that the program A cannot be installed or executed by the client apparatus 210 in the left view of FIG. 18A requests, from the client apparatus 210, to install and execute the program A in a cloud server 220, as shown in the central view. The display 211 of the client apparatus 210 displays a request message 1812.

In the installation request of this embodiment, since the client apparatus 210 does not acquire the program to be installed, unlike the second embodiment, the program is downloaded from the program distribution server 230 to the cloud server 220. Hence, it is necessary to notify the program distribution server 230 of information representing that the client purchases the program A. In this embodiment, the program A is purchased by the client apparatus 210 via the cloud server 1820, thereby installing the program A in the cloud server 1820.

Hence, when requesting the cloud server 1820 to do installation, client agreement information representing that the client agrees to purchase the program A and program purchase information certifying the purchase, for example, a credit card number are transmitted from the client apparatus 210 to the cloud server 1820. The cloud server 1820 transmits the client agreement information and the program purchase information received from the client apparatus 210 to the program distribution server 230 while designating the cloud server 1820 as the contractor. Installation of the program A from the program distribution server 230 to the cloud server 1820 is thus implemented.

The right view of FIG. 18A illustrates an example of the display screen of the display 211 of the client apparatus 210 at the start of execution of a program A 1821 installed in the cloud server 1820. In the right view of FIG. 18A, a message 1813 that demands the client to input a client ID and a password in the execution start procedure of the installed program A is displayed. Note that even a client apparatus different from the client apparatus 210 can execute the program A installed in the cloud server 220 when client authentication is done. A keyboard 213 and a pointing device 214 indicate that the apparatus can be a desktop PC or notebook PC that is a different client apparatus.

(Operation Procedure of Information Processing System)

Figure 18B:
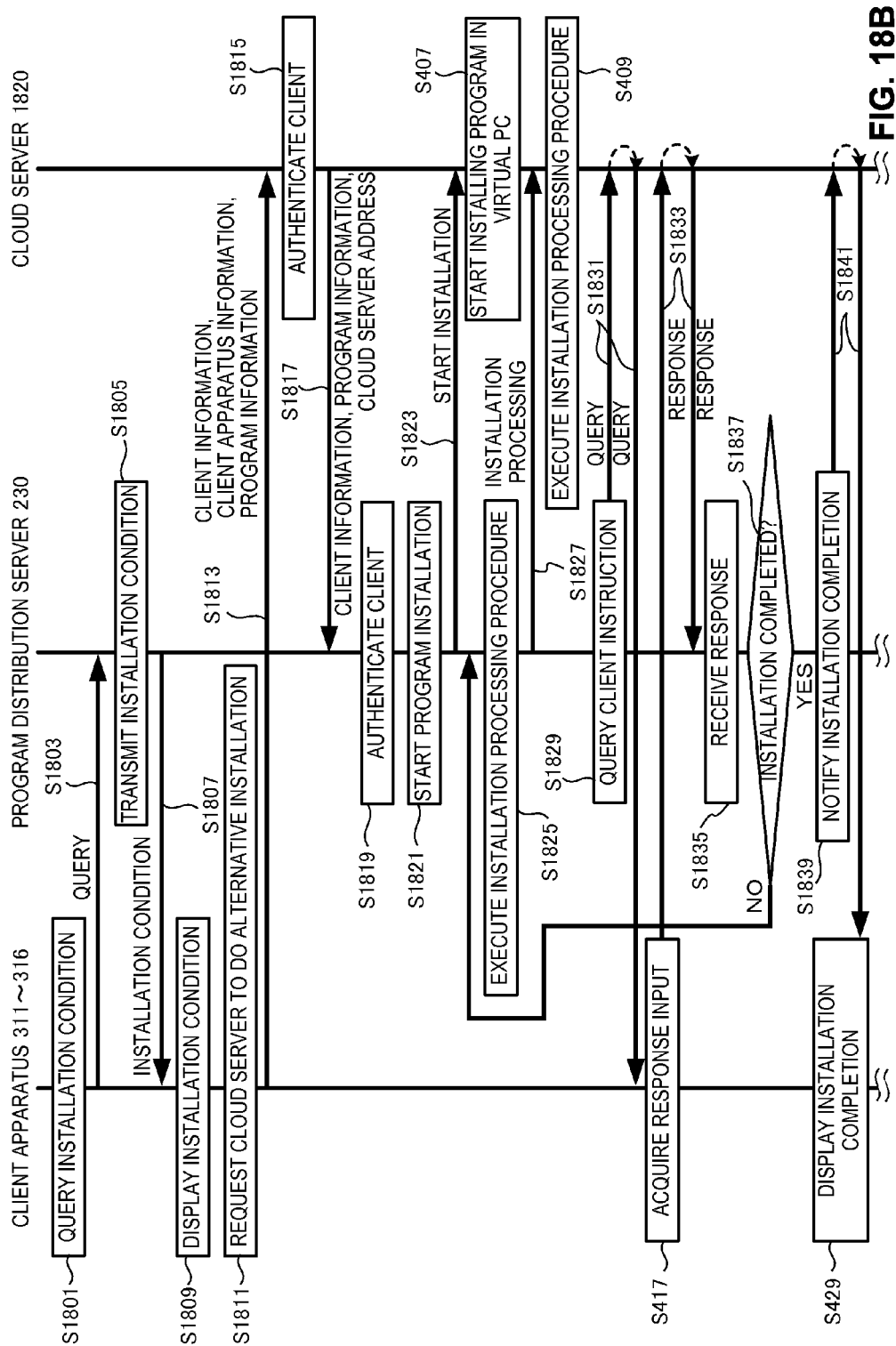
FIG. 18B is a sequence chart showing the operation procedure of the information processing system according to the third embodiment of the present invention.

FIG. 18B is a sequence chart showing the operation procedure of the information processing system 1800 according to this embodiment. Note that the same step numbers as in FIG. 4 of the second embodiment denote the same procedures in FIG. 18B, and a description thereof will be omitted.

First, in step S1801, the client apparatus queries the program distribution server 230 about the installation conditions of a desired program. The program distribution server 230 receives the query in step S1803, and transmits the installation conditions of the desired program in step S1805. The client apparatus receives the installation conditions in step S1807, and displays the received installation conditions in step S1809.

Upon determining based on the installation conditions displayed on the client apparatus that installation is impossible in the client apparatus, the client requests the cloud server 1820 to do alternative installation in step S1811. The alternative installation request to the cloud server 1820 includes client information, client apparatus information, and program information including the client's desired program and program purchase intent, as in step S1813. The cloud server 1820 authenticates the client based on the received client information in step S1815, and demands the program distribution server 230 to install the program in step S1817. The program installation demand includes the client information, the program information, and the cloud server address as the installation request source.

In step S1819, the program distribution server 230 recognizes the client from the client information received from the cloud server 1820. When the client is authenticated, installation of the program corresponding to the program information starts in step S1821. In this case, the program installation destination is the cloud server 1820, and the client of the client apparatus performs the operation in the installation procedure.

The cloud server 1820 is instructed by the program distribution server 230 to start installation in step S1823, and starts installing the program in the virtual PC of the cloud server 1820 in step S407. In steps S1825, S1827, and S409, the installation processing procedure sequentially progresses between the program distribution server 230 and the cloud server 1820.

If the program distribution server 230 wants to send a query including a query purchasing contract to the client during the progress of the installation processing procedure, the query is transmitted to the cloud server 1820 in step S1829. The query is transmitted to the client apparatus via the cloud server 1820 and displayed, as in step S1831. A response to the query in step S417 is also transmitted to the program distribution server 230 via the cloud server 1820, as in step S1833. In step S1835, the program distribution server 230 receives the client's response from the client apparatus. The process then advances to the next installation procedure.

In step S1837, the program distribution server 230 determines whether installation is completed. If installation is not completed, the process returns to step S1825, and advances to the next installation procedure. If installation is completed, an installation completion notification is transmitted to the cloud server 1820 in step S2839. The installation completion notification is transmitted to the client apparatus via the cloud server 1820, as in step S1841. In step S429, the client apparatus displays the installation completion and notifies the client of it.

Fourth Embodiment

An information processing system according to the fourth embodiment of the present invention will be described next. The information processing system according to this embodiment is different from the third embodiment in that a program for which a client has made a purchasing contract is transferred to a cloud server and installed and executed in the cloud server. The rest of the components and operations is the same as in the third embodiment. Hence, the same reference numerals as in the third embodiment denote the same components and operations, and a detailed description thereof will be omitted.

According to this embodiment, a program that is likely to be unable to be installed or executed even if acquired by a client is transferred by a contract and installed in the cloud server. Hence, the program can virtually be executed as if it were installed in the client apparatus.

(Processing of Information Processing System)

Figure 19A:
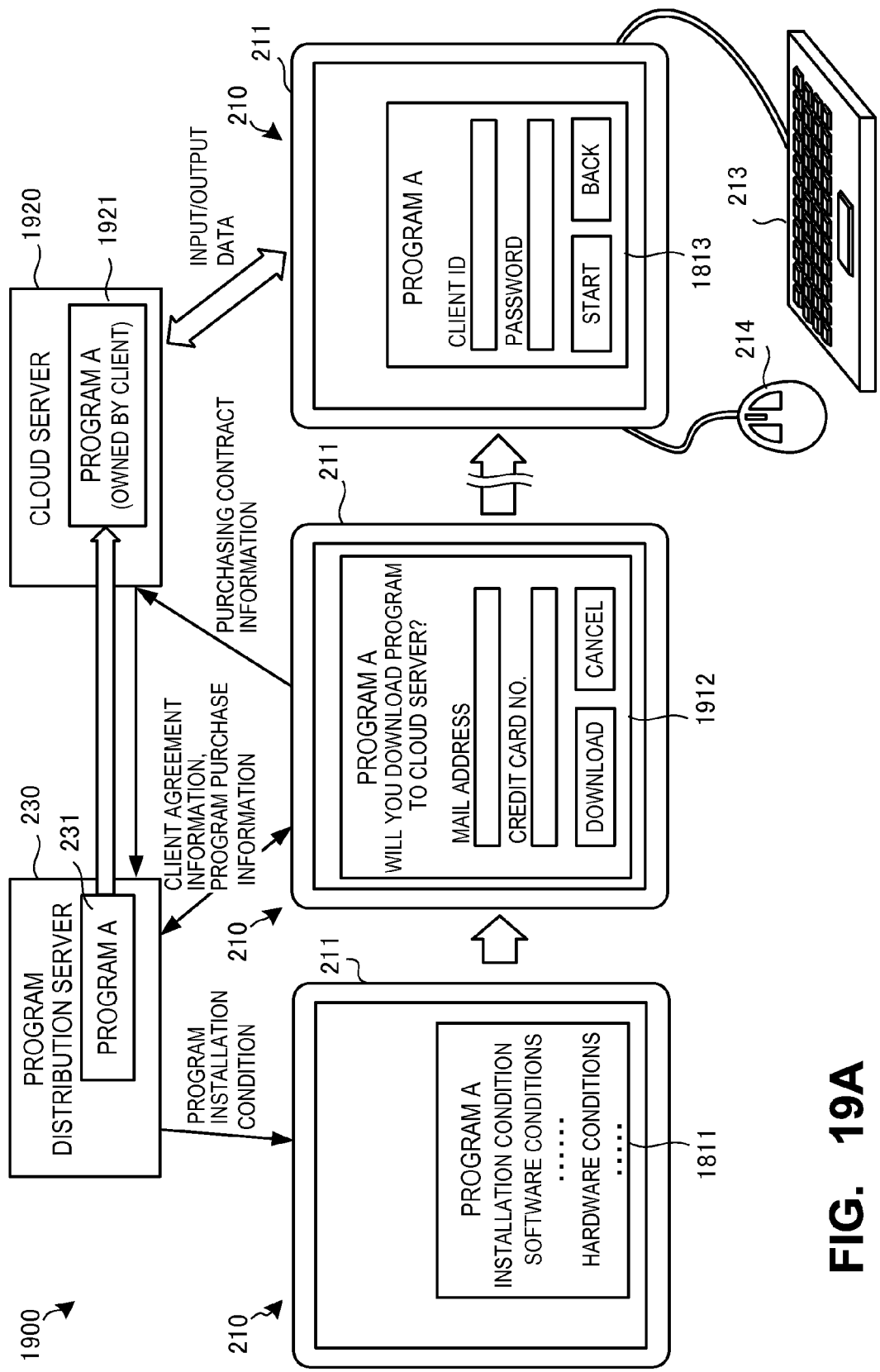
FIG. 19A is a view for explaining processing of an information processing system according to the fourth embodiment of the present invention.

FIG. 19A is a view for explaining processing of the information processing system according to this embodiment. Note that the same reference numerals as in FIG. 18A of the third embodiment denote the same processes in FIG. 19A, and a description thereof will be omitted.

The left view of FIG. 19A is the same as the left view of FIG. 18A. The client who has recognized that a program A cannot be installed or executed by a client apparatus 210 in the left view of FIG. 19A requests, from the client apparatus 210, to install and execute the program A in a cloud server 220, as shown in the central view. A display 211 of the client apparatus 210 displays a request message 1912.

In this embodiment as well, it is necessary to notify a program distribution server 230 of information representing that the client purchases the program A, as in the third embodiment. In this embodiment, a program purchasing contract is made in advance between the client apparatus 210 and the program distribution server 230, and the client transmits the purchasing contract information from the client apparatus to the program distribution server 230 via the cloud server 1920, thereby implementing program installation in the cloud server 1920. Hence, the client apparatus 210 makes the purchasing contract of the desired program with the program distribution server 230, as shown in the central view of FIG. 19A. After that, the purchasing contract information is transmitted to the program distribution server 230 via the cloud server 1920, thereby implementing program installation in the cloud server 1920.

The right view of FIG. 19A illustrates an example of the display screen of the display 211 of the client apparatus 210 at the start of execution of a program A 1821 installed in the cloud server 1820, like the right view of FIG. 18A.

(Operation Procedure of Information Processing System)

Figure 19B:
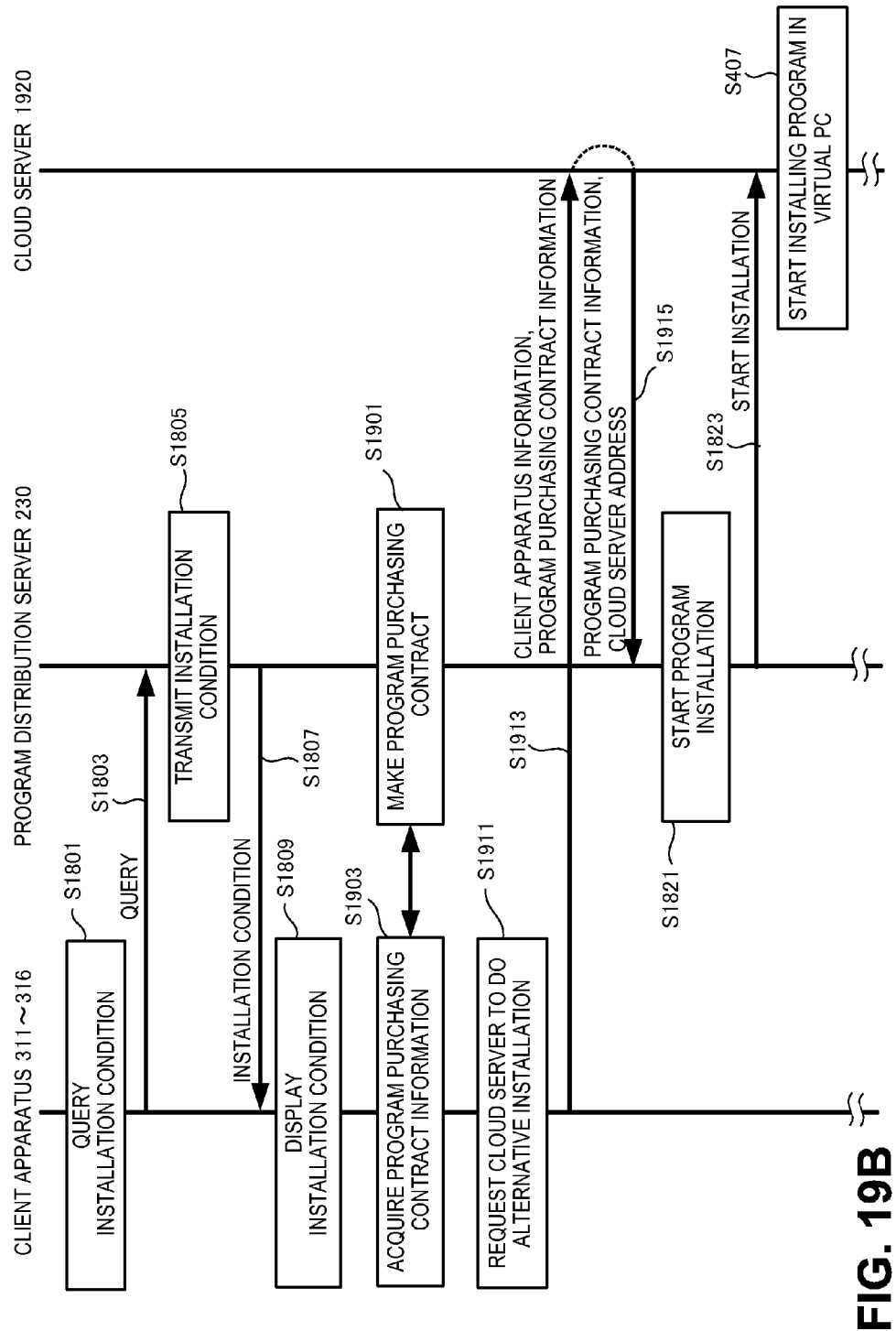
FIG. 19B is a sequence chart showing the operation procedure of the information processing system according to the fourth embodiment of the present invention.

FIG. 19B is a sequence chart showing the operation procedure of the information processing system according to this embodiment. Note that the same step numbers as in FIG. 4 of the second embodiment or FIG. 18B of the third embodiment denote the same procedures in FIG. 19B, and a description thereof will be omitted. Additionally, since the installation procedure processing according to this embodiment is the same as in FIG. 18B of the third embodiment, FIG. 19B illustrates the procedure until the start of installation but not the subsequent procedure.

Steps S1801 to S1809 are installation condition query processes corresponding to the left view of FIG. 19A.

In steps S1901 and S1903, the client operates the client apparatus and makes the purchasing contract of a desired program with the program distribution server 230. The client acquires the program purchasing contract information.

In step S1911, the client apparatus requests the cloud server 1920 to do alternative installation. In this embodiment, the client has already made the purchasing contract with the program distribution server 230. For this reason, in step S1913, the client apparatus transmits the program purchasing contract information and client apparatus information to the cloud server 1920.

In step S1915, the cloud server 1920 transmits the program purchasing contract information and the cloud server address to the program distribution server 230. From then on, the same installation procedure as in FIG. 18B thus starts.

Fifth Embodiment

An information processing system according to the fifth embodiment of the present invention will be described next. The information processing system according to this embodiment is different from the second to fourth embodiments in that a program installed in a cloud server is divided, and a client apparatus divisionally executes it. The client can select whether to do divisional execution or make the cloud server execute the whole program. The rest of the components and operations is the same as in the second to fourth embodiments. Hence, the same reference numerals as in the second to fourth embodiments denote the same components and operations, and a detailed description thereof will be omitted.

According to this embodiment, a program is divided and cooperatively executed by the client apparatus and the cloud server. Hence, the program can virtually be executed as if it were installed in the client apparatus. It is also possible to prevent leakage of authentication information of the client or infection of the client apparatus as much as possible.

(Operation Procedure of Information Processing System)

Figure 20A:
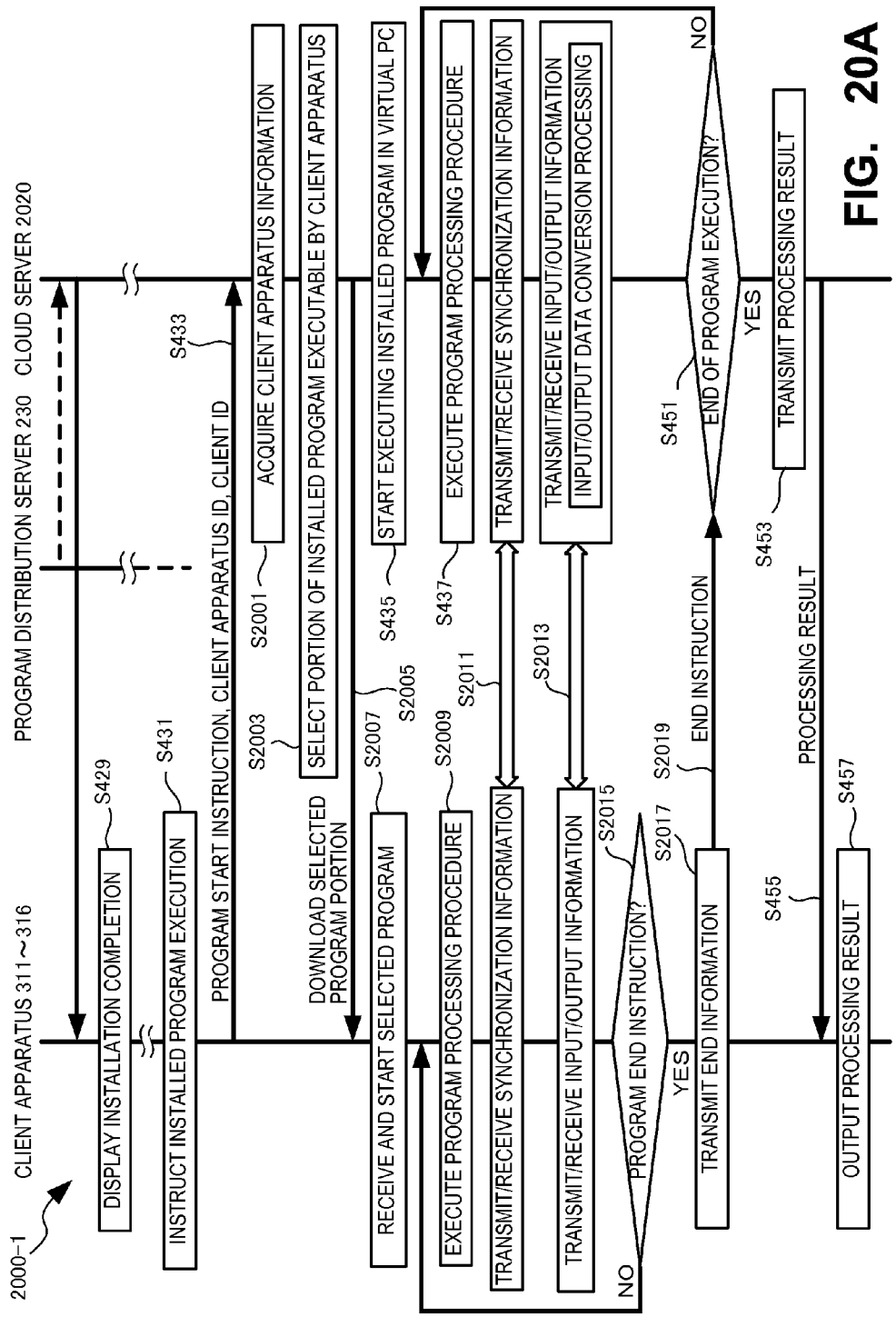
FIG. 20A is a sequence chart showing an operation procedure of an information processing system according to the fifth embodiment of the present invention.

FIG. 20A is a sequence chart showing an operation procedure 2000-1 of an information processing system 2000 according to this embodiment. Note that FIG. 20A shows an installed program execution procedure after program installation in a cloud server 2020 is completed. The same step numbers as in FIG. 4 of the second embodiment denote the same operation procedures in the processing shown in FIG. 20A, and a description thereof will be omitted.

Upon receiving an installed program execution instruction from the client apparatus, the cloud server 2020 acquires client apparatus information in step S2001. The client apparatus information may be acquired, based on a client apparatus ID, from a client apparatus DB where the information is registered in advance or acquired from the client apparatus. In step S2003, a portion executable by the client apparatus is selected from the installed program based on the acquired client apparatus information (see FIG. 22). In step S2005, the selected portion of the installed program is downloaded to the client apparatus. In step S435, the portion to be executed by the cloud server 2020 is started in the virtual PC. On the other hand, in step S2007, the client apparatus receives the downloaded selected program from the cloud server 2020 and starts execution.

Essential control according to this embodiment is to establish synchronization between program execution in the cloud server 2020 and that in the client apparatus. Synchronization is done by a control signal or message or by inputting/outputting data. In FIG. 20, program processing procedure execution of the cloud server 2020 in step S437 and program processing procedure execution of the client apparatus in step S2009 are synchronized. Synchronization by synchronization signal transmission/reception in step S2011 and input/output information transmission/reception in step S2013 are performed. Note that steps S2011 and S2013 symbolically express the synchronization processing.

In step S2015, the client apparatus waits for a program end instruction from the client. If no program end instruction is received, the process returns to step S2009 to continue the processing. Upon receiving a program end instruction, the process advances to step S2017 to transmit end information to the cloud server 2020. The cloud server 2020 receives the end information in step S2019, and ends the processing of the installed program.

Figure 20B:
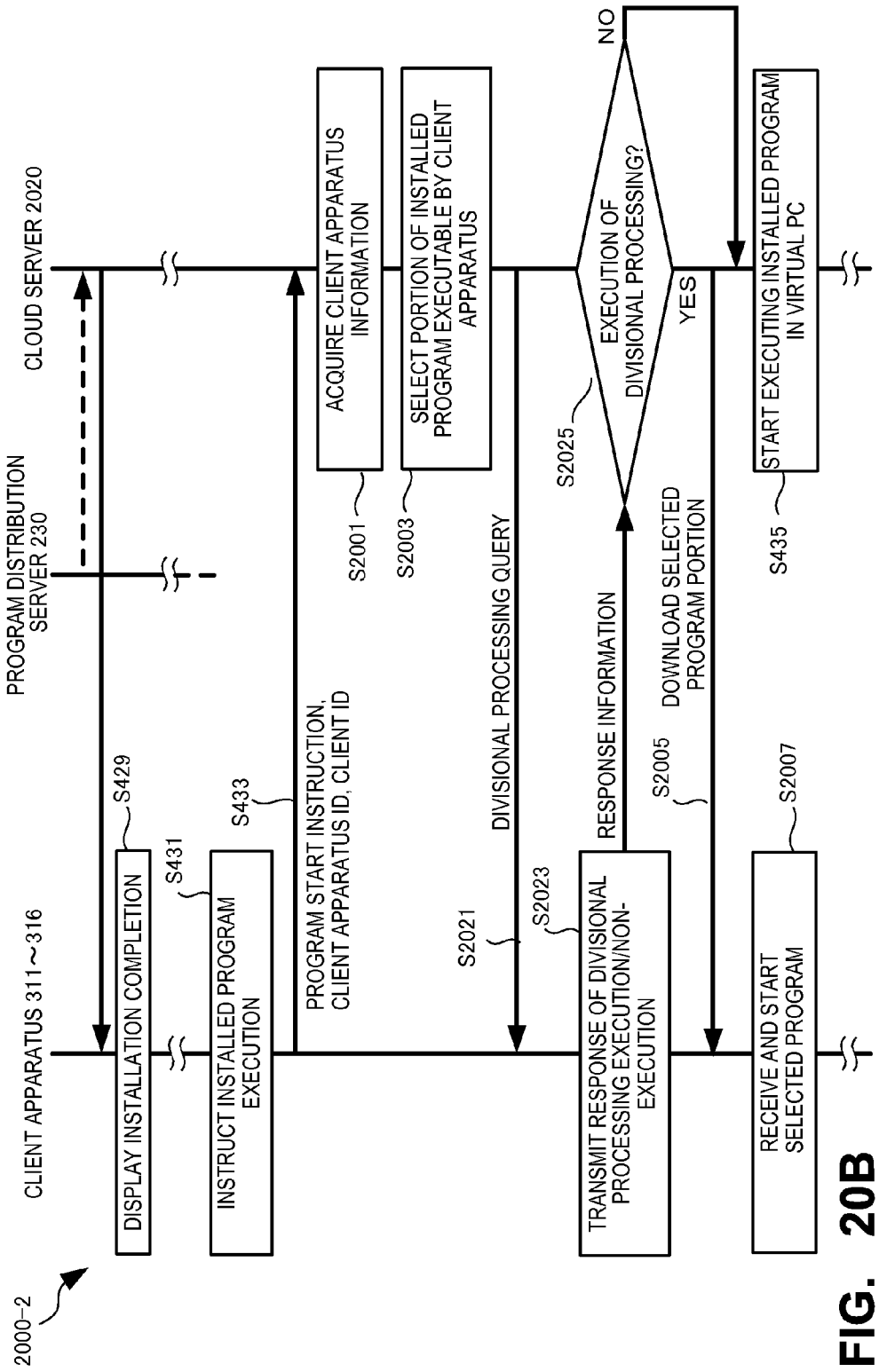
FIG. 20B is a sequence chart showing another operation procedure of the information processing system according to the fifth embodiment of the present invention.

FIG. 20B is a sequence chart showing an operation procedure 2000-2 of the information processing system 2000 according to this embodiment. Note that FIG. 20B does not illustrate the operation procedure after step S435 or S2005, which is the same as in FIG. 20A. The same step numbers as in FIG. 20A denote the same operation procedures, and a description thereof will be omitted.

When the installed program has a portion divisionally executable by the client apparatus, in step S2021, the cloud server 2020 queries the client apparatus whether to perform divisional processing in the client apparatus. In step S2023, the client inputs a response representing whether to execute the divisional processing in the client apparatus. If the response from the client is approval of divisional execution in step S2025, the cloud server 2020 performs the program shown in FIG. 20A from then on. However, if the response is refusal of divisional execution, the cloud server 2020 wholly executes the installed program without downloading the selected program portion.

Note that such divisional execution refusal also has a point in preventing leakage of authentication information of the client or infection of the client apparatus. For this reason, if authentication information is necessary, the cloud server 2020 preferably uses the authentication information of the cloud server 2020 as temporary authentication information and operates so as to avoid information exchange with the client apparatus as much as possible hereinafter.

<<Functional Arrangement of Cloud Server>>

Figure 21:
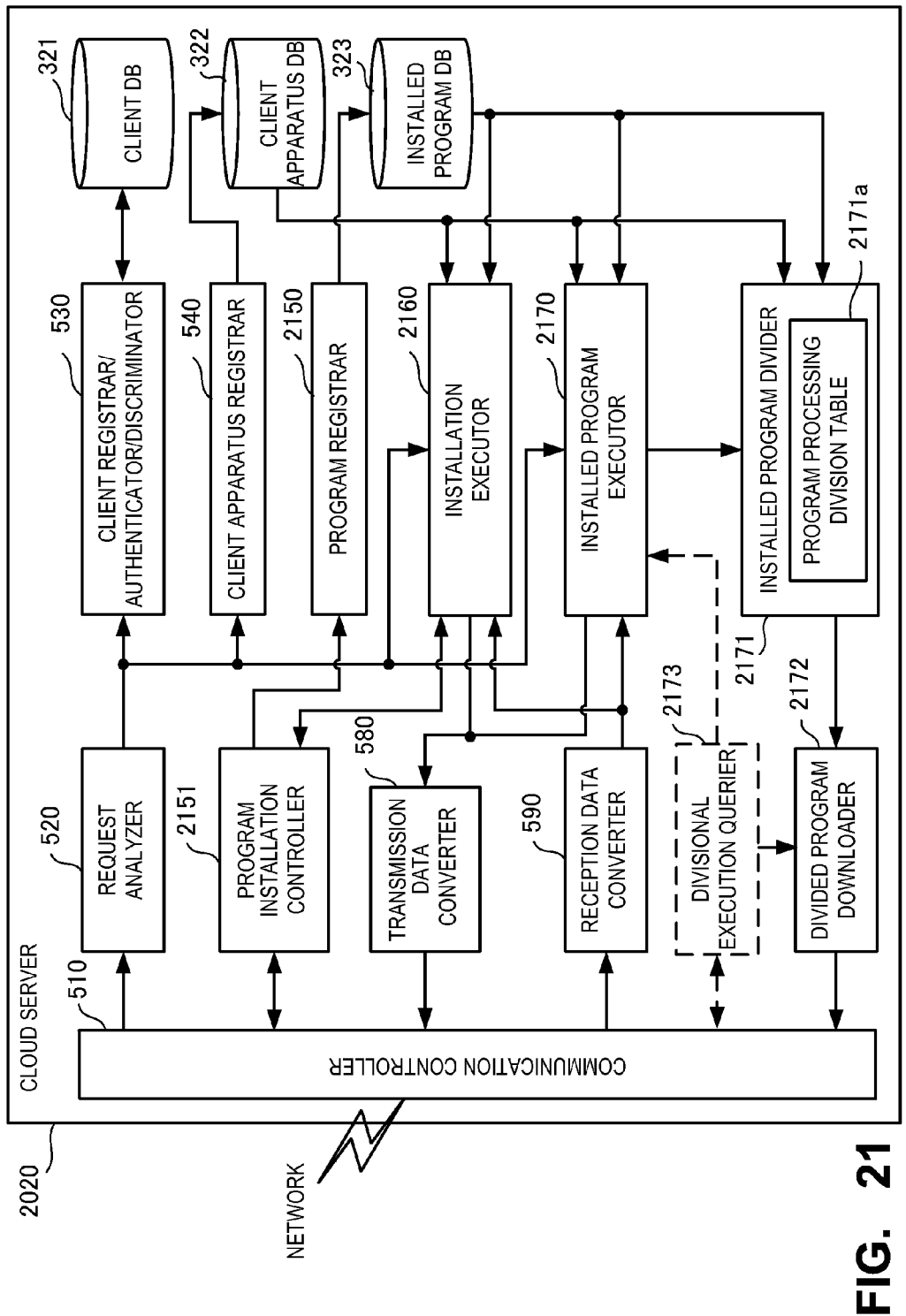
FIG. 21 is a block diagram showing the functional arrangement of a cloud server according to the fifth embodiment of the present invention.

FIG. 21 is a block diagram showing the functional arrangement of the cloud server 2020 according to this embodiment. Note that the same reference numerals as in FIG. 5 of the second embodiment denote the same functional components in FIG. 21, and a description thereof will be omitted. FIG. 21 shows an arrangement in a case where a program is directly installed from the program distribution server 230 in the cloud server 2020 (see the third and fourth embodiments). However, the program may be uploaded from the client apparatus.

A program installer 2151 installs a program from the program distribution server 230 in cooperation with a program registrar 2150 and an installation executor 2160. When uploading the program from the client apparatus, the arrangement includes no program installer 2151, as in FIG. 5.

An installed program divider 2171 includes a program processing division table 2171a (see FIG. 22), and divides a portion of the installed program executable by the client apparatus. The divided portion of the installed program is downloaded to the client apparatus by a divided program downloader 2172. Note that when the installed program is uploaded from the client apparatus, only an identifier for identifying the divided program is transmitted to the client apparatus without downloading the divided program.

A divisional execution querier 2173 is an optional functional component that performs processing corresponding to the operation procedure shown in FIG. 20B. If divisional execution is possible, the divisional execution querier 2173 queries the client apparatus whether to divisionally execute the program. If a response from the client apparatus is divisional processing execution, the client apparatus is caused to download the divided program and perform divisional processing of the installed program. However, if the client's response from the client apparatus is divisional processing non-execution, the cloud server 2020 is caused to execute the whole installed program without downloading the divided program.

An installed program executor 2170 executes the installed program while synchronizing execution of the divided program downloaded to the client apparatus in the client apparatus with execution of the rest of the installed program in the cloud server 2020.

The installed program divider 2171, the installed program executor 2170, and the divisional execution querier 2173 constitute a divisional execution controller.

(Program Processing Division Table)

Figure 22:
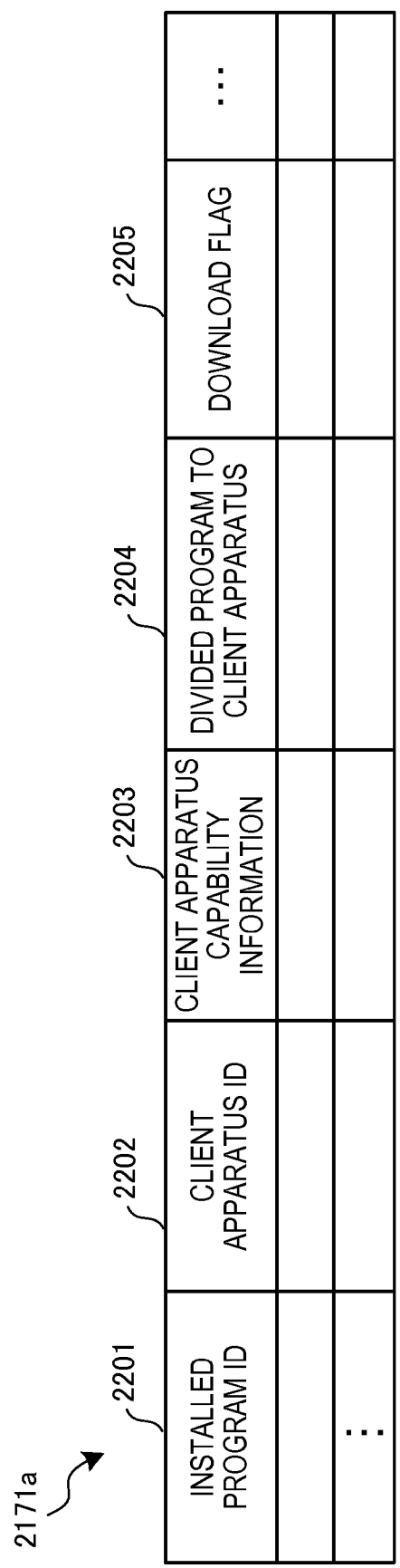
FIG. 22 is a view showing the arrangement of a program processing division table according to the fifth embodiment of the present invention.

FIG. 22 is a view showing the arrangement of the program processing division table 2171a according to this embodiment.

The program processing division table 2171a stores a client apparatus ID 2202 of a client apparatus that has instructed to execute an installed program, and capability information 2203 included in the client apparatus information in association with an installed program ID 2201. The program processing division table 2171a also stores a divided program 2204 to the client apparatus, which is divided based on the capability information 2203 of the client apparatus, and a download flag 2205 of the divided program 2204 to the client apparatus.

(Processing Procedure of Program Processing Divisional Processing)

Figure 23:
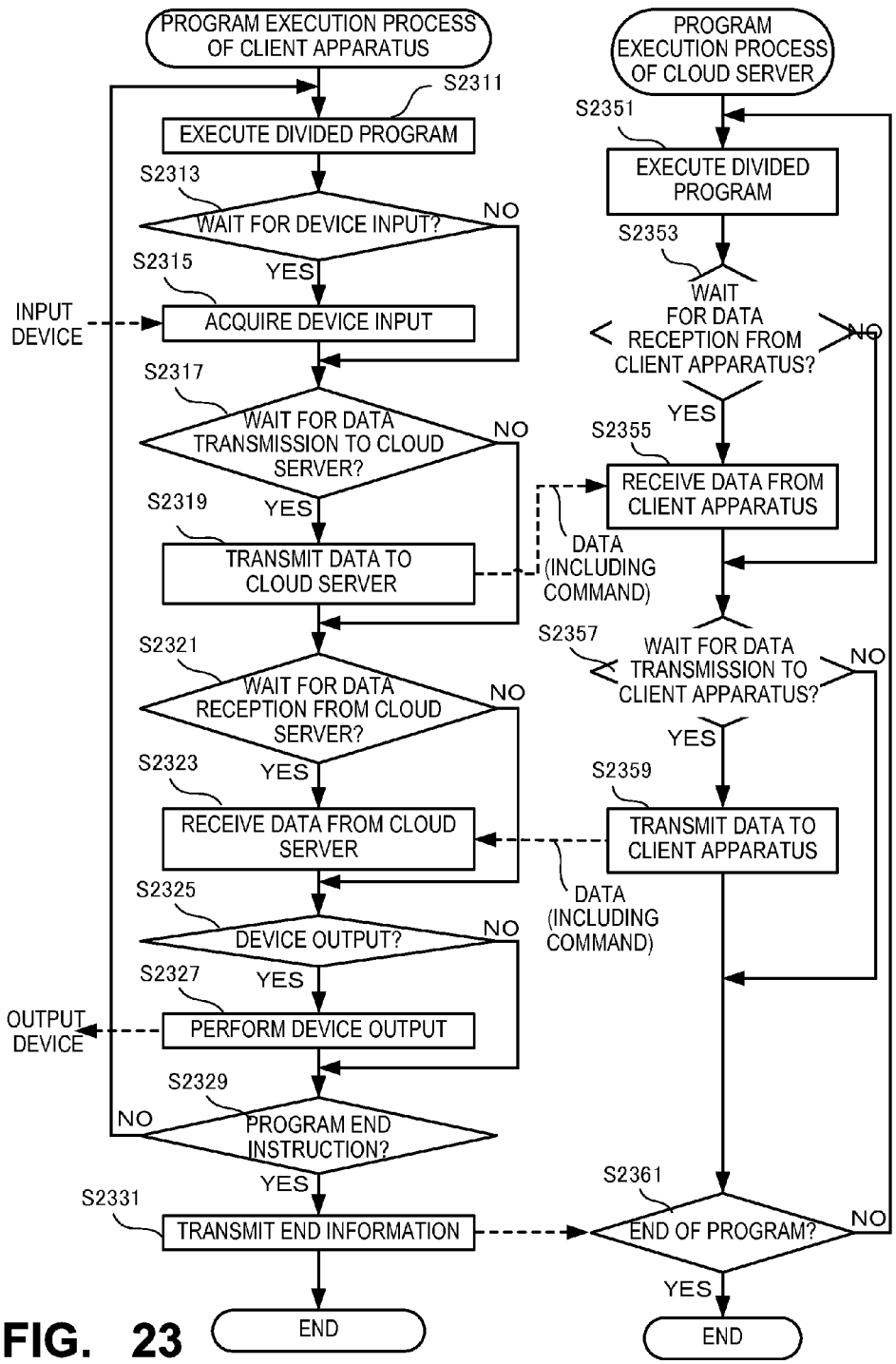
FIG. 23 is a flowchart showing the processing procedure of program processing divisional processing according to the fifth embodiment of the present invention.

FIG. 23 is a flowchart showing the processing procedure of program processing divisional processing according to this embodiment. The left side of FIG. 23 shows the flowchart of the client apparatus, and the right side of FIG. 23 shows the flowchart of the cloud server 2020. FIG. 23 is a flowchart for mainly explaining synchronization between the client apparatus and the cloud server 2020, and illustrates a special procedure. This procedure can also be extended to another processing.

In step S2311, the client apparatus executes the downloaded divided program. In step S2351, the cloud server 2020 executes the remaining divided program.

A case where the client apparatus waits for input from an input device will be described first. Note that when the input from the input device is necessary for the cloud server 2020 as well, the cloud server 2020 waits for reception of the input data from the client apparatus. When neither waiting for device input nor transmitting data to the cloud server 2020, the client apparatus advances to step S2321.

When waiting for device input, the client apparatus advances from step S2313 to step S2315, and acquires the device input. To transmit data to the cloud server 2020, the client apparatus advances from step S2317 to step S2319, and transmits the data of the device input to the cloud server 2020. On the other hand, when waiting for reception of data from the client apparatus, the cloud server 2020 advances from step S2353 to step S2355, and receives the data from the client apparatus in synchronism with step S2319 of the client apparatus.

A case where the client apparatus waits for output from an output device will be described next. Note that when the output from the output device is necessary for the cloud server 2020 as well, the cloud server 2020 waits for transmission of the output data to the client apparatus. When neither waiting for device output nor receiving data from the cloud server 2020, the client apparatus advances to step S2329.

When waiting for data transmission to the client apparatus, the cloud server 2020 advances from step S2357 to step S2359, and transmits data to the client apparatus. On the other hand, when waiting for data reception from the cloud server 2020, the client apparatus advances from step S2321 to step S2323, and receives the data from the cloud server 2020 in synchronism with step S2359 of the cloud server 2020. When waiting for device output, the client apparatus advances from step S2325 to step S2327, and performs device output.

In step S2329, the client apparatus waits for a program end instruction from the client. Upon receiving an end instruction, end information is transmitted to the cloud server 2020 in step S2331. In step S2361, the cloud server 2020 receives the end information from the client apparatus, and ends installed program execution.

Sixth Embodiment

An information processing system according to the sixth embodiment of the present invention will be described next. The information processing system according to this embodiment is different from the second to fifth embodiments in that when a client apparatus does not satisfy a communication condition with an external apparatus as a communication capability necessary for executing a program to be installed, the client apparatus can virtually execute the program. The rest of the components and operations is the same as in the second to fifth embodiments. Hence, the same reference numerals as in the second to fifth embodiments denote the same components and operations, and a detailed description thereof will be omitted.

According to this embodiment, a program for which the client apparatus does not satisfy the communication capability is installed and executed by a cloud server. Hence, the client apparatus can virtually implement the communication capability necessary for executing the program.

<<Arrangement of Information Processing System>>

Figure 24:
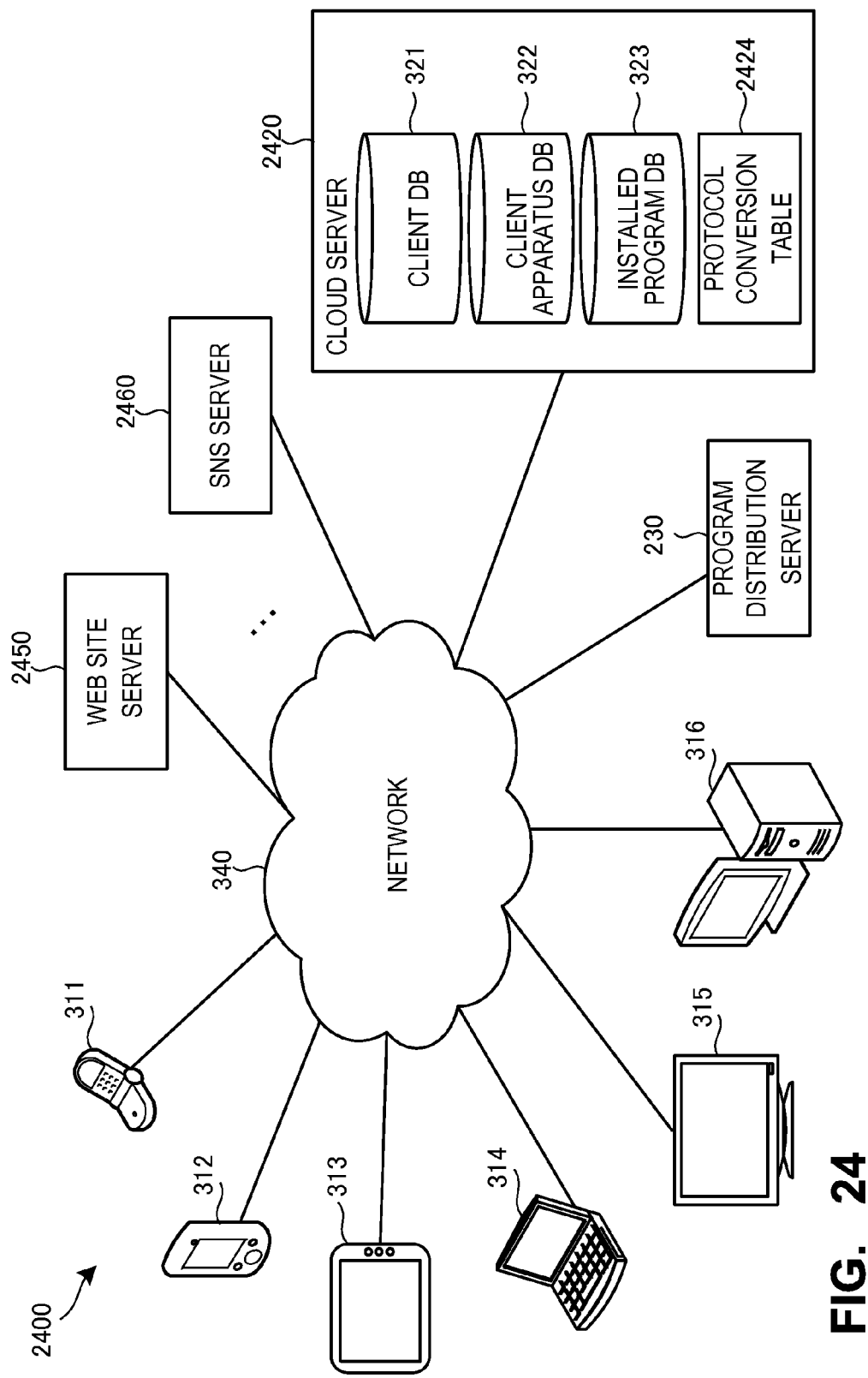
FIG. 24 is a block diagram for explaining the arrangement of an information processing system according to the sixth embodiment of the present invention.

FIG. 24 is a block diagram for explaining the arrangement of an information processing system 2400 according to this embodiment. Note that the same reference numerals as in FIG. 3 of the second embodiment denote the same constituent elements in FIG. 24, and a description thereof will be omitted.

A cloud server 2420 includes a protocol conversion table 2424 that converts the communication protocol of client apparatuses 311 to 316 into a communication protocol from the cloud server 2420 to an external apparatus. As the external apparatuses, for example, a web site server 2450 and an SNS server 2460 are connected to a network 340. However, the external apparatuses are not limited to those.

<<Operation Procedure of Information Processing System>>

Figure 25:
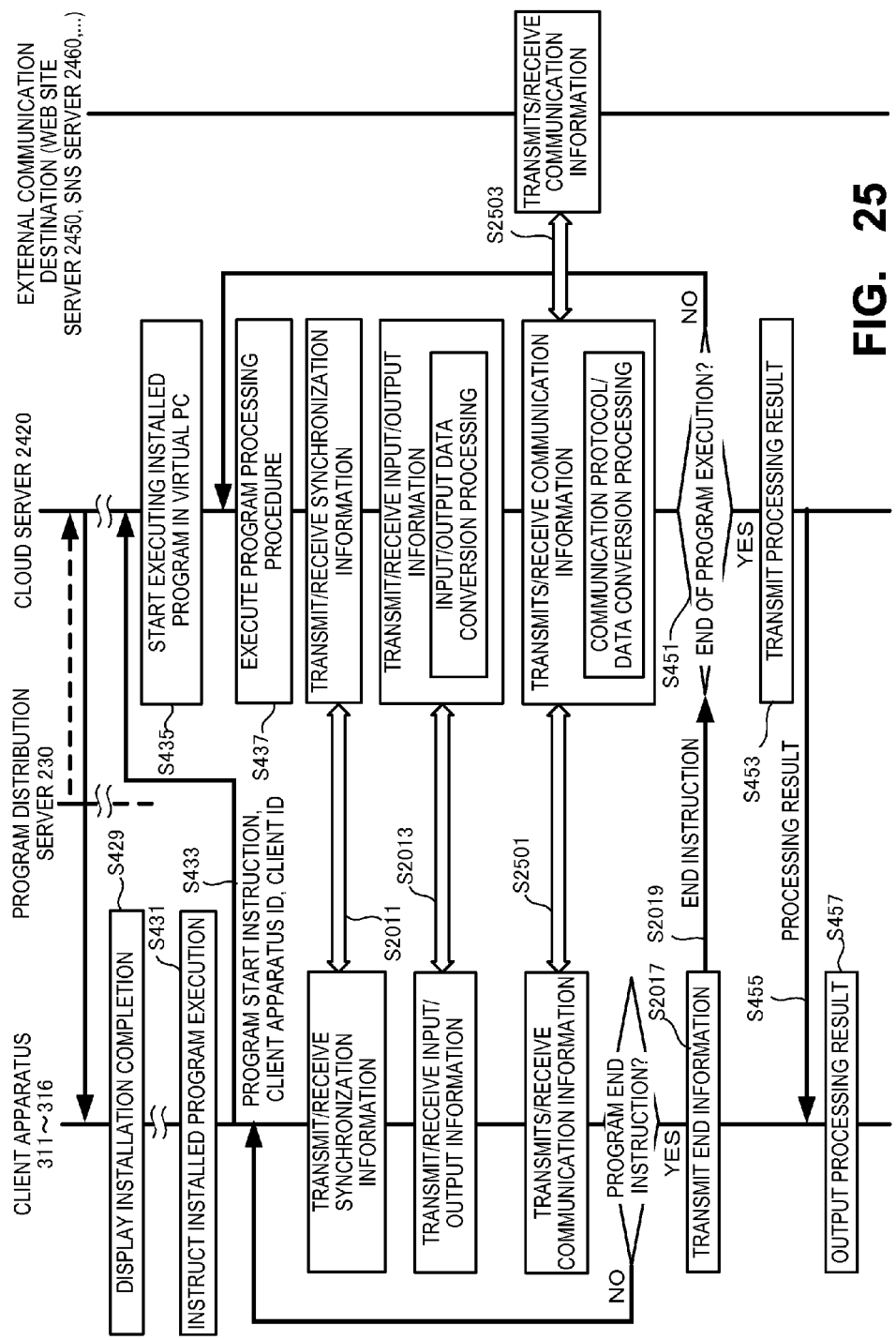
FIG. 25 is a sequence chart showing the operation procedure of the information processing system according to the sixth embodiment of the present invention.

FIG. 25 is a sequence chart showing the operation procedure of the information processing system 2400 according to this embodiment. Note that FIG. 25 shows an installed program execution procedure after program installation in the cloud server 2020 is completed. The same step numbers as in FIG. 4 of the second embodiment and FIG. 20 of the fifth embodiment denote the same operation procedures in FIG. 25, and a description thereof will be omitted.

In step S2501, communication is implemented between transmission/reception of communication information of the client apparatus and transmission/reception of communication information of the cloud server 2420 by converting the communication protocol or data as needed. In step S2503, the communication protocol or data is converted so as to enable communication exchange with the apparatus of an external communication destination.

With the conversion of the communication protocol or data, the installed program installed in the cloud server 2020 can be implemented independently of the communication capability of the client apparatus.

<<Functional Arrangement of Cloud Server>>

Figure 26:
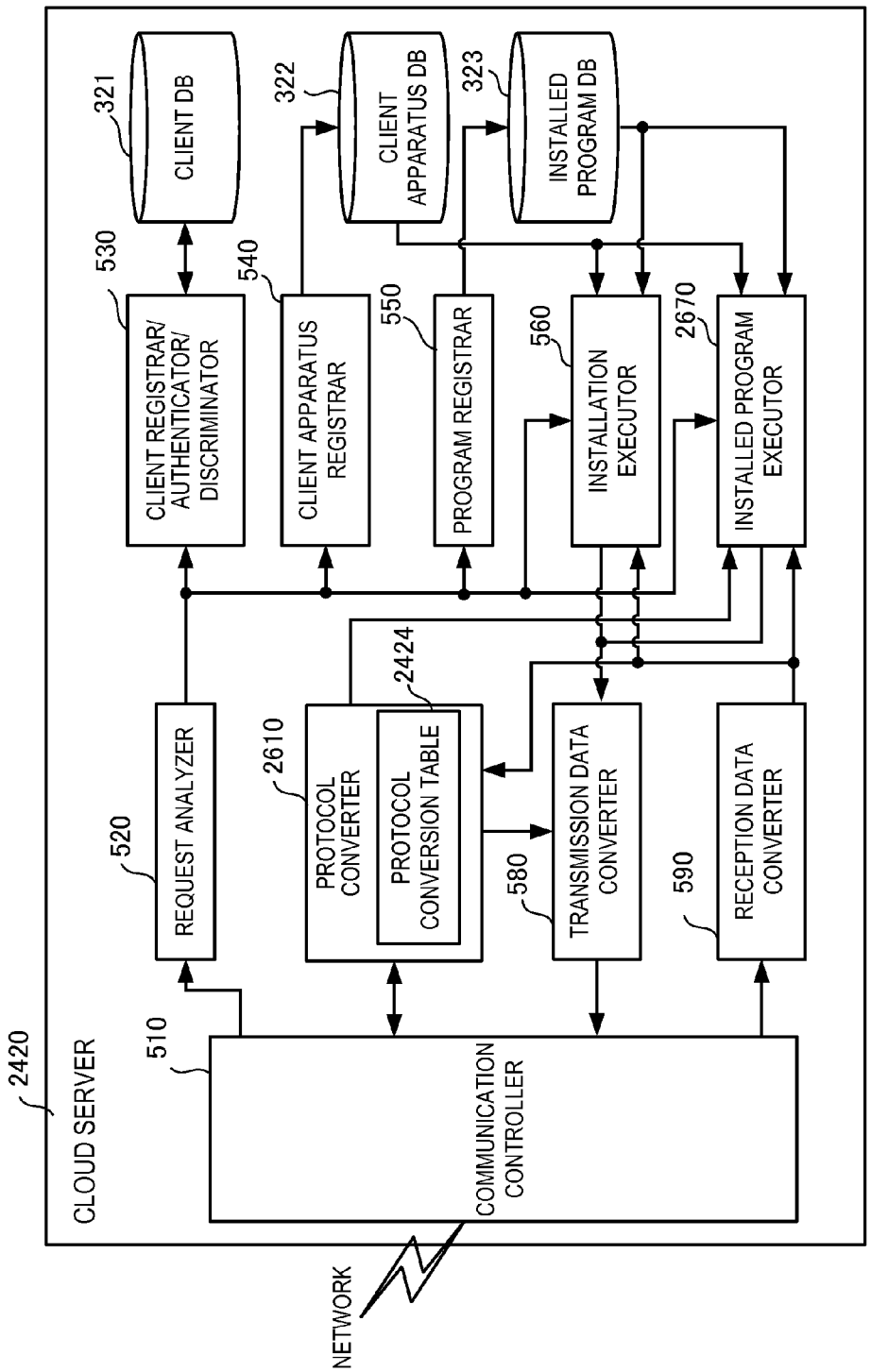
FIG. 26 is a block diagram showing the functional arrangement of a cloud server according to the sixth embodiment of the present invention.

FIG. 26 is a block diagram showing the functional arrangement of the cloud server 2420 according to this embodiment. Note that the same reference numerals as in FIG. 5 of the second embodiment denote the same functional components in FIG. 26, and a description thereof will be omitted.

A protocol converter 2610 includes a protocol conversion table (see FIG. 27), and perform protocol conversion so as to enable data transmission/reception by the communication protocol of the client apparatus in accordance with the communication protocol of the apparatus of an external communication destination. An installed program executor 2670 implements communication between the client apparatus and the apparatus of the external communication destination by the communication protocol converted by the protocol converter 2610.

(Protocol Conversion Table)

Figure 27:
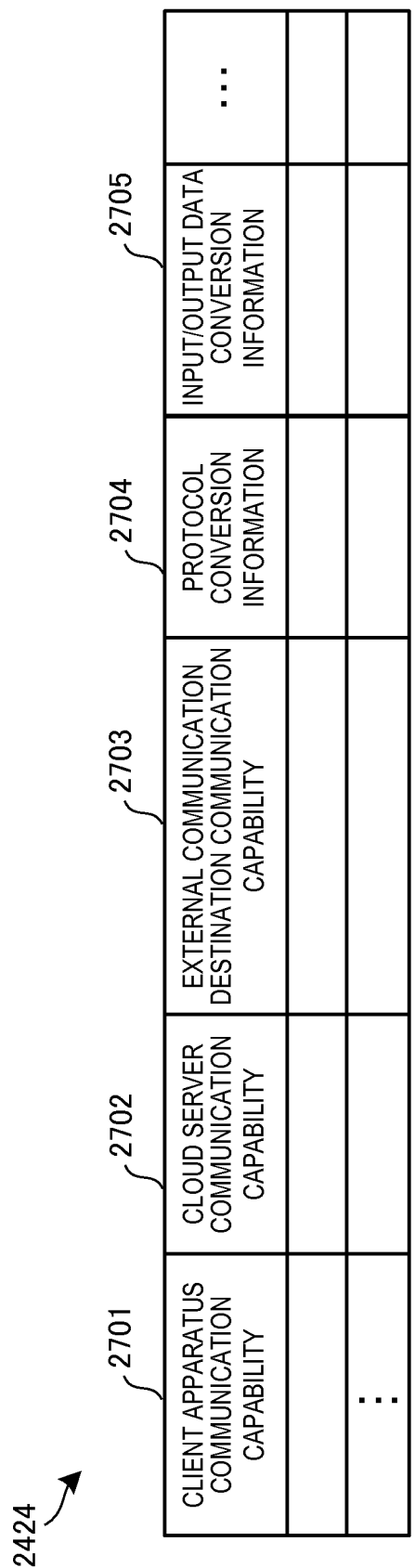
FIG. 27 is a view showing the arrangement of a protocol conversion table according to the sixth embodiment of the present invention.

FIG. 27 is a view showing the arrangement of the protocol conversion table 2424 according to this embodiment.

The protocol conversion table 2424 stores protocol conversion information 2704 and input/output data conversion information 2705 in association with a combination of a communication capability 2701 of a client apparatus, a communication capability 2702 of a cloud server, and a communication capability 2703 of an external communication destination.

Seventh Embodiment

An information processing system according to the seventh embodiment of the present invention will be described next. The information processing system according to this embodiment is different from the second to sixth embodiments in that when a client apparatus does not satisfy the input/output capability of an apparatus intended by a program to be installed, the client apparatus can virtually execute the program. The rest of the components and operations is the same as in the second embodiment. Hence, the same reference numerals as in the second embodiment denote the same components and operations, and a detailed description thereof will be omitted.

According to this embodiment, a program for which the client apparatus does not satisfy the input/output capability is installed and executed by a cloud server. Hence, the client apparatus can virtually implement the input/output for the program.

<<Operation Procedure of Information Processing System>>

Figure 28:
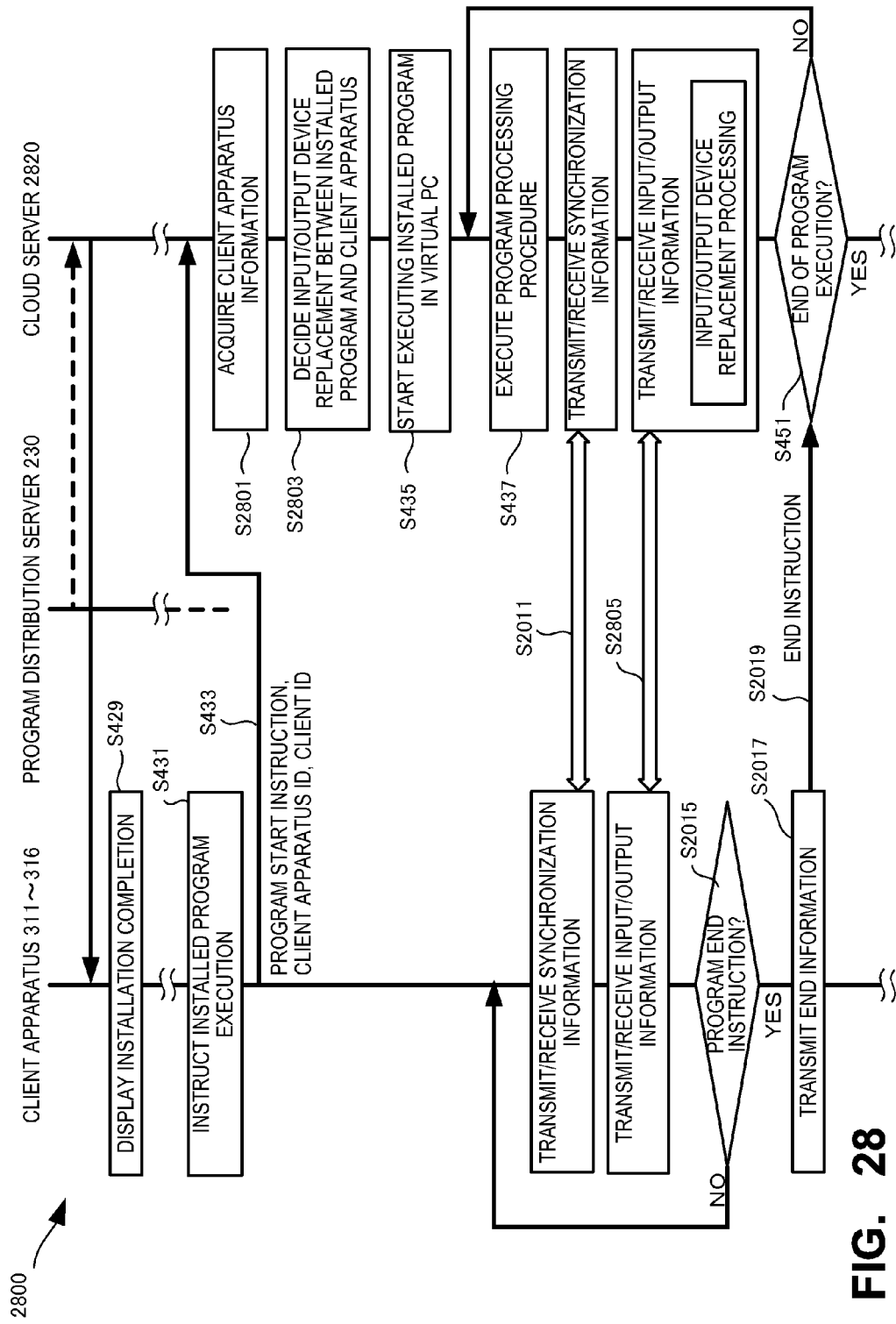
FIG. 28 is a sequence chart showing the operation procedure of an information processing system according to the seventh embodiment of the present invention.

FIG. 28 is a sequence chart showing the operation procedure of an information processing system 2800 according to this embodiment. Note that FIG. 28 shows an installed program execution procedure after program installation in a cloud server 2020 is completed. The same step numbers as in FIG. 4 of the second embodiment and FIG. 20 of the fifth embodiment denote the same operation procedures in FIG. 28, and a description thereof will be omitted.

In step S2801, the cloud server 2820 that has received an installed program execution instruction acquires client apparatus information. In this example, the arrangement and capability of the input/output device of the client apparatus are acquired. In step S2803, an input/output device of the client apparatus that can replace the input/output device intended by the installed program is decided based on the installed program and the information of the input/output capability of the client apparatus. For example, a display device and an audio input/output device can replace each other.

In step S2805, the cloud server 2820 performs input/output device replacement processing by transmitting/receiving input/output information. More specifically, the cloud server 2820 performs control signal conversion and data format conversion according to the device.

<<Functional Arrangement of Cloud Server>>

Figure 29:
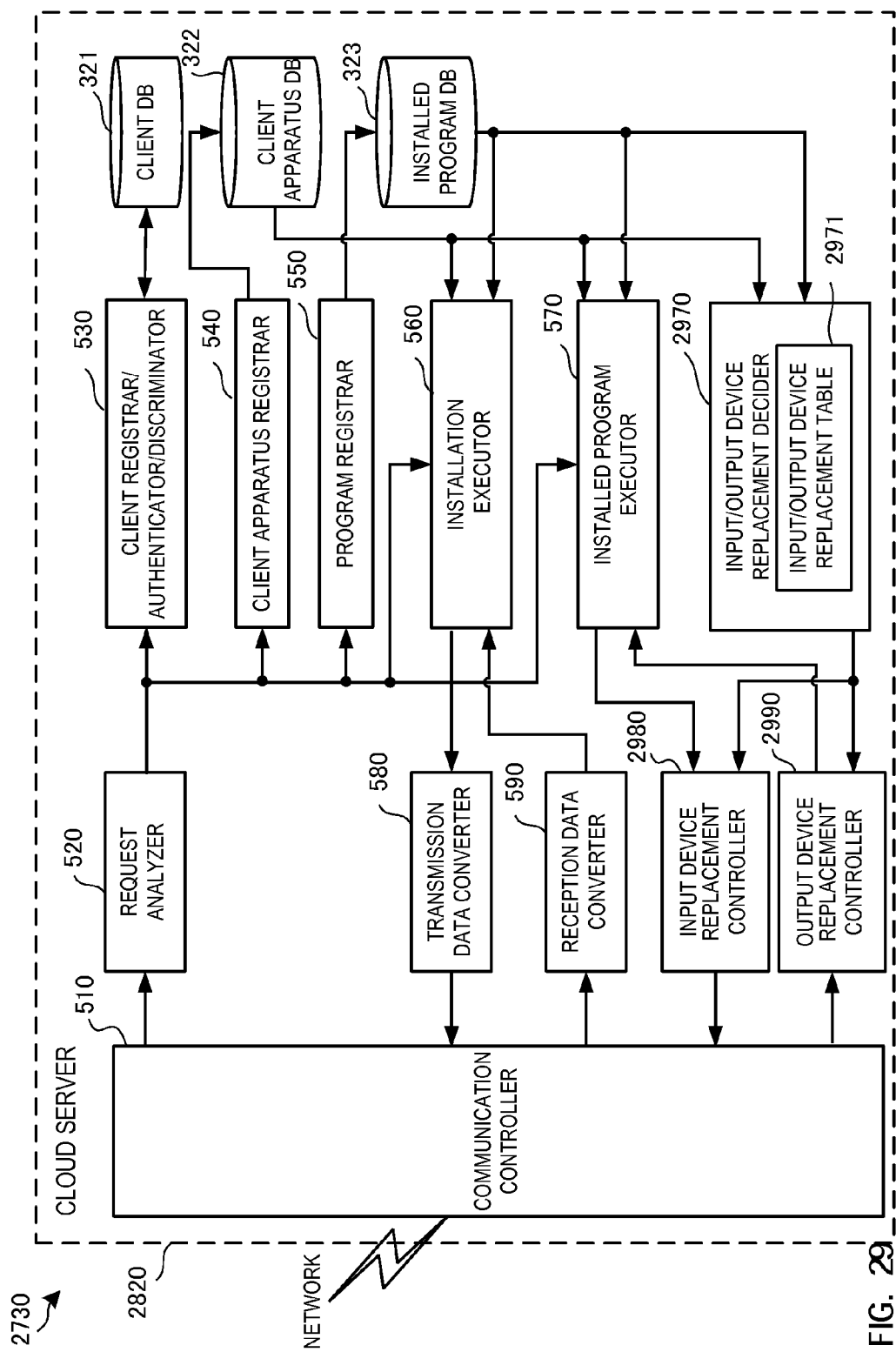
FIG. 29 is a block diagram showing the functional arrangement of a cloud server according to the seventh embodiment of the present invention.

FIG. 29 is a block diagram showing the functional arrangement of the cloud server 2820 according to this embodiment. Note that the same reference numerals as in FIG. 5 of the second embodiment denote the same functional components in FIG. 26, and a description thereof will be omitted.

An input/output device replacement decider 2970 includes an input/output device replacement table (see FIG. 30), and replaces the input/output device to be used by the installed program with the input/output device of the client apparatus. An input device replacement controller 2980 controls to convert control signals and input data to the input device of the client apparatus in accordance with an instruction of the input/output device replacement decider 2970 so that they can be processed by the input device of the installed program. An output device replacement controller 2990 controls to convert control signals and output data in accordance with an instruction of the input/output device replacement decider 2970 so that an output to the output device by the installed program can be processed by the output device of the client apparatus.

(System Modification Table)

Figure 30:
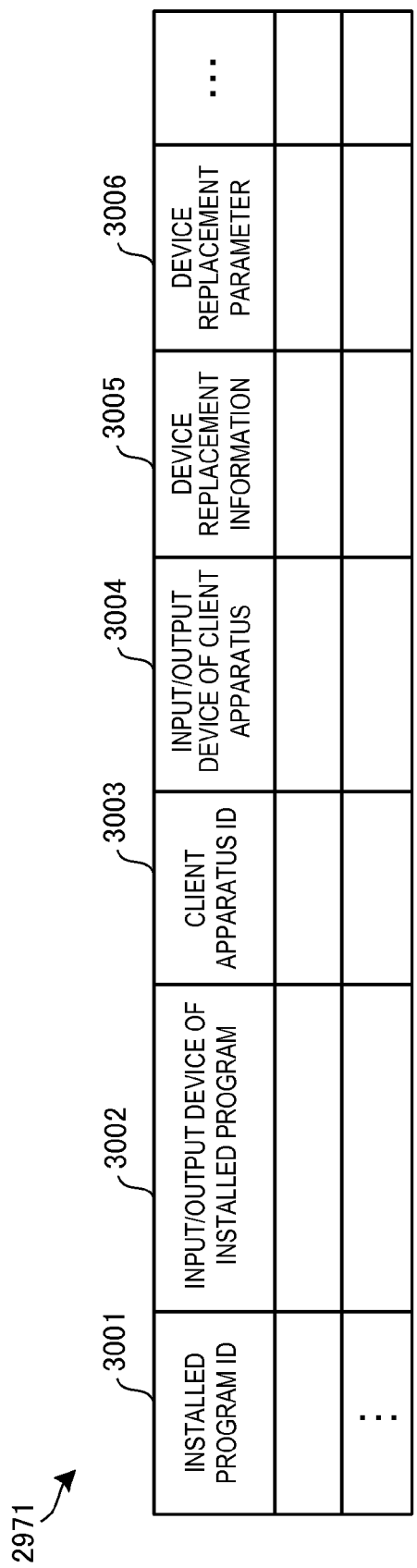
FIG. 30 is a view showing the arrangement of a system modification table according to the seventh embodiment of the present invention.

FIG. 30 is a view showing the arrangement of an input/output device replacement table 2971 according to this embodiment.

The input/output device replacement table 2971 stores an installed program ID 3001, an input/output device 3002 to be used by the installed program, a client apparatus ID 3003, and an input device 3004 held by the client apparatus. The input/output device replacement table 2971 also stores device replacement information 3005 and a device replacement parameter 3006 for replacement in association with the above-described pieces of information.

Eighth Embodiment

An information processing system according to the eighth embodiment of the present invention will be described next. The information processing system according to this embodiment is different from the second to seventh embodiments in that a cloud server that has installed a program on behalf of a client apparatus performs input/output control so as to directly perform input/output processing for an input/output device without intervention of the client apparatus. The rest of the components and operations is the same as in the second embodiment. Hence, the same reference numerals as in the second embodiment denote the same components and operations, and a detailed description thereof will be omitted.

According to this embodiment, the cloud server processes data input/output even for an input/output device that cannot be recognized by the client apparatus. It is therefore possible to virtually implement an input/output device that connects the input/output capability of the program to be installed to the client apparatus.

<<Arrangement of Information Processing System>

Figure 31:
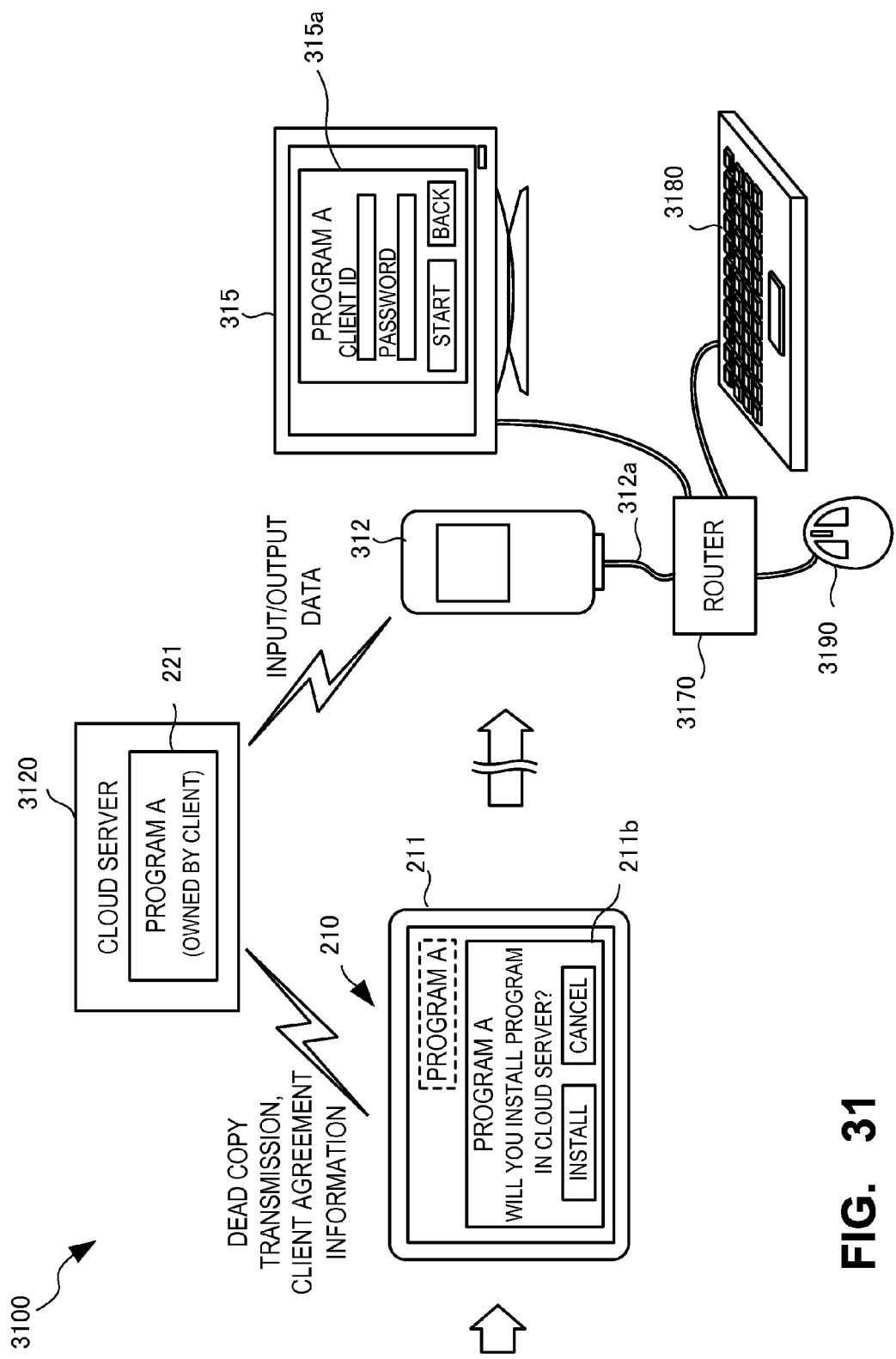
FIG. 31 is a block diagram for explaining the arrangement of an information processing system according to the eighth embodiment of the present invention.

FIG. 31 is a block diagram for explaining the arrangement of an information processing system 3100 according to this embodiment. Note that the same reference numerals as in FIG. 2 of the second embodiment denote the same constituent elements in FIG. 31, and a description thereof will be omitted.

Processing up to alternate program installation in a cloud server 3120 is the same as in FIG. 2. In this embodiment, as shown in the right view of FIG. 31, when executing an installed program, a client apparatus 312 that is a portable terminal cannot process input/output data associated with execution of an installed program A. For this reason, the cloud server 3120 directly performs input/output to/from a client apparatus 315 that is a digital TV, a keyboard 3180, and a pointing device 3190 via a router 3170 connected to the client apparatus 312 by a USB (Universal Serial Bus) 312a.

With this processing, communication between the cloud server 3120 and the client can be performed independently of the performance of the client apparatus. Note that the interface between the client apparatus 312 and the input/output device is not limited to the USB.

<<Operation Procedure of Information Processing System>>

Figure 32:
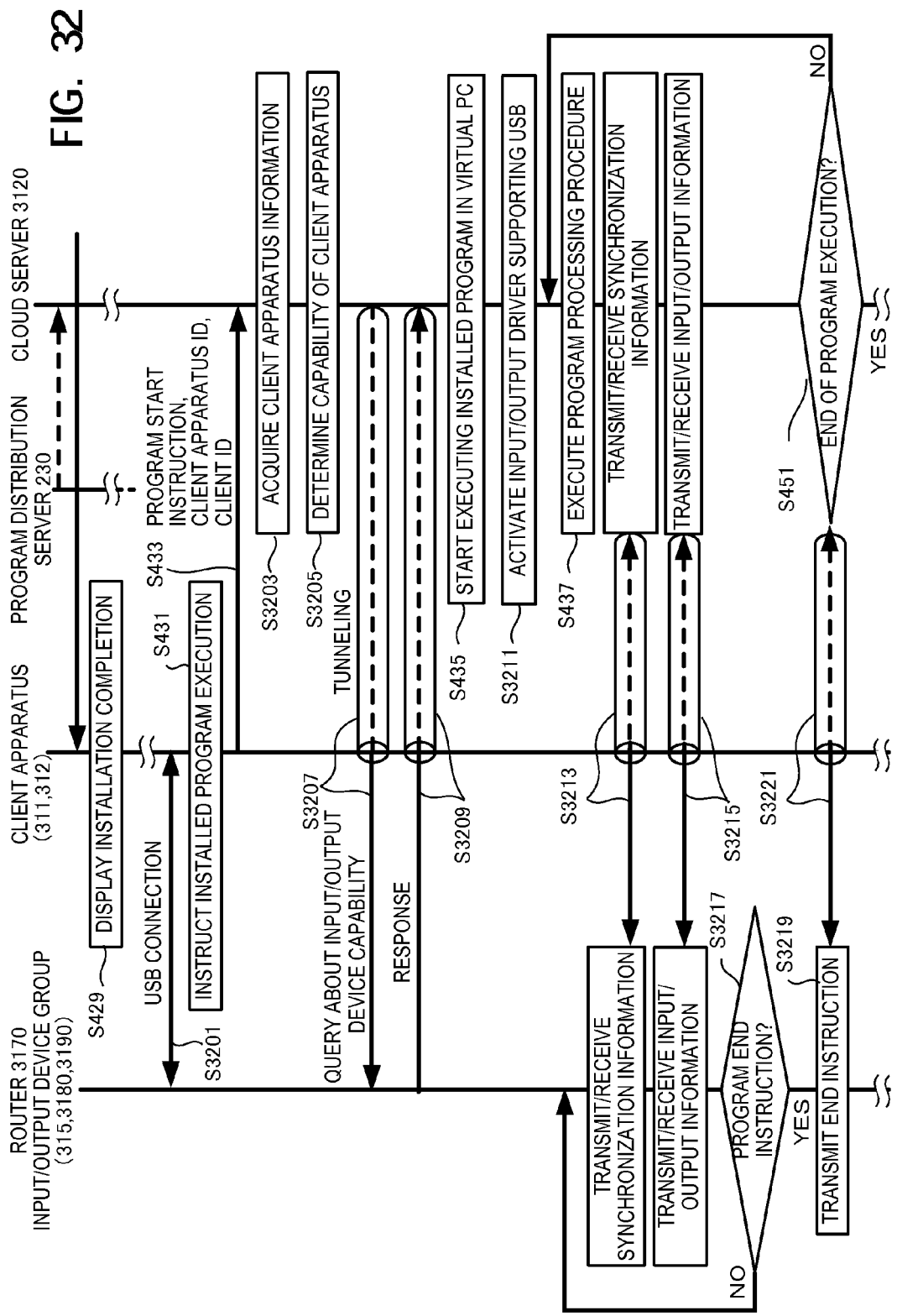
FIG. 32 is a sequence chart showing the operation procedure of the information processing system according to the eighth embodiment of the present invention.

FIG. 32 is a sequence chart showing the operation procedure of the information processing system 3100 according to this embodiment. Note that FIG. 32 shows an installed program execution procedure after program installation in a cloud server 2020 is completed. The same step numbers as in FIG. 4 of the second embodiment denote the same operation procedures in FIG. 32, and a description thereof will be omitted.

First, in step S3201, client apparatuses 311 to 316 that acquire a processing result are connected to an input/output device group via the router 3170 using a USB cable. In step S431, the client apparatus transmits an installed program execution instruction to the cloud server 3120.

The cloud server 3120 acquires client apparatus information in step S3203, and determines the capability of the client apparatus in step S3205. In this embodiment, it is determined whether the client apparatus can process input/output data in the installed program to be executed by the cloud server 3120. Processing to be performed when input/output data cannot be processed will be described below.

In step S3207, the cloud server 3120 directly queries the input/output device about the capability via the router 3170 without intervention of the client apparatus. In step S3209, the input/output device directly returns a response to the cloud server 3120. The cloud server 3120 starts executing the installed program in the virtual PC in step S435, and activates an input/output driver supporting USB in step S3211.

Even during execution of the installed program, the cloud server 3120 performs direct transmission/reception to/from the input/output device. In step S3213, synchronization by a control signal or the like is established. In step S3215, synchronization in input/output information is established. In step S3217, the input/output device waits for a program end instruction from the client. Upon receiving a program end instruction, the process advances to step S3219 to directly transmit end information to the cloud server 3120. The cloud server receives the program end information in step S3221, and ends the installed program execution.

(Communication Protocol Stack)

Figure 33:
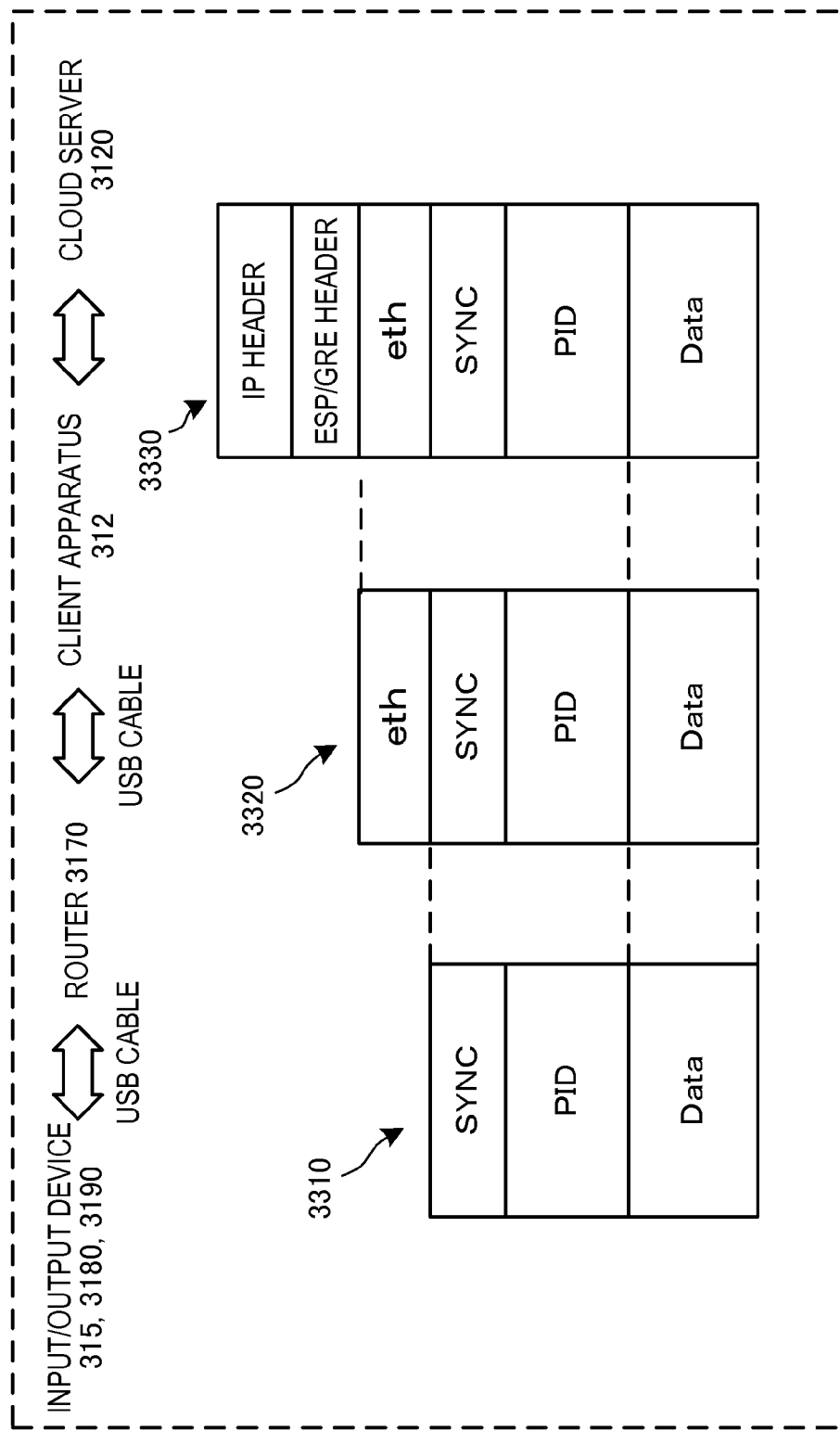
FIG. 33 is a view showing communication protocol stacks according to the eighth embodiment of the present invention.

FIG. 33 is a view showing communication protocol stacks according to this embodiment.

Referring to FIG. 33, a USB protocol stack 3310 is the basic arrangement of a USB packet to be exchanged on the USB cable between the router and the input/output device. A protocol stack 3320 with Ethernet® added to the USB packet is transmitted on a LAN (Local Area Network) between the router 3170 and the client apparatus of the request source. A protocol stack 3330 further including an IP layer is transmitted on an IP network between the cloud server 3120 and the client apparatus of the request source.

With this protocol stack arrangement, a processing result can be output or edited independently of the processing performance of the client apparatus of the request source.

Ninth Embodiment

An information processing system according to the ninth embodiment of the present invention will be described next. The information processing system according to this embodiment is different from the second to eighth embodiments in that a cloud server accumulates associated information of a program installed on behalf of a client apparatus and the history of information associated with installation, thereby providing information to other clients. The rest of the components and operations is the same as in the second embodiment. Hence, the same reference numerals as in the second embodiment denote the same components and operations, and a detailed description thereof will be omitted.

According to this embodiment, the cloud server accumulates associated information of a program and the history of information associated with installation. Hence, the clients can share the information of the program and the information associated with installation of the program.

<<Arrangement of Information Processing System>

Figure 34:
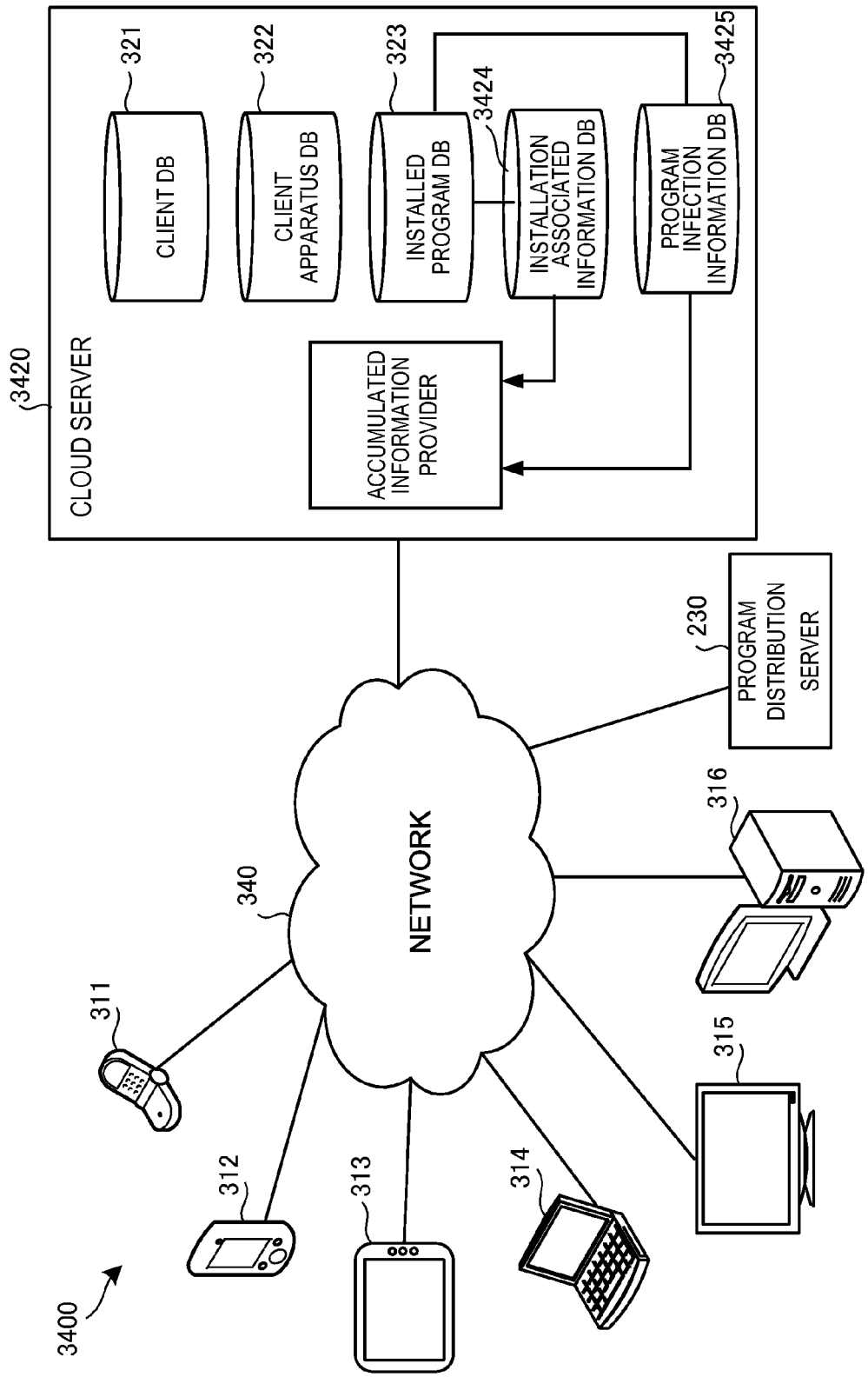
FIG. 34 is a block diagram showing the arrangement of an information processing system according to the ninth embodiment of the present invention.

FIG. 34 is a block diagram showing the arrangement of an information processing system 3400 according to this embodiment. Note that the same reference numerals as in FIG. 3 of the second embodiment denote the same functional components in FIG. 34, and a description thereof will be omitted.

A cloud server 3420 in the information processing system 3400 includes an installation associated information DB 3424 and a program infection information DB 3425 which are associated with an installed program DB 323 that accumulates the history of programs installed and executed in the cloud server 3420.

The installation associated information DB 3424 stores information such as installation conditions and a preferable installation method at the time of program installation in association with a program. Especially for a program requested by the client apparatus to be alternatively installed, a history of reasons why the program cannot be installed in the client apparatus or reasons why the program cannot be executed is accumulated. On the other hand, tips to enable installation or program execution in the current client apparatus are also accumulated as information afterward. Hence, when the client apparatus accesses the information, or the cloud server 3420 provides it, assistance to appropriate installation processing of the client can be obtained.

On the other hand, the program infection information DB 3425 accumulates infection information at the time of installation of a program accumulated in the installed program DB 323, and as an execution history during execution, a history of infection information by communication with an external apparatus or data transfer to/from another program. Since accumulation of completion information in the cloud server 3420 is not an individual experience but a collective intelligence of information from all clients, objective evaluation from a wider field of view can be performed. Hence, when the client apparatus accesses the information, or the cloud server 3420 provides it, the client can acquire appropriate information useful for preventing infection of the client apparatus.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a storage medium storing the program, and a WWW (World Wide Web) server that causes a user to download the program.

This application claims the benefit of Japanese Patent Application No. 2012-068507 filed on Mar. 24, 2012, which is hereby incorporated by reference herein in its entirety.

The invention claimed is:

1. An information processing system comprising a first information processing apparatus and a second information processing apparatus connected via communication media, wherein:
the first information processing apparatus comprises:
a first memory storing first instructions; and
a first processor configured to execute the first instructions to:
transmit to the second information processing apparatus an installation request for installing and executing a program whose installation by the first information processing apparatus has failed because the first information processing apparatus does not satisfy a condition for installing or executing the program, the installation request including program purchase information confirming that a client has purchased the program and capability information of the first information processing apparatus; and
when the program has been installed on the second information processing apparatus, remove the program without the program purchase information from the first information processing apparatus; and
the second information processing apparatus comprises:
a second memory storing second instructions; and
a second processor configured to execute the second instructions to:
receive the program purchase information and the capability information;
when the program purchase information is received, install the program on the second information processing apparatus and synchronize installation of the program on the second information processing apparatus with input and output operations for the installation of the program on the first information processing apparatus in accordance with the received capability information; and
execute the installed program on the second information apparatus and synchronize execution of the program on said second information processing apparatus with input and output operations for the execution of the program on the first information processing apparatus in accordance with the received capability information.

2. The information processing system according to claim 1, wherein the first processor is further configured to execute the first instructions to:
transmit the program from the first information processing apparatus to the second information processing apparatus when the program has been acquired and the installation of the program by the first information processing apparatus has failed.

3. The information processing system according to claim 1, wherein the second processor is further configured to execute the second instructions to:
acquire the program from a third information processing apparatus: and
install the program on the second information processing apparatus in accordance with an installation instruction of the program from the first information processing apparatus.

4. The information processing system according to claim 1, wherein:
the program includes a portion divisionally executable by the first information processing apparatus; and
the first processor is further configured to execute the first instructions to:
execute the portion upon receiving an approval for divisional execution from the client.

5. The information processing system according to claim 1, wherein the condition includes a software condition or a hardware condition for installing or executing the program.

6. The information processing system according to claim 1, wherein the condition includes a communication condition for installing or executing the program.

7. The information processing system according to claim 1, wherein:
the second information processing apparatus further comprises a database storing the received capability information of the first information processing apparatus; and the second processor is configured to execute the second instructions to install the program and execute the installed program by converting an operation or an input/output of the first information processing apparatus during installation of the program and during execution of the installed program, in accordance with the received capability information.

8. The information processing system according to claim 7, wherein
the database includes a configuration of the first information processing apparatus, and
the second processor is configured to execute the second instructions to install the program and execute the installed program by further converting a configuration of an apparatus intended by the program in accordance with the configuration of the first information processing apparatus during installation of the program and execution of the installed program.

9. The information processing system according to claim 1, wherein the second processor is further configured to execute the second instructions to:
directly exchange information with an input/output device connected to the first information processing apparatus with the first information processing apparatus relaying the exchanged information between the second information processing apparatus and the input/output device, when the first information processing apparatus has no capability of processing a result of the program executed by the second information processing apparatus.

10. The information processing system according to claim 1, wherein the second information processing apparatus further comprises:
a storage device configured to save history information associated with the program and installation of the program on the second information processing apparatus,
wherein the second processor is further configured to execute the second instructions to:
provide the history information to the first information processing apparatus.

11. An information processing method of an information processing system in which a first information processing apparatus and a second information processing apparatus are connected via communication media, the method comprising:
transmitting, by the first information processing apparatus, to the second information processing apparatus an installation request for installing and executing a program whose installation by said first information processing apparatus has failed because the first information processing apparatus does not satisfy a condition for installing or executing the program, the installation request including program purchase information confirming that a client has purchased the program and capability information of the first information processing apparatus;
receiving, by the second information processing apparatus, the program purchase information and the capability information;
when the program purchase information is received, installing the program on the second information processing apparatus and synchronizing installation of the program on the second information processing apparatus with input and output operations for the installation of the program on the first information processing apparatus in accordance with the received capability information;
executing the installed program and synchronizing execution of the program on the second information processing apparatus with input and output operations for the execution of the program on the first information processing apparatus in accordance with the received capability information; and
when the program has been installed on the second information processing apparatus, removing the program without the program purchase information from said first information processing apparatus.

12. The information processing system according to claim 1, wherein the second processor is further configured to execute the second instructions to:
generate a virtual information processing apparatus corresponding to the first information processing apparatus for installing and executing the program in the second information processing apparatus; and
install the program and execute the installed program on the virtual first information processing apparatus.

13. A second information processing apparatus comprising:
a memory storing instructions; and
a processor configured to execute the instructions to:
receive, from a first information processing apparatus, an installation request for installing and executing a program whose installation by the first information processing apparatus has failed because the first information processing apparatus does not satisfy a condition for installing or executing the program, the installation request including program purchase information confirming that a client has purchased the program and capability information of the first information processing apparatus;
when the program purchase information is received, install the program and synchronize installation of the installed program on the second information processing apparatus with input and output operations for the installation of the program on the first information processing apparatus in accordance with the received capability information; and
execute the installed program and synchronize execution of the installed program with input and output operations for the execution of the program on the first information processing apparatus in accordance with the received capability information.

14. The second information processing apparatus according to claim 13, wherein the processor is further configured to execute the instructions to:
receive the program transmitted from the first information processing apparatus.

15. The second information processing apparatus according to claim 13, wherein the processor is further configured to execute the instructions to:
receive the program from a third information processing apparatus and install the program in accordance with an instruction from the first information processing apparatus.

16. The second information processing apparatus according to claim 13, wherein the processor is further configured to execute the instructions to:
cause the first information processing apparatus to execute a portion of the program.

17. The second information processing apparatus according to claim 13, further comprising a database storing the received capability information of the first information processing apparatus,
wherein the processor is configured to execute the instructions to install the program and execute the installed program by converting an operation or an input/output during installation of the program and an operation or an input/output during execution of the program in accordance with the received capability information.

18. The second information processing apparatus according to claim 17, wherein
the database further includes a configuration of the first information processing apparatus, and
the processor is configured to execute the instructions to install the program and execute the installed program by further modifying a configuration of an apparatus intended by the program in accordance with the configuration of the first information processing apparatus during installation and execution of the program.

19. The second information processing apparatus according to claim 13, wherein the processor is further configured to execute instructions to:
directly exchange information with an input/output device connected to the first information processing apparatus with the first information processing apparatus relaying the exchanged information between the second information processing apparatus and the input/output device, when the first information processing apparatus has no capability of processing a result of the program executed by the second information processing apparatus.

20. The second information processing apparatus according to claim 13, further comprising:
a storage device configured to save history information associated with the program and installation of the program on the second information processing apparatus; and
wherein the processor is further configured to execute the instructions to:
provide the history information to the first information processing apparatus.

21. A control method of a second information processing apparatus, the method comprising:
receiving, from a first information processing apparatus, an installation request for installing and executing a program whose installation by the first information processing apparatus has failed because the first information processing apparatus does not satisfy a condition for installing or executing the program, the installation request including program purchase information confirming that a client has purchased the program and capability information of the first information processing apparatus;
when the program purchase information is received, installing the program and synchronizing installation of the installed program on the second information processing apparatus with input and output operations for the installation of the program on the first information processing apparatus in accordance with the received capability information; and
executing the installed program and synchronizing execution of the installed program with input and output operations for the execution of the program on the first information processing apparatus in accordance with the received capability information.

22. A non-transitory computer-readable storage medium storing instructions that, when executed by a processor of a second information processing apparatus, cause the processor to perform a method comprising:
receiving, from a first information processing apparatus, an installation request for installing and executing a program whose installation by the first information processing apparatus has failed because the first information processing apparatus does not satisfy a condition for installing or executing the program, the installation request including program purchase information confirming that a client has purchased the program and capability information of the first information processing apparatus;
when the program purchase information is received, installing the program and synchronizing installation of the installed program on the second information processing apparatus with input and output operations for the installation of the program on the first information processing apparatus; and
executing the installed program and synchronizing execution of the installed program with input and output operations for the execution of the program on the first information processing apparatus in accordance with the received capability information.

23. A first information processing apparatus comprising:
a memory storing instructions; and
a processor configured to execute the instructions to:
transmit to a second information processing apparatus an installation request for installing and executing a program whose installation by the first information processing apparatus has failed because the first information processing apparatus does not satisfy a condition for installing or executing the program, the installation request including program purchase information confirming that a client has purchased the program and capability information of the first information processing apparatus;
synchronize input and output operations for installation of the program on the first information processing apparatus with the installation of the program on the second information processing apparatus in accordance with the capability information;
synchronize input and output operations for execution of the program on the first information processing apparatus with the execution of the program on the second information processing apparatus in accordance with the capability information; and
when the program has been installed on the second information processing apparatus, remove the program without the program purchase information from the first information processing apparatus.

24. The first information processing apparatus according to claim 23, wherein the processor is further configured to execute the instructions to:
transmit the program to the second information processing apparatus.

25. The first information processing apparatus according to claim 23, wherein the processor is further configured to execute the instructions to:
instruct the second information processing apparatus to receive the program from a third information processing apparatus and install the program.

26. The first information processing apparatus according to claim 23, wherein the processor is further configured to execute the instructions to:

divisionally process a portion of the program, the portion being executable by the first information processing apparatus.

27. The first information processing apparatus according to claim 23, wherein the condition includes a software condition or a hardware condition for installing or executing the program.

28. The first information processing apparatus according to claim 23, wherein the condition includes a communication condition for installing or executing the program.

29. A control method of a first information processing apparatus, the method comprising:
- transmitting to a second information processing apparatus an installation request for installing and executing a program whose installation by the first information processing apparatus has failed because the first information processing apparatus does not satisfy a condition for installing or executing the program, the installation request including program purchase information confirming that a client has purchased the program and capability information of the first information processing apparatus;
- synchronizing input and output operations for installation of the program on the first information processing apparatus with the installation of the program on the second information processing apparatus in accordance with the capability information;
- synchronizing input and output operations for execution of the program on the first information apparatus with the execution of the program on the second information processing apparatus in accordance with the capability information; and
- when the program has been installed on the second information processing apparatus, removing the program without the program purchase information from the first information processing apparatus.

30. A non-transitory computer-readable storage medium storing instructions that, when executed by a processor of a first information processing apparatus cause the processor to perform a method comprising:
- transmitting to a second information processing apparatus an installation request for installing and executing a program whose installation by the first information processing apparatus has failed because the first information processing apparatus does not satisfy a condition for installing or executing the program, the installation request including program purchase information confirming that a client has purchased the program and capability information of the first information processing apparatus;
- synchronizing input and output operations for installation of the program on the first information processing apparatus with the installation of the program on second information processing apparatus in accordance with the capability information;
- synchronizing input and output operations for execution of the program on the first information apparatus with the execution of the program on the second information processing apparatus in accordance with the capability information; and
- when the program has been installed on the second information processing apparatus, removing the program without the program purchase information from the first information processing apparatus.

* * * * *